(12) United States Patent
Morohoshi

(10) Patent No.: US 7,015,894 B2
(45) Date of Patent: Mar. 21, 2006

(54) INFORMATION INPUT AND OUTPUT SYSTEM, METHOD, STORAGE MEDIUM, AND CARRIER WAVE

(75) Inventor: Hiroshi Morohoshi, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 458 days.

(21) Appl. No.: 10/256,203

(22) Filed: Sep. 27, 2002

(65) Prior Publication Data

US 2003/0071858 A1  Apr. 17, 2003

(30) Foreign Application Priority Data

Sep. 28, 2001 (JP) ............................ 2001-300559
Mar. 5, 2002 (JP) ............................ 2002-059431

(51) Int. Cl.
*G09G 5/00* (2006.01)
(52) U.S. Cl. ..................................... 345/156; 345/172
(58) Field of Classification Search ........ 345/156–170, 345/173, 126; 704/251; 348/333, 331.1, 348/373, 346, 347; 353/42
See application file for complete search history.

(56) References Cited

U.S. PATENT DOCUMENTS

| 4,812,980 | A | * | 3/1989 | Yamada et al. ............. 701/200 |
|---|---|---|---|---|
| 5,424,951 | A | * | 6/1995 | Nobe et al. .................. 701/200 |
| 5,600,765 | A | * | 2/1997 | Ando et al. .................. 345/668 |
| 5,767,861 | A | * | 6/1998 | Kimura ....................... 345/473 |
| 5,818,459 | A | * | 10/1998 | Kurumida .................... 345/442 |
| 5,864,808 | A | * | 1/1999 | Ando et al. .................. 704/251 |
| 6,323,846 | B1 | | 11/2001 | Westerman et al. |
| 6,518,956 | B1 | * | 2/2003 | Sato ........................... 345/173 |
| 6,598,978 | B1 | * | 7/2003 | Hasegawa ..................... 353/42 |
| 6,611,322 | B1 | * | 8/2003 | Nakayama et al. ......... 356/73.1 |
| 6,704,000 | B1 | * | 3/2004 | Carpenter .................... 345/158 |

FOREIGN PATENT DOCUMENTS

| JP | 11-110116 | 4/1999 |
|---|---|---|
| JP | 2000-187419 | 4/2000 |
| JP | 2000-187420 | 4/2000 |

* cited by examiner

*Primary Examiner*—Vijay Shankar
*Assistant Examiner*—Nitin Patel
(74) *Attorney, Agent, or Firm*—Morrison & Foerster LLP

(57) ABSTRACT

A coordinate input device detects coordinates of a position by indicating a screen of a display device with fingers of one hand, and transfers information of the detected coordinates to a computer through a controller. The computer receives an operation that complies with the detected coordinates, and executes the corresponding processing. For example, when it is detected that two points on the screen have been simultaneously indicated, an icon registered in advance is displayed close to the indicated position.

13 Claims, 46 Drawing Sheets

FIG. 28

| COORDINATE VECTOR VALUE | ΔX | ΔY | ΔY/ΔX | | COORDINATE VECTOR ANGLE |
|---|---|---|---|---|---|
| 1 | 0 | + | ∞ | (tan90') | 90' |
| 2 | + | + | 5.671 | (tan80') | 80' |
| 3 | + | + | 2.747 | (tan70') | 70' |
| 4 | + | + | 1.732 | (tan60') | 60' |
| 5 | + | + | 1.192 | (tan50') | 50' |
| 6 | + | + | 0.839 | (tan40') | 40' |
| 7 | + | + | 0.577 | (tan30') | 30' |
| 8 | + | + | 0.364 | (tan20') | 20' |
| 9 | + | + | 0.176 | (tan10') | 10' |
| 10 | + | 0 | 0 | (tan 0') | 0' |
| 11 | + | − | 0.176 | (tan10') | 10' |
| 12 | + | − | 0.364 | (tan20') | 20' |
| 13 | + | − | 0.577 | (tan30') | 30' |
| 14 | + | − | 0.839 | (tan40') | 40' |
| 15 | + | − | 1.192 | (tan50') | 50' |
| 16 | + | − | 1.732 | (tan60') | 60' |
| 17 | + | − | 2.747 | (tan70') | 70' |
| 18 | + | − | 5.671 | (tan80') | 80' |
| 19 | 0 | − | ∞ | (tan90') | 90' |
| 20 | − | − | 5.671 | (tan80') | 80' |
| 21 | − | − | 2.747 | (tan70') | 70' |
| 22 | − | − | 1.732 | (tan60') | 60' |
| 23 | − | − | 1.192 | (tan50') | 50' |
| 24 | − | − | 0.839 | (tan40') | 40' |
| 25 | − | − | 0.577 | (tan30') | 30' |
| 26 | − | − | 0.364 | (tan20') | 20' |
| 27 | − | − | 0.176 | (tan10') | 10' |
| 28 | − | 0 | 0 | (tan 0') | 0' |
| 29 | − | + | 0.176 | (tan10') | 10' |
| 30 | − | + | 0.364 | (tan20') | 20' |
| 31 | − | + | 0.577 | (tan30') | 30' |
| 32 | − | + | 0.839 | (tan40') | 40' |
| 33 | − | + | 1.192 | (tan50') | 50' |
| 34 | − | + | 1.732 | (tan60') | 60' |
| 35 | − | + | 2.747 | (tan70') | 70' |
| 36 | − | + | 5.671 | (tan80') | 80' |

TB

● REAL IMAGE
□ VIRTUAL IMAGE

INFORMATION INPUT AND OUTPUT SYSTEM, METHOD, STORAGE MEDIUM, AND CARRIER WAVE

BACKGROUND OF THE INVENTION

1. Field of the Invention

The present invention relates to an information input and output system that indicates a screen to make it possible to input information using a display device and a coordinate input device.

2. Description of the Related Art

In recent years, there has been provided an information input and output system, which includes a display device that displays characters and images and a coordinate input device that has an information input surface (touch panel surface) on the entire surface of the display device, and a control device that performs display control of the display device based on the input from the coordinate input device, and which constitutes display and writing surfaces of an electronic blackboard using the display device and coordinate input device.

For example, Smart 2000 (made by SMART Technologies Inc.) performs processing for capturing handwritten information into a computer using a coordinate input device (writing surface) provided in front of a projected plan (displayed figure) of the panel in a state that images such as characters, pictures, figures, graphics, and the like are projected using a liquid crystal projector connected to a computer. Then, handwritten information and image information are combined with each other by the computer such that combined information can be displayed in real time through the liquid crystal projector again.

In such an information input and output system, since an image input by the coordinate input and output device can be superimposed on a drawing displayed on the screen by the display device, this system has been widely used in a conference, presentation, educational scene, etc, and the effect of use on this system is highly evaluated.

Further, a function of performing communication for voice and image is incorporated into such the information input and output system and communication between remote locations is connected by a communication line, and this is thereby used as an electronic conferencing system.

Furthermore, various types of techniques are proposed as a coordinate input device to be used in such the information input and output system. Namely, as the coordinate input device, there is proposed an optical type (for example, Unexamined Japanese Patent Application KOKAI Publication No. H11-110116) in addition to a type having a physical surface such as a touch panel surface.

By the way, in the case where the aforementioned information input and output system is used to operate various kinds of applications on the screen, there can be considered that a tool bar is displayed on the screen and an icon on the tool bar is indicated by a pointer member such as fingers of one hand, pen, etc, or a dedicated remote control is operated. In the case of indicating the icon by the pointer member, the coordinate input device detects the coordinates of position indicated by the corresponding pointer member to determine which icon is indicated.

However, it is generally assumed that the display used in the information input and output system is a large size of such as such as 40 inches or 50 inches. In the case of indicating the icons of the tool bars on the screen (they are generally displayed at upper and lower or right and left ends of the screen), a user must stretch his/her limbs largely, or walk to the position where a desired icon is displayed every time when clicking the icon. Or, in the case where the user performs operations while sitting on the chair, the user must specially stand up from his/her chair every time when clicking a desired icon, causing a problem that the operation is extremely complicated.

Moreover, in the case where the operation is performed by the dedicated remote control as mentioned above, the operation on the screen of information input and output system cannot be carried out. For this reason, in the case where the user performs the operation as viewing the screen or explaining, there is a problem that the operation is extremely complicated.

SUMMARY OF THE INVENTION

The present invention has been made with consideration given to the aforementioned problems, and an object of the present invention is to make it possible to operate an icon on a screen at hand so as to improve system operationality.

Moreover, another object of the present invention is to make it possible to easily distinguish between an operation for displaying an icon and other operation with no object of displaying the icon in order to improve operationality.

In order to attain the above object, according to a first aspect of the present invention, there is provided an information input and output system comprising a display device that display an image; a coordinate input device that detects coordinates of a plurality of positions indicated on a screen of the display device; a storage unit that prestores one or a plurality of operation images using as images for an operation; and an operation image control unit, when the coordinate input device detects the coordinates of the plurality of positions indicated on the screen, that displays an operation image stored in the storage unit at a predetermined position on the screen of the display device based on the coordinates.

This makes it possible to display a necessary operation image close to the indicated position by a simple operation that indicates a plurality of locations on the screen with fingers of one hand. For this reason, the operation image can be operated on the screen at hand, so that operationality can be improved. Further, in the case where one location on the screen is indicated, the operation image is not displayed, making it possible to easily distinguish between the operation with no object of displaying the operation image (the operation that indicates one location) and the operation that displays the operation image.

Additionally, in this specification, the operation images refer to graphics displayed on the screen. The user performs a predetermined operation to the graphics with his/her fingers of one hand and receives the performance of various operations to the information input and output system. The graphics include an icon, a dial, slider bar, pallet, etc.

It is possible to comprise a control unit that measures time between points where the plurality of positions are respectively indicated and determines whether or not the measured time is a predetermined time or less.

The operation image control unit may display the operation image when the measured time is determined as a predetermined time or less.

This makes it possible to easily distinguish between the operation that indicates a plurality of locations on the screen with no object of displaying the operation image and the operation that indicates a plurality of locations to display the operation image since the operation image is not displayed when time interval is set to some extent to indicate a plurality of locations on the screen sequentially.

It is possible to comprise a control unit that calculates a distance between the plurality of positions indicated and determines whether or not the calculated distance is a predetermined distance or less.

The operation image control unit displays the operation image when the calculated distance is determined as a predetermined distance or less.

This makes it possible to easily distinguish between the operation that indicates a plurality of locations on the screen with no object of displaying the operation image and the operation that indicates a plurality of locations to display the operation image since the operation image is not displayed when length interval is set to some extent to indicate a plurality of locations on the screen sequentially.

The storage unit may register display condition information relating to display conditions in connection with the one or a plurality of kinds of operation images.

The operation image control unit may display the operation image in accordance with the registration content of the storage unit.

This makes it possible to display the operation image with the registered content.

It is possible to comprise a control unit that receives an input of the display condition information and updates the registration content of the corresponding display condition information in the storage unit based on the received content.

Since this makes it possible to register the details on the display image according to the user's desire, operationality can be improved.

It is possible to comprise a detecting unit that detects a moved distance between positions indicated on the screen and a moving direction thereof and a control unit, when movement of the indicated positions is detected in a state in which the operation image is displayed, that receives a predetermined operation in accordance with at least one of the detected moved distance and moving direction, and executes the corresponding processing.

This makes it possible to realize a predetermined operation by moving the indicated position on the screen.

The control unit may change the display position of the operation image in accordance with at least one of the detected moved distance and moving direction when the movement of the indicated positions is detected in a state that the operation image is displayed.

This makes it possible to display an object that is indicated by the operation image as operated in accordance with movement of the indicated position on the screen.

It is possible to comprise a detecting unit that detects moved distance and moving direction of the positions indicated on the screen, and a control unit that enlarges or reduces the size of the operation image on the screen in accordance with at least one of the detected moved distance and moving direction when the movement of the indicated positions is detected.

This makes it possible to easily enlarge or reduce the operation image to a desired size to facilitate the operation.

It is possible to comprise a detecting unit that detects moved distance and moving direction of the position indicated on the screen.

The operation image control unit may display a door image at a predetermined position on the screen when a plurality of positions is detected on the screen.

The operation image control unit may move the display position of the door image on the screen and displays the control image to appear gradually from the lower portion of door in accordance with at least one of the detected moved distance and moving direction when the movement of the indicated positions is detected in a state that the door image is displayed.

Instead of displaying the operation immediately when the plurality of positions on the screen is indicated, this makes it possible to move the door image gradually according to movement of the indicated position to display the operation image from the lower portion. This is suitable for a case in which an operation image that is undesirably shown directly.

The operation image may include at least one of an icon, a dial, a slider bar, and a pallet.

The storage unit may register a plurality of kinds of operation images.

The operation image control unit may select an image to be displayed from the plurality of operation images to display the selected image based on the number of indicated positions and whether positions are simultaneously indicated or positions are sequentially indicated.

This makes it possible to selectively display various kinds of operation images by the difference in the way of indication on the screen.

Moreover, according to a second aspect of the present invention, there is provided an information input and output method comprising the steps of detecting coordinates of a plurality of positions indicated on a screen of a display device by a user; and displaying an operation image, using as an image for an operation, at a predetermined position on the screen based on the detected coordinates of the plurality of positions.

Further, according to a third aspect of the present invention, there is provided a computer-readable storage medium having a computer-program recorded thereon, the computer-program causing a computer, which is connected to a display device and a coordinate input device that detects coordinates of a plurality of positions indicated on a screen of the display device, to execute steps of obtaining coordinates detected by the coordinate input device; and displaying an operation image, using as an image for an operation, at a predetermined position on the screen of the display device based on the obtained coordinates.

The computer-program may cause the computer to execute further steps of measuring time between points where the plurality of positions are respectively indicated to determine whether or not the measured time is a predetermined time or less; and displaying the operation image when the measured time is determined as a predetermined time or less. Moreover, according to a second aspect of the present invention, there is provided.

The computer-program may causes the computer to execute further steps of calculating a distance between the plurality of positions indicated; determining whether or not the calculated distance is a predetermined distance or less; and displaying the operation image when the calculated distance is determined as a predetermined distance or less.

The computer-program may cause the computer to execute further step of displaying the operation image in accordance with the registration content of a storage unit of the computer that registers display condition information relating to display conditions in connection with one or a plurality of kinds of operation images.

The computer-program may cause the computer to execute further steps of receiving an input of the display condition information; and updating the registration content of the corresponding display condition information in the storage unit based on the received content.

The computer-program may cause the computer to execute further steps of detecting a moved distance between positions indicated on the screen and a moving direction thereof; receiving a predetermined operation in accordance with at least one of the detected moved distance and moving direction when movement of the indicated positions is detected in a state in which the operation image is displayed; and executing a processing corresponding to the predetermined operation.

The computer-program may cause the computer to execute further step of changing the display position of the operation image in accordance with at least one of the detected moved distance and moving direction when the movement of the indicated positions is detected in a state that the operation image is displayed.

The computer-program may cause the computer to execute further steps of detecting moved distance and moving direction of the positions indicated on the screen; and enlarging or reducing the size of the operation image on the screen in accordance with at least one of the detected moved distance and moving direction when the movement of the indicated positions is detected.

The computer-program may cause the computer to execute further steps of detecting moved distance and moving direction of the position indicated on the screen; displaying a door image at a predetermined position on the screen when a plurality of positions is detected on the screen; and moving the display position of the door image on the screen to display the control image to appear gradually from the lower portion of door in accordance with at least one of the detected moved distance and moving direction when the movement of the indicated positions is detected in a state that the door image is displayed.

The operation image displaying step may display at least of an icon, a dial, a slider bar, and a pallet.

The computer-program may cause the computer to execute further step of selecting an image to be displayed from the plurality of operation images registered in a storage unit of the computer to display the selected image based on the number of indicated positions and whether positions are simultaneously indicated or positions are sequentially indicated.

Furthermore, a carrier wave according to a fourth aspect of the present invention represents a program causing a computer, which is connected to a display device and a coordinate input device that detects coordinates of a plurality of positions indicated on a screen of the display device, to function as a control circuit that displays an operation image, using as an image for an operation, at a predetermined position on a screen page of the display device based on the coordinates detected by the coordinate input device.

BRIEF DESCRIPTION OF THE DRAWINGS

These objects and other objects and advantages of the present invention will become more apparent upon reading of the following detailed description and the accompanying drawings in which:

FIG. 28 is a view schematically showing a vector table;

DETAILED DESCRIPTION OF THE PREFERRED EMBODIMENT

An embodiment is specifically described with reference to the drawings attached herewith.

Figure 1:
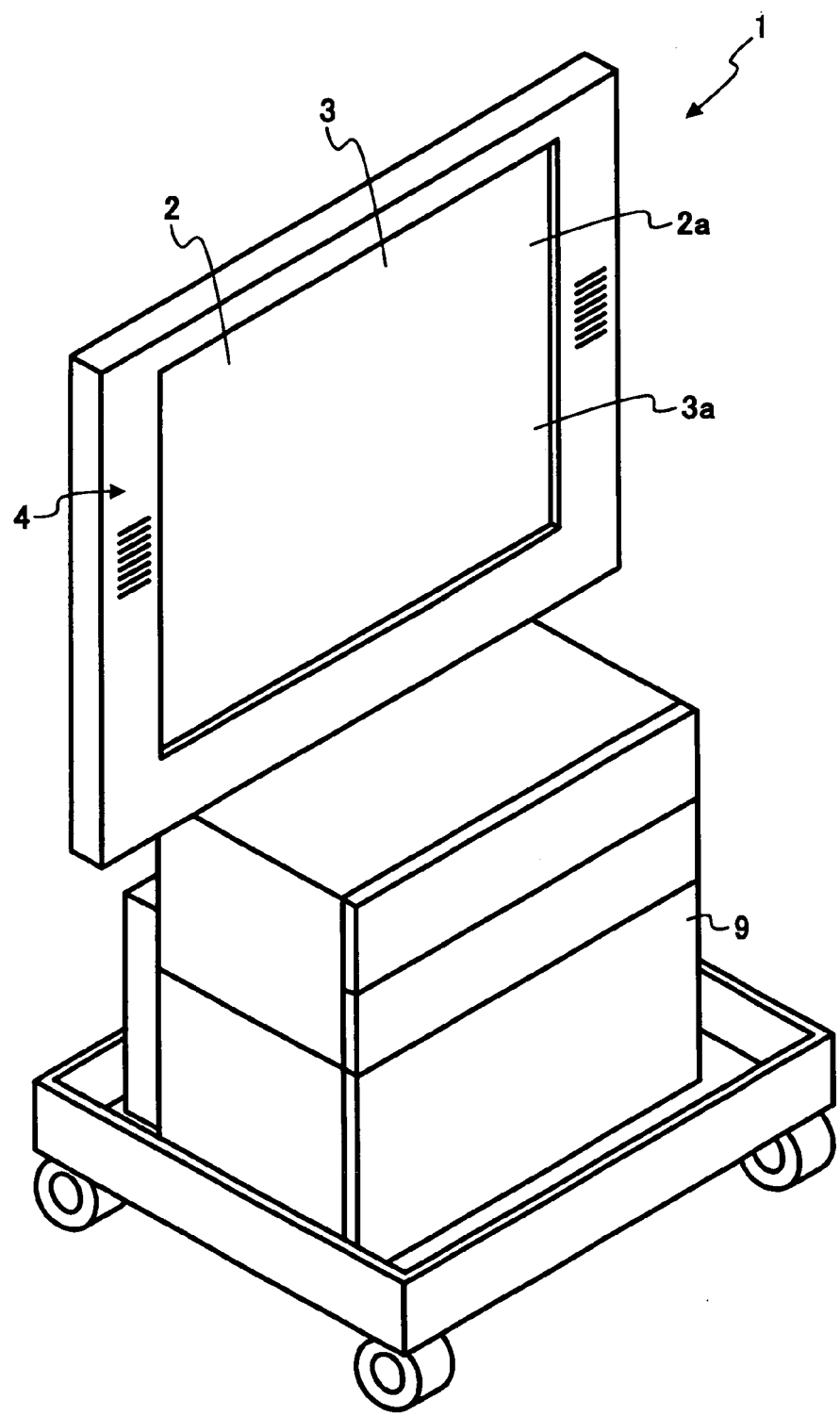
FIG. 1 is an outline perspective view schematically showing an information input and output system according to the embodiment of the present invention.
Figure 2:
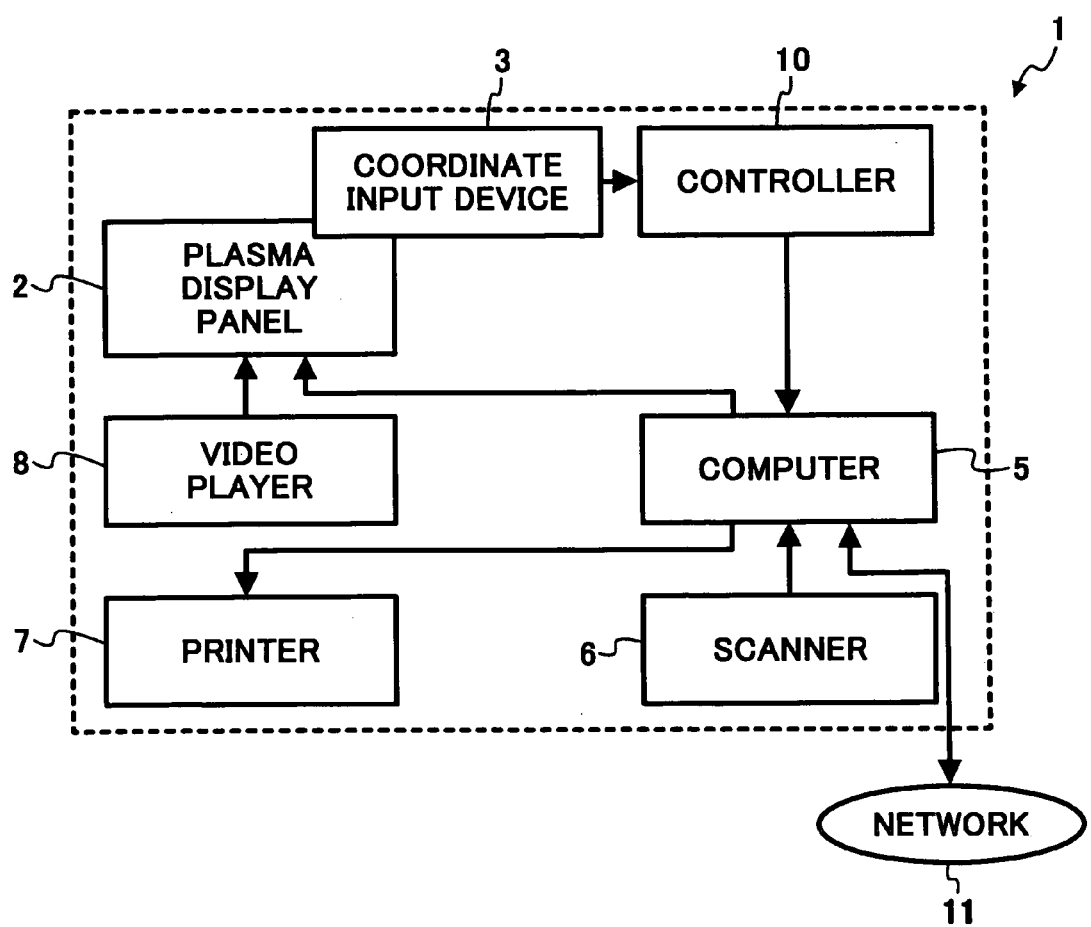
FIG. 2 is a block diagram showing electrical connections of the respective components built in the information input and output system of FIG. 1.

FIG. 1 is a perspective view schematically showing an information input and output system 1 according to one embodiment of the present invention. FIG. 2 is a block diagram showing an electrical connection of the information input and output system 1. As illustrated in FIGS. 1 and 2, the information input and output system 1 is provided with a panel section 4, a computer 5 such as a personal computer, a scanner 6 that scans an image on an original document, a printer 7 that outputs image data onto a recording paper, and an electronic equipment containing box 9 that contains a video player 8. Additionally, the panel section 4 is an input and output device that is composed of a plasma display panel (PDP) 2, which is a display device, and a coordinate input device 3.

Any display such as CRT, LCD, and the like may be used as PDP 2 as long as the display is a large screen type of 40 inches, 50 inches, etc. that is available as an electronic blackboard. Further, PDP 2 is provided with video input terminals, and speakers (not shown) to connect various kinds of information equipment such a laser disc player, DVD player, video camera, etc. and AV equipment in addition to video player 8, and is designed to have a configuration that is available as a large screen monitor.

As shown in FIG. 2, the information input and output system 1 has a configuration that connects PDP 2, scanner 6, printer 7, video player 8 to computer 5 respectively so as to control the entire system using the computer 5. Further, a controller 10 is connected to the computer 5. The controller 10 is used for a coordinate input device 3 that performs computation of coordinates of position in an information input area 3a indicated by a pointer member such as a pen and an indicator object such as a fingertip. Further, the coordinate input device 3 is substantially connected to the computer 5 through the controller 10. The information input and output system 1 can be connected to a network 11 via the computer 5. The information input and output system 1 is capable of displaying data generated by the other computer connected on the network 11 on the PDP 2 or transferring data generated by the input and output system 1 to the other computers.

Figure 3:
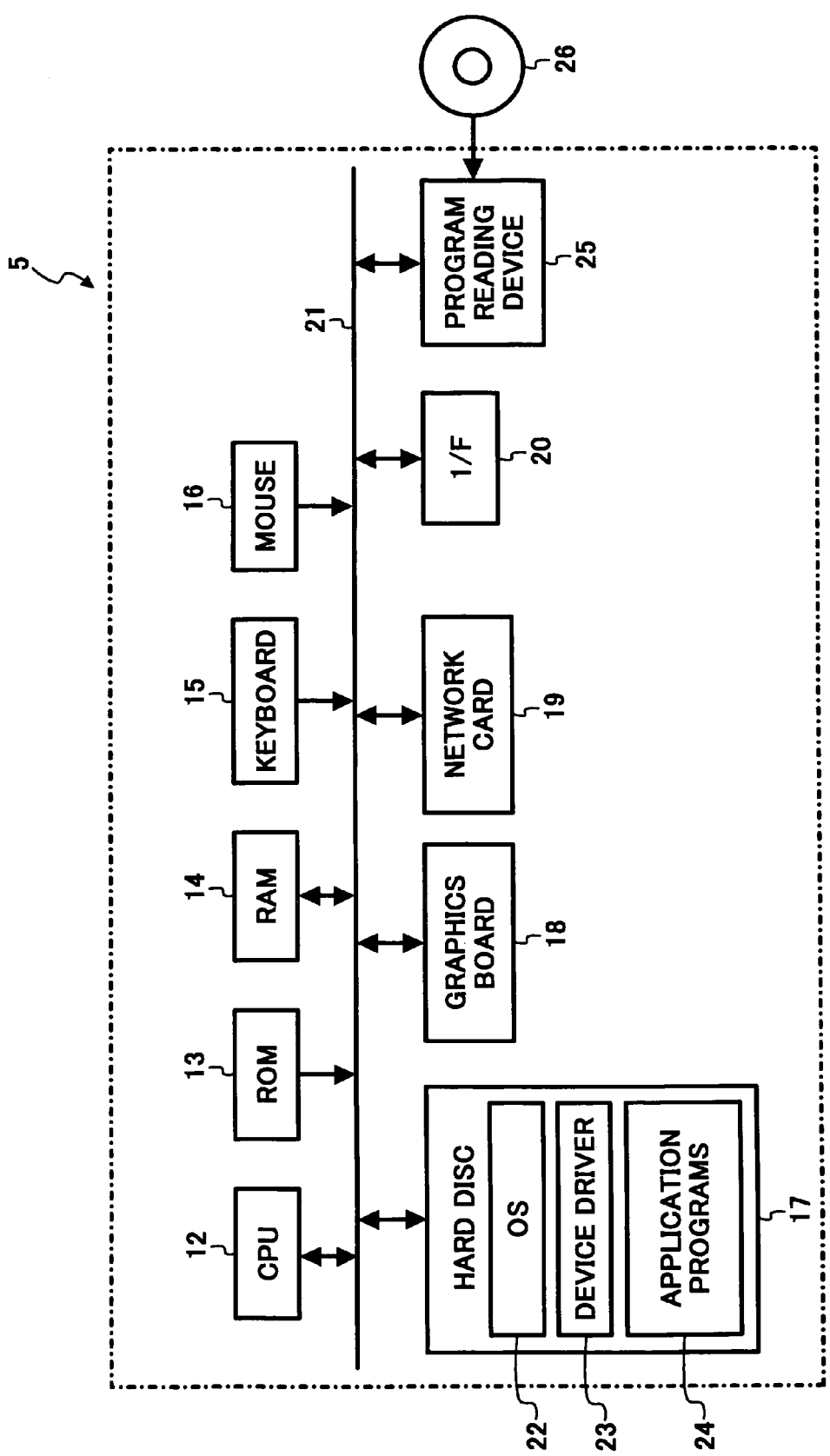
FIG. 3 is a block diagram showing electrical connections of the respective components built in a computer used in the information input and output system of FIG. 1.

The computer 5 is next explained. FIG. 3 is a block diagram showing the electrical connections of the respective components built in the computer 5. As illustrated in FIG. 3, a CPU 12, a ROM 13, a RAM 14, a keyboard 15, a mouse 16, a hard disc 17, a graphics board 18, a network card (or modem) 19, and an interface (I/F) 20 are connected. Here, the CPU 12 controls the entire system. The ROM 13 stores a startup program. The RAM 14 is used as a work area for CPU 12. The keyboard 15 is used to input characters, numerical values, various kinds of instructions through a given interface. The mouse 16 is used to carry out movement of a cursor, a range selection, etc. The hard disc 17 is a storage device. The graphics board 18 is connected to the PDP 2 to control the display of image on the PDP 2. The network card (or modem) 19 is used for connection to the network 11. The interface (I/F) 20 is used for connections to controller 10, scanner 6, printer 7.

The hard disk 17 stores an operating system (OS) 22, a device driver 23, and various kinds of application programs 24. The device driver 23 causes the coordinate input device 3 to be operated on the computer 5 through the controller 10. The application programs 24 include graphing software, word processing software, spreadsheet software, presentation software, calibration software, and the like.

Furthermore, the computer 5 is equipped with a reading device 25 that reads a program code (control program) recorded on a recording medium 26 that stores OS 22, device driver 23, and various kinds of application programs 24. In addition, the recording medium includes various kinds of media such as a flexible disc, a hard disc, an optical disc (CD-ROM, CD-R, CD-R/W, DVD-ROM, DVD-RAM, etc), a magneto-optical disc (MO), a memory card, and so on. Further, as the reading device 25, there can be used a flexible disc drive, a CD-ROM drive device, an MO drive device, and so on according to a recording format for the recording medium 26.

The various kinds of application programs 24 are executed by the CPU 12 under control of the OS 22 that starts in response to power supply to the computer 5. For example, in the case where graphing software is launched by a given operation of the keyboard 15 and the mouse 16, a predetermined image, which is formed based on the graphing software, is displayed on the PDP 2 through the graphics board 18. Further, the device driver 23 is started with the OS 22, enabling data input from the coordinate input device 32 through the controller 10. There is a case that a user traces characters and graphics with the pointer member including the user's finger(s) to perform drawing on an information input area 3a of the coordinate input device 3 in a state in which the drawing software thus launched. In this case, coordinate data, as an image data, on the locus of movement of the pointer member is input to the computer 5. Then, for example, a line that connects the locus of movement of the pointer member is superimposed and displayed as an over-written image on the image on the screen displayed by the PDP 2. Or, among the images displayed on the PDP 2, the image of the area, which connects the locus of movement of the pointer member, is erased. The position on a screen 2a of PDP 2 where the image is superimposed and displayed or erased is designed to be superimposed on the position of portion, which is drawn when the user traces in the information input area 3a by use of the pointer member.

The following specifically explains an example showing a case in which lines and characters are written over the displayed image. The CPU 12 of computer 5 generates graphic information for drawing lines and characters based on input image data. The graphic information generated is written on a video memory (not shown) provided on the graphics board 18 in accordance with position information based on input coordinate information. Thereafter, the graphics board 18 transmits drawing information, as an image signal, written on the video memory to the PDP 2, and thereby displays the same character as the character written by the user on the PDP 2. Namely, since the computer 5 recognizes the coordinate input device 3 as a pointing device such as mouse 16, the computer 5 performs the same processing as the case in which the character is written on the graphing software by the mouse 16.

An explanation is next given of the coordinate input device 3. Various types, each having a different detection format, can be considered as the coordinate input device 3 that is applicable to the information input and output system 1 of this embodiment. For example, a touch panel is one of them to perform mechanical and electrical detection of coordinates of position on the screen 2a (information input area 3a) of PDP 2 pointed out by the pointer member.

However, in connection with the coordinate input device 3 that optically detects the coordinate of position indicated, the following gives five examples, each having a different detection format, to explain the configuration and principle as preferable examples.

A. First Coordinate Input Device

First, a first coordinate input device 3A is explained based on FIGS. 4 to 8. The first coordinate input device 3A is one that uses the so-called retroreflected light shielding method.

Figure 4:
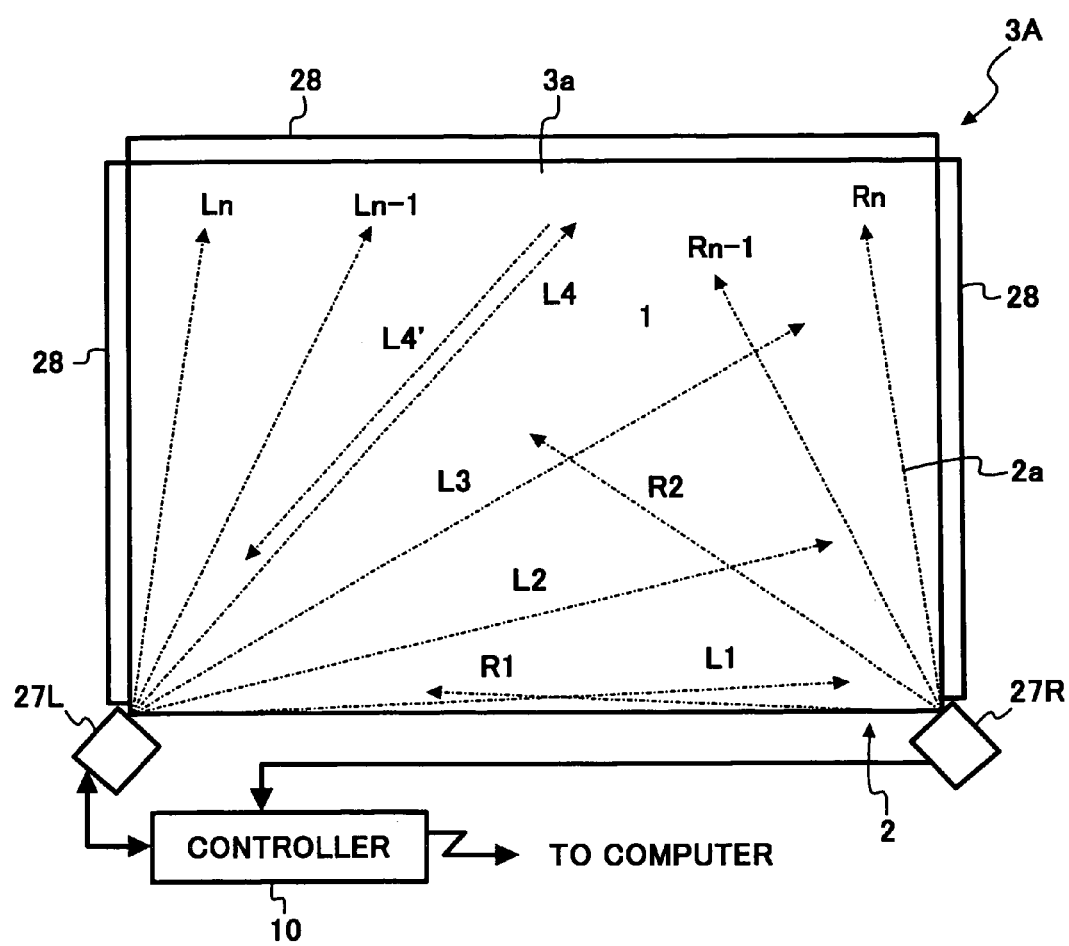
FIG. 4 is a view schematically showing the configuration of a first coordinate input device.

Here, FIG. 4 is an explanatory view schematically showing the configuration of the first coordinate input device 3A. As shown in FIG. 4, the first coordinate input device 3A has the information input area 3a with an oblong square shape corresponding to the size of the screen 2a of PDP 2. The information input area 3a is an area where tracing is performed with the user's finger(s) to make it possible to input the characters and graphics. In the vicinity of corners positioned at lower both ends of the information input area 3a, there are provided optical units 27 (left optical unit 27L and right optical unit 27R) at a given mounting angle to carry out light emission and light reception. These optical units 27 are in the same or substantially the same plane, and project a thin and fan-shape beam film, which is composed of the flux of light (probe light), for example, $L_1, L_2, L_3, \ldots$ ($R_1, R_2, R_3, \ldots$). The beam film is projected in parallel along the surface of the screen 2a of PDP 2 to be spread all over the information input area 3a.

Further, retroreflecting members 28 are provided at peripheral portions except the lower portion of the information input area 3a of coordinate input device 3. The retroreflecting member 28 has a numerous conic corner cubes each having a characteristic that reflects incident light onto a predetermined position regardless of the incident angle. For example, probe light projected from the left optical unit 27L is reflected by the retroreflecting member 28 and the reflected light, as a retroreflected light L3' that passes through the same optical path again, is received by the left optical unit 27L. Namely, the information input area 3a is also formed by the retroreflecting member 28.

Figure 5:
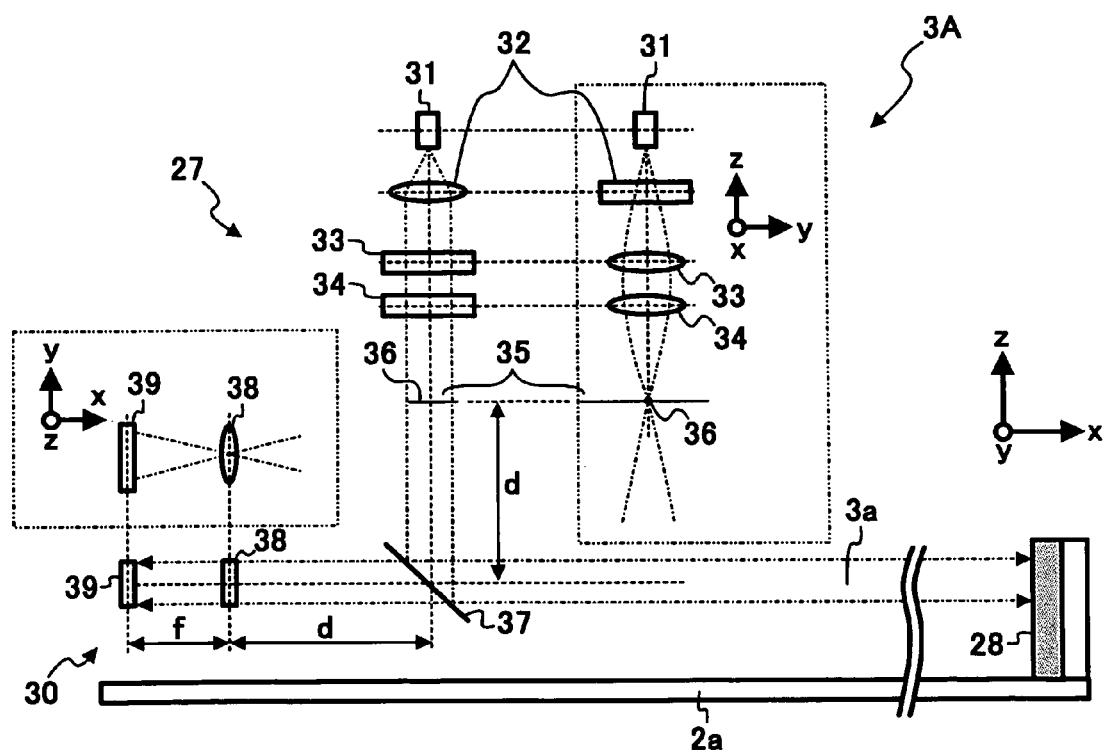
FIG. 5 is a view schematically showing the structure of an optical unit.

The optical units 27 are next explained. FIG. 5 is a block diagram schematically showing the configuration of optical unit 27. In FIG. 5, the structural components are mainly shown from an x-z direction. However, regarding the part shown by the two dot chain line, the same structural components may be seen from a different direction (x-y direction or y-z direction).

As shown in FIG. 5, the optical unit 27 includes light projecting means and light receiving means 30. The light projecting means has light sources 31 such as an LD (Light Diode) capable of reducing a spot to some degrees and a pin point LED (Light Emitting Diode). Light with which the screen 2a of LPD 2 is vertically irradiated from the light sources 31 is collimated in an x-direction by a cylindrical lens 32 that is capable of changing a magnification in only one direction. The light collimated in the x-direction by the cylindrical lens 32 is converged in the y-direction by two cylindrical lenses 33 and 34 that cross at right angles with the cylindrical lens 32 in the curvature distribution. Namely, by the function of the cylindrical lens group (cylindrical lenses 32, 33, 34), an area where light from the light source 31 is linearly condensed is formed at the back of the cylindrical lens 34. Here, it is assumed that a slit plate 35 with a slit, which is narrow in the y-direction and long in the x-direction, is provided. Accordingly, light that has passed through the cylindrical group (cylindrical lenses 32, 33, 34) forms a linear secondary light source 36 at the position of slit plate 35. Light emitted from the secondary light source 36 is reflected by a half mirror 37 and results in a parallel light along the screen 2a without being spread in the perpendicular direction of the screen 2a of PDP 2. Then, the light becomes a beam film of light spreading out fan-wise from the secondary light source 36 and travels through the information input area 3a in parallel with the screen 2a. In other words, the fan-shaped light forms the information input area 3a. The cylindrical group (cylindrical lenses 32, 33, 34) and slit plate 35 forms a converging optical system.

As mentioned above, the fan-shaped beam film traveled through the information input area 3a is recursively reflected by the retroreflecting member 28 and passes through the same optical path again, and returns to the half mirror 37. Accordingly, the beam film recursively reflected by the retroreflecting member 28 also forms the information input area 3a.

The light retroreflected by the retroreflecting member 28 and returned to the half mirror 37 is incident on the light receiving means 30 through the half mirror 37. The retroreflected light incident on the light receiving means 30 is linearly shaped through the cylindrical lens 38, which is a condensing lens. Thereafter, the linearly shaped light is received at a position different for each probe light by a CCD 39 provided with an interval of distance f (focal length of the cylindrical lens 38) from the cylindrical lens 38. In addition, the CCD 39 of this embodiment is a one-dimensional CCD, and the number of pixels is 2048.

The retroreflected light reflected by the retroreflecting member 28 is not subjected to the function of cylindrical lens 38 in the z-axial direction, and reaches the CCD 39 as being collimated. Further, the retroreflected light propagates to converge to the center of the cylindrical lens in the direction parallel to the screen 2a of PDP 2. As a result, the light is subjected to the function of cylindrical lens 38 to form an image on the CCD 38 provided on the focal surface of cylindrical lens 38. A distribution of light intensity that depends on the presence or absence of the retroreflected light on the CCD 39 is thereby formed. Namely, in the case where the retroreflected light is shield by a pointer member P, a point where light intensity is low (peak point to be described later) is generated at a position corresponding to the retroreflected light shield on the CCD 39. The CCD 39 that has received the retroreflected light generates an electrical signal based on the light intensity distribution of the retroreflected light (probe light) to output to the controller 10. Additionally, as shown in FIG. 5, the secondary light source 36 and cylindrical lens 38 are respectively positioned with a distance d from the half mirror 37, and a conjugate relationship of position therebetween is established.

Figure 6:
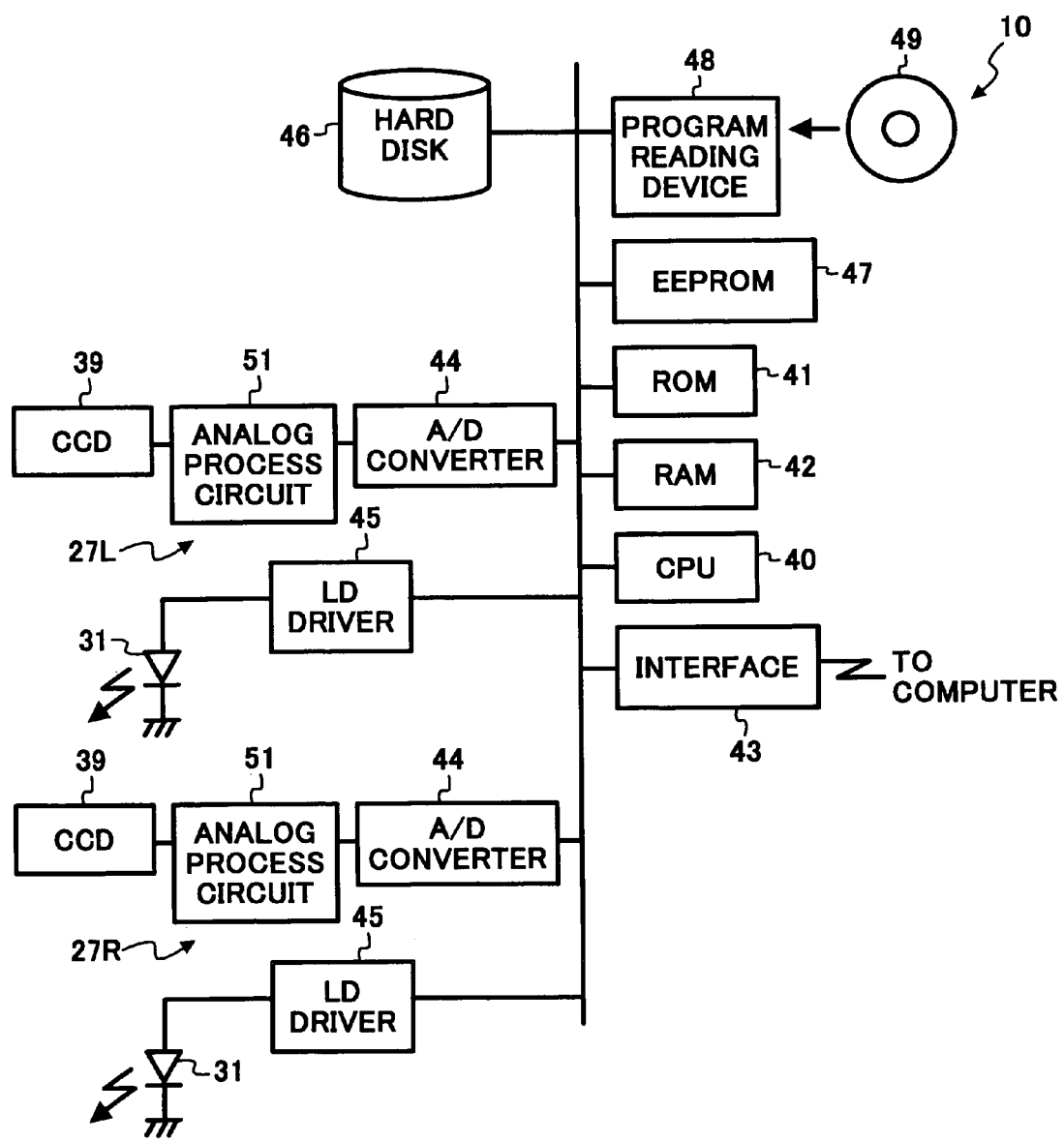
FIG. 6 is a block structural view of a controller.

FIG. 6 is a block diagram of controller 10. The controller 10 receives as an input an electrical signal from the CCD 39 based on the light intensity distribution of retroreflected light, and executes processing for specifying coordinates of the position where light traveling through the information input area 3a is shielded. The controller 10 performs light-emission control for light sources 31 (LD) of the optical units 27 (left optical unit 27L, right optical unit 27R) and calculation of outputs from the CCD 39 of the optical unit 27. As shown in FIG. 6, the controller 10 includes a CPU 40 that controls each component intensively. The CPU 40 is connected to ROM 41, RAM 42, interface 43, A/D converter 44, LD driver 45, hard disc 46, EEPROM 47, and program reading device 48 via a bus. The ROM 41 stores programs and data. The RAM 42 stores various kinds of data to be rewritable and functions as a work area. The interface 43 is used for connection to the computer 5. The A/D converter 44 performs signal conversion processing. The LD driver 45 is used to control light-emitting means. The hard disc 46 records various kinds of program codes (control programs). The EEPROM 47 is a nonvolatile memory. The program reading device 48 is used to read program codes (control programs) recorded on a recording medium 49. This includes a flexible disc drive device, a CD-ROM drive device, an MO drive device, and so on. Further, the recording medium 49 includes a flexible disc, a hard disc, an optical disc (CD-ROM, CD-R, CD-R/W, DVD-ROM, DVD-RAM), a magneto-optical disc (MO), a memory card, and so on.

An analog processing circuit 51, serving as a circuit that calculates outputs from the CCD 39, is connected to an output terminal of the CCD 39. Reflected light incident on the CCD 39 is converted into analog image data with a voltage value depending on the light intensity in the CCD 39, and is output as an analog signal. The analog signal is processed by the analog processing circuit 51, and converted into a digital signal by the A/D converter 44 to transmit to the CPU 40. Thereafter, the CPU 40 performs calculation of pointer member P two-dimensional coordinates.

The various kinds of programs (control programs) stored in the hard disc 46 or 49 are written onto the RAM 42 in response to the power supply to the controller 10, so that the various kinds of programs (control programs) are executed.

Sequentially, an explanation is given of processing that is executed by the CPU 40 based on the control programs. Here, the following explains coordinate detection processing that achieves characteristic functions of the coordinate input device 3.

Figure 7:
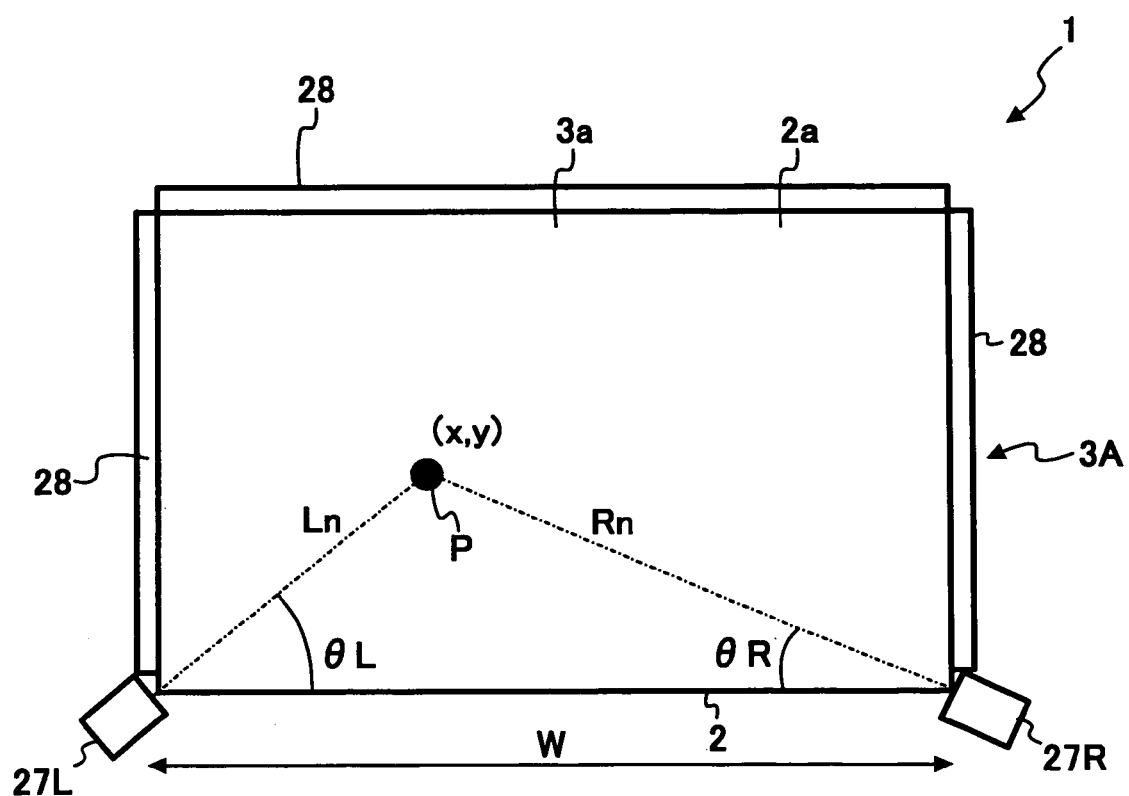
FIG. 7 is a view showing one example that one point in an information input area of a first coordinate input device is indicated by a pointer member.

FIG. 7 is a front view showing one example that one point of the information input area 3a of the coordinate input device 3 is indicated by the pointer member P. For example, among fan-shaped light composed of probe light $L_1$, $L_2$, $L_3$, . . . projected from the left optical unit 27L, when nth probe light $L_n$ is shielded by the pointer member P, the nth probe light $L_n$ does not reach the retroreflecting member 28.

Figure 8:
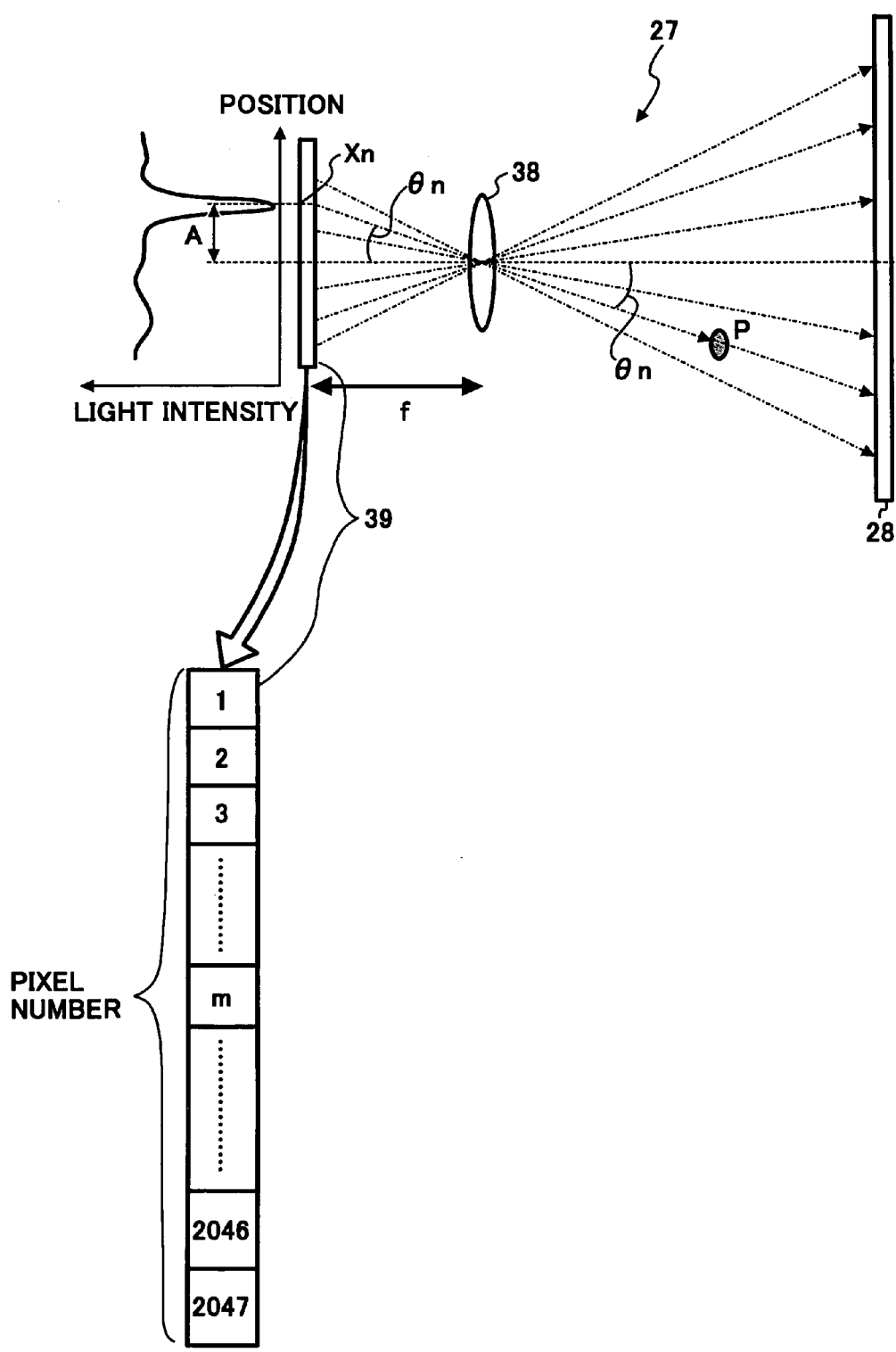
FIG. 8 is a view schematically showing a detecting operation of CCD.

A light intensity distribution on the CCD 39 obtained at this time is considered. FIG. 8 is a view schematically showing a detecting operation of CCD 39. If the pointer member P is not inserted onto the information input area 3a, the light intensity distribution on CCD 39 is substantially constant. However, if the pointer member P is inserted onto the information input area 3a and the probe light $L_n$ is shielded by the pointer member P as shown in FIG. 8, the probe $L_n$ is not received by the CCD 39 of optical unit 27. For this reason, a predetermined position $X_n$, which corresponds to the probe $L_n$, on the CCD 39 of optical unit 27, becomes an area (dark point) where light intensity is low. The position $X_n$ appears as a peak point on a density waveform of light output from the CCD 39. The CPU 40 recognizes the appearance of the peak point on the light intensity waveform based on the change in voltage, and detects the position $X_n$.

Further, the CPU 40 detects a distance between the $X_n$ of the dark point, which is the peak point of the light intensity waveform, and the central pixel of CCD 39 based on a pixel number of CCD 39 (for example, pixel number m in FIG. 8).

The position $X_n$ where the light intensity is low ($X_n L$ on the CCD 39 of left optical unit 27L and $X_n R$ on the CCD 39 of right optical unit 27R) corresponds to outgoing/incoming angle$è_n$ of the shielded probe light. The detection of Xn allows $è_n$ to be grasped. Namely, if a distance between position $X_n$ of the dark point and the central pixel of CCD 39 is A, $è_n$ can be expressed as a function of A as in the following equation (1):

$$è_n = \tan^{-1}(A/f) \tag{1}$$

where f is a focal distance of cylindrical lens 38.

Here, $è_n$ and A at the left optical unit 27L are replaced by $è_n L$ and $X_n L$, respectively.

In FIG. 7, based on a conversion factor g, which denotes the relationship of geometrical relative position between the left optical unit 27L and information input area 3a, an angleèL formed by the pointer member P and left optical unit 27L can be expressed by the following equation (2) as a function of $X_n L$ obtained by equation (1):

$$èL = g(è_n L) \tag{2}$$

where $è_n L = \tan^{-1}(X_n L/f)$.

Similarly, in connection with the right optical unit 27R, the symbol L in the aforementioned equations (1) and (2) is replaced by R, and based on a conversion factor h, which denotes the relationship of geometrical relative position between the right optical unit 27R and information input area 3a, an angleèR formed by the pointer member P and right optical unit 27R can be expressed by the following equation (3):

$$èR = h(è_n R) \tag{3}$$

where $è_n R = \tan^{-1}(X_n R/f)$.

Here, if the distance between the central position of CCD 39 of the left optical unit 27L and that of the right optical unit 27R is w as shown in FIG. 7, two-dimensional coordinates (x, y) of a point indicated by the pointer member P in the information input area 3a can be calculated by the following equations (4) and (5) based on the principle of triangulation:

$$x = w \cdot \tan èR/(\tan èL + \tan èR) \tag{4}$$

$$y = w \cdot \tan èL \cdot \tan èR/(\tan èL + \tan èR) \tag{5}$$

These equations (1) to (5) are prestored in the hard disc 46 and recording medium 49 as a part of a control program. The coordinates of position (x, y) of pointer member P can be calculated as functions of XnL, XnR by the equations (1) to (5). Namely, the position of the dark point on the CCD 39 of the left optical unit 27L and that of the right optical unit 27R are detected, thereby calculating the coordinates of position (x, y) of pointer member P.

The coordinates of position (x, y) of pointer member P thus calculated are input to the computer 5 through the controller 10 and the input data is used for predetermined processing.

Then, such coordinate input device 3A makes it possible to achieve non-parallax, complete transparency and high sense of drawing in the information input area 3a.

B. Second Coordinate Input Device

Figure 9:
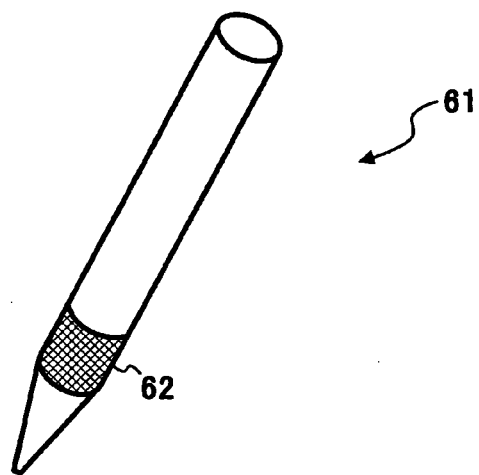
FIG. 9 is a perspective view showing a pointer member used in a second coordinate input device.
Figure 10:
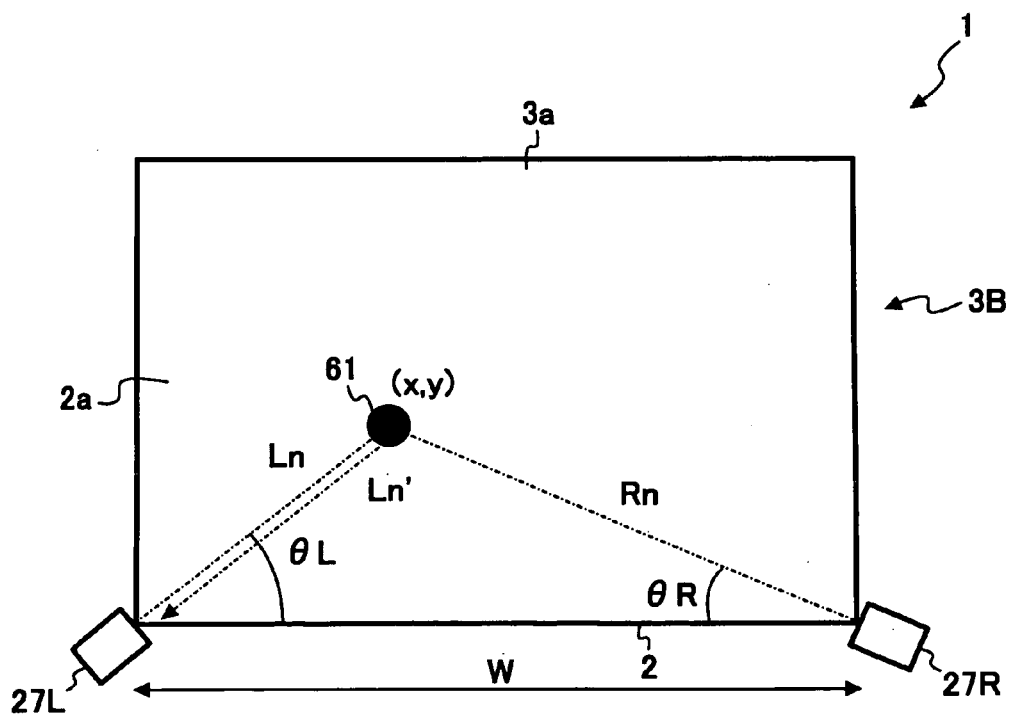
FIG. 10 is a view showing one example that one point in an information input area of the second coordinate input device is indicated by a pointer member.
Figure 11:
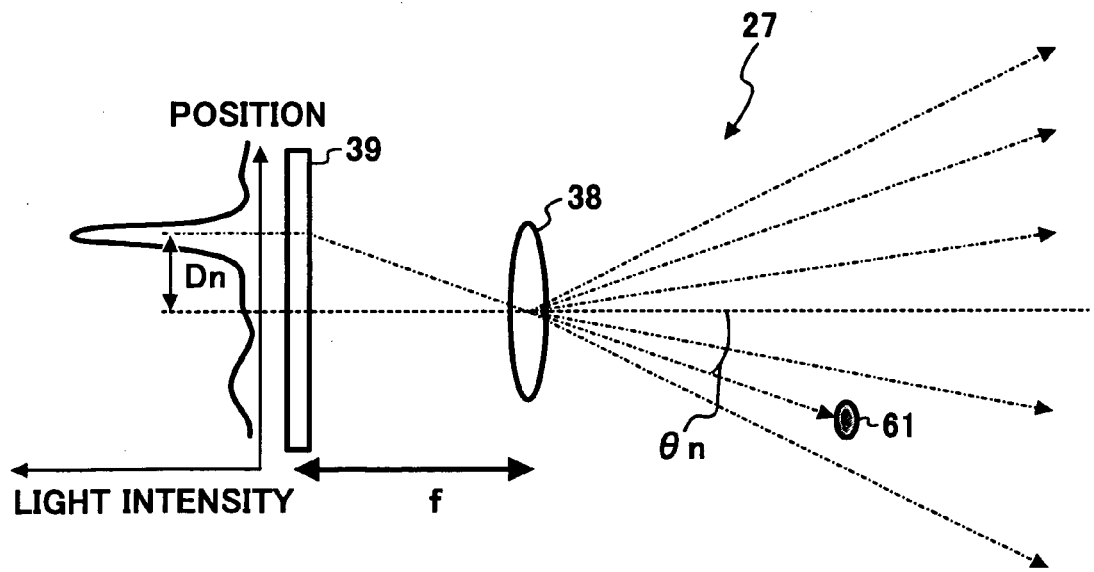
FIG. 11 is a view explaining a detecting operation of coordinates.

A second coordinate input device 3B is next explained based on FIGS. 9 to 11. Additionally, regarding the same sections as those of the first coordinate input device 3A, the same reference marks as those of the first coordinate input device 3A are added to the corresponding sections thereof, and the specific explanation is omitted.

The second coordinate input device 3B is the so-called retroreflection type coordinate input device.

FIG. 9 is a perspective view showing a pointing member 61 used in the coordinate input device 3B. Further, FIG. 10 is a front view of an example showing a case that one point of the information input area 3a of coordinate input device 3B is indicated by the pointing member 61. As shown in FIG. 9, a retroreflecting member 62 is formed close to the tip end of pointing member 61. The retroreflecting member 62 is provided with, for example, a numerous conic corner cubes each having a characteristic that reflects incident light to a predetermined position regardless of the incident angle. For example, probe light $L_n$ is projected from the left optical unit 27L is reflected by the retroreflecting member 62 and the reflected light, as a retroreflected light $L_n'$ that passes through the same optical path again, is received by the left optical unit 27L. For this reason, unlike the coordinate input device 3A, the coordinate input device 3B eliminates the need for providing the retroreflecting member 28 in the information input area 3a. Additionally, it is desirable that the pointer member 61 should have a pen-like shape and material of such as rubber, plastic, etc rather than a lustrous metal.

The portion close to the tip end of pointer member 61 having the retroreflecting member 62 is inserted onto an appropriate position (x, y) of the information input area 3a of coordinate input device 3B. For example, in the case where probe light $L_n$ of fan-shaped light projected from the left optical unit 27L is reflected by the retroreflecting member 62, the retroreflected light $L_n'$ is received by the CCD 39 of the left optical unit 27L. In the case where CCD 39 thus receives the retroreflected light $L_n'$, a predetermined position Dn, which corresponds to the retroreflected light $L_n'$, on the CCD 39, becomes an area (light point) where light intensity is high. Namely, as shown in FIG. 11, an area where light intensity is high is generated at the position Dn on the CCD 39, and a peak appears on the density distribution waveform of light from the CCD 39. The position Dn where the peak appears corresponds to outgoing/incoming angle$è_n$ of the reflected probe light, and the detection of Dn allows $è_n$ to be grasped. Namely, in the coordinate input device 3B, the coordinates of position (x, y) of the pointer member 61 can be calculated using the triangulation techniques based on the peak appearing on the light intensity waveform, similar to the aforementioned coordinate input device 3A.

The coordinates of position (x, y) of pointer member 61 thus calculated are input to the computer 5 through the controller 10 and the input data is used for predetermined processing.

Then, such coordinate input device 3B makes it possible to achieve non-parallax, complete transparency and high sense of drawing in the information input area 3a. Additionally, instead of the aforementioned pointer member 61, the user's finger(s) can be used as indicating means.

C. Third Coordinate Input Device

Figure 12:
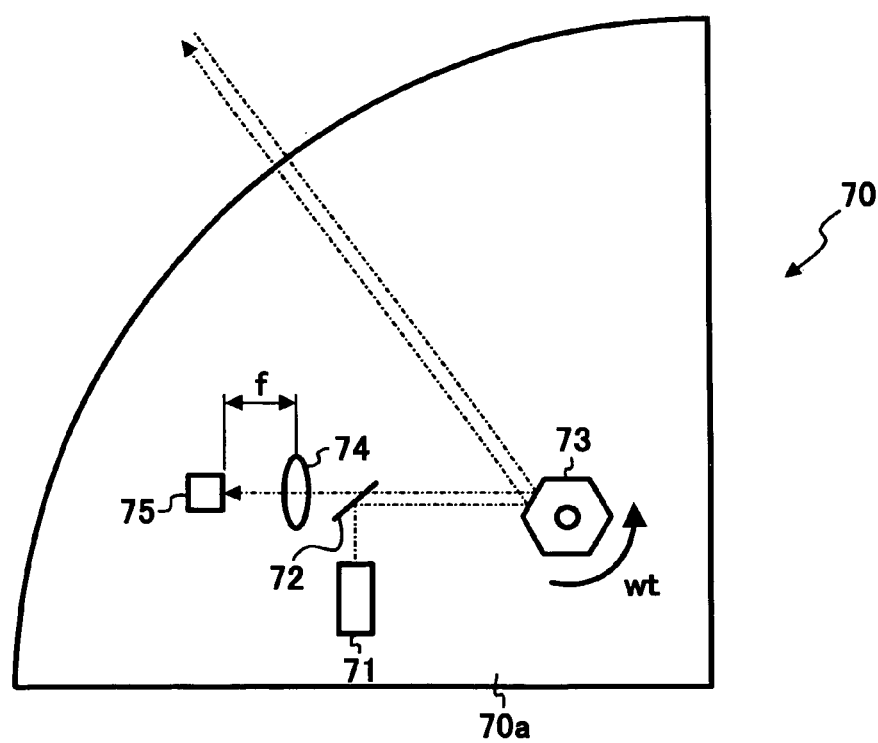
FIG. 12 is a view schematically showing an optical unit used in a third coordinate input device.
Figure 13:
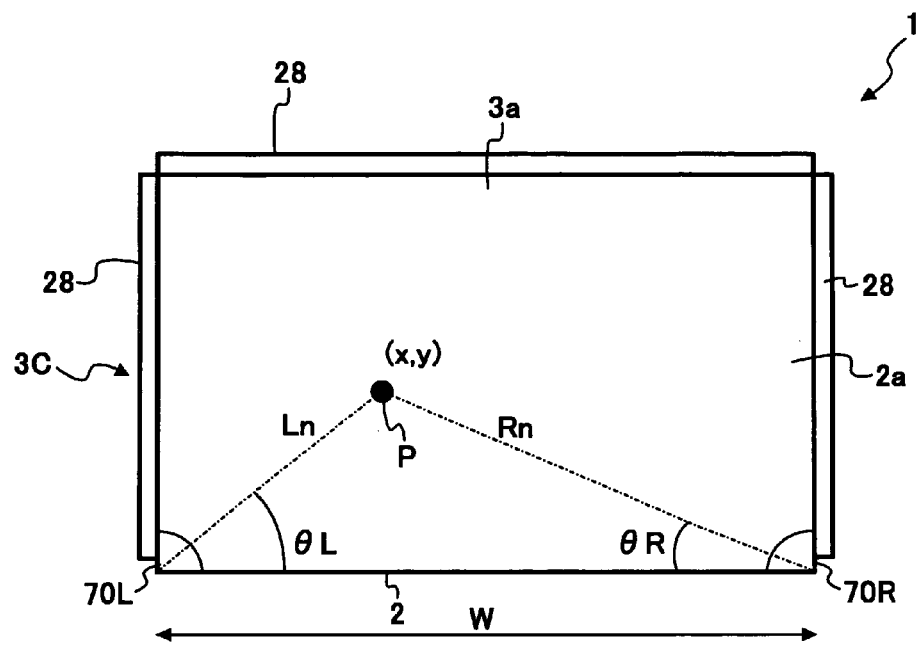
FIG. 13 is a view showing one example that one point in an information input area of the third coordinate input device is indicated by a pointer member.
Figure 14:
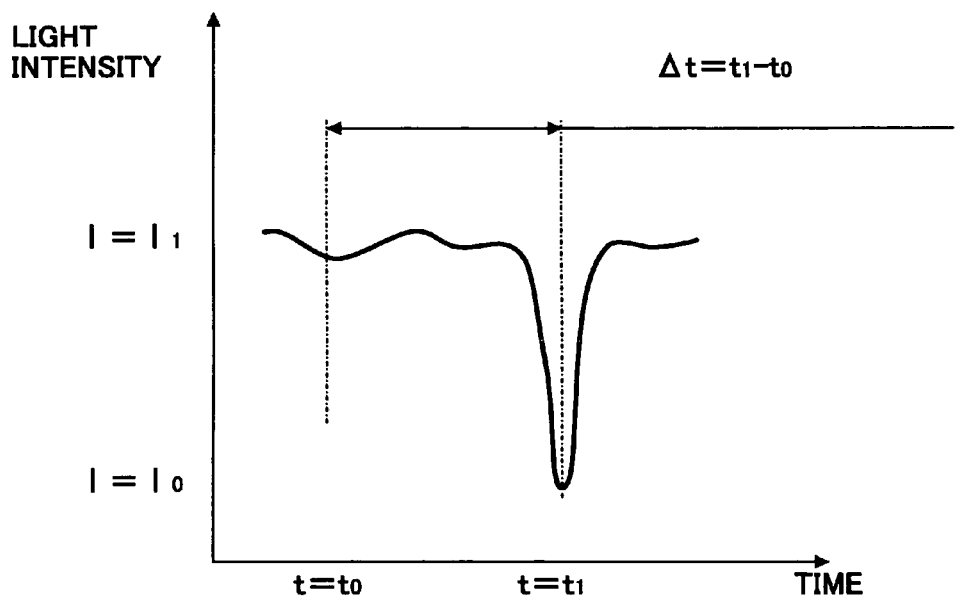
FIG. 14 is a graph showing the relationship between light intensity and time.

A third coordinate input device 3C is next explained based on FIGS. 12 to 14. Additionally, regarding the same sections as those of the first coordinate input device 3A, the same reference marks as those of the first coordinate input device 3A are added to the corresponding sections thereof, and the specific explanation is omitted.

The third coordinate input device 3C is a modification of the optical units used in the first coordinate input device 3A. In the optical units 27 used in the first coordinate input device 3A, the fan-shape beam film is projected to form the information input area. In contrast to this, the third coordinate input device 3C uses an optical unit 70. The optical unit 70 has a rotational scanning system such as a polygon mirror, etc. The rotational scanning system radically projects an optical beam emitted from the light source to form an information input area.

FIG. 12 is a plane view showing the optical unit 70 schematically. The optical unit 70 comprises an LD (Laser Diode) 71, which is a light source that has a driving circuit (not shown) and emits a laser beam, projecting means 70a composed of a half mirror 72, a polygon mirror 73, condensing lens 74, and a light-receiving element 75. The light-receiving element 75 includes a PD (Photo Diode) formed with an interval of distance f (focal distance of the condensing lens 74) from the condensing lens 74. In the optical unit 70, the laser beam emitted from the LD 71 reflected by the half mirror 72 and the resultant beam light is sequentially reflected radically by the polygon mirror 73 that is rotatably driven at each given velocity ù t by a pulse motor (not shown). Accordingly, the optical unit 70 repeatedly projects the beam light radically. Namely, the information input area 3a is formed by beam light radically projected from two optical units 70 (70L and 70R). While, the beam light, which has been made incident on the optical unit 70 by reflection, is reflected by the polygon mirror 73 and reaches the half mirror 72. The reflected beam light, which has reached the half mirror 72, passes through the half mirror 72 and reaches the light receiving element 75, thereby being converted into an electrical signal.

An explanation is next given of the coordinate input device 3C to which the aforementioned optical units 70 are applied in place of the optical units 27 used in the first coordinate input device 3A. As shown in FIG. 13, in the case where a pointer member P is inserted at a certain position of the information input area 3a and a certain beam light is shield, the beam light is not reflected by the retroreflecting member 28. For this reason, the beam light does not reach the light receiving element 75. In this case, a dip appears on the intensity distribution waveform of light from the light receiving element 75.

The electrical connections of the respective components are technically well-known, and the specific example is omitted. However, as shown in FIG. 14, in the case where the pointer member P is not inserted onto the information input area 3a, the light intensity shows "$I=I_1$." In the case where in the case where the pointer member P is inserted onto the information input area 3a and the retroreflected light is not returned to the light receiving element 75, the light intensity shows "I=$I_0$". A portion where the light intensity shows "I=$I_0$" is a dip. Additionally, in FIG. 14, time t=$t_0$ is a reference position of the rotation of polygon mirror 73 and shows a point when the beam light with which rotational scanning is performed reaches a predetermined angle.

Accordingly, if time t at which the light intensity is "I=$I_0$" is $t_0$, an outgoing angle of the beam light èshielded by the pointer member P inserted onto the information input area 3a is calculated by the following equation:

$$è=\dot{u}(t_1-t_0)=\dot{u}t$$

Namely, in the optical units 70 provided right and left (70L, 70R), the outgoing angles (è$n_L$, è$n_R$) of the beam light èshielded by the pointer member P inserted onto the information input area 3a are calculated. Then, the coordinates of position (x, y) at which the pointer member P is inserted can be calculated using the triangulation techniques based on these outgoing angles è(è$n_L$, è$n_R$).

The coordinates of position (x, y) of pointer member 61 thus calculated are input to the computer 5 through the controller 10 and the input data is used for predetermined processing.

Then, such coordinate input device 3C makes it possible to achieve non-parallax, complete transparency and high sense of drawing in the information input area 3a.

D. Fourth Coordinate Input Device

Figure 15:
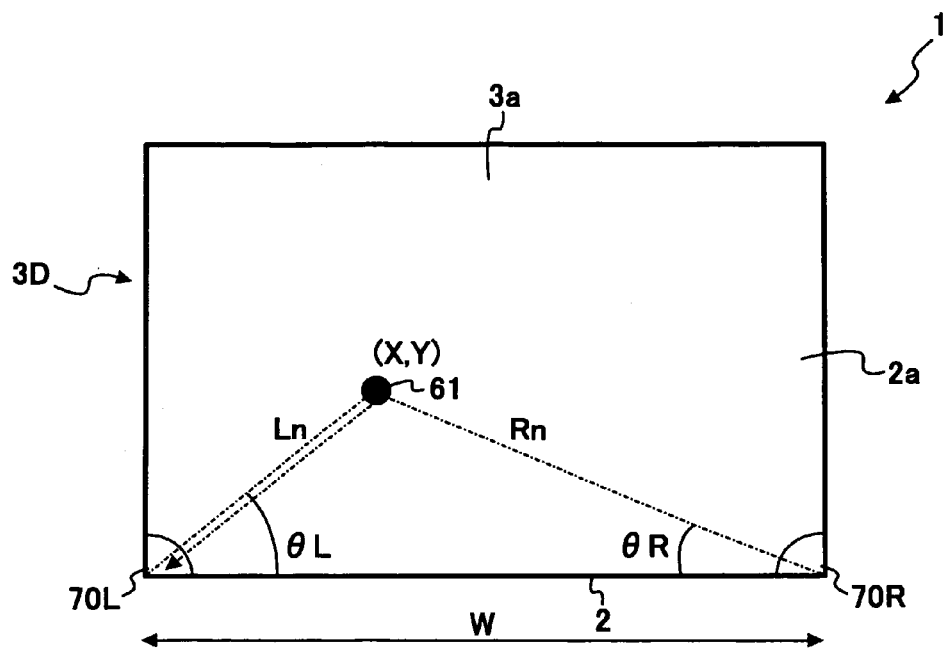
FIG. 15 a view showing one example that one point in an information input area of a fourth coordinate input device is indicated by a pointer member.
Figure 16:
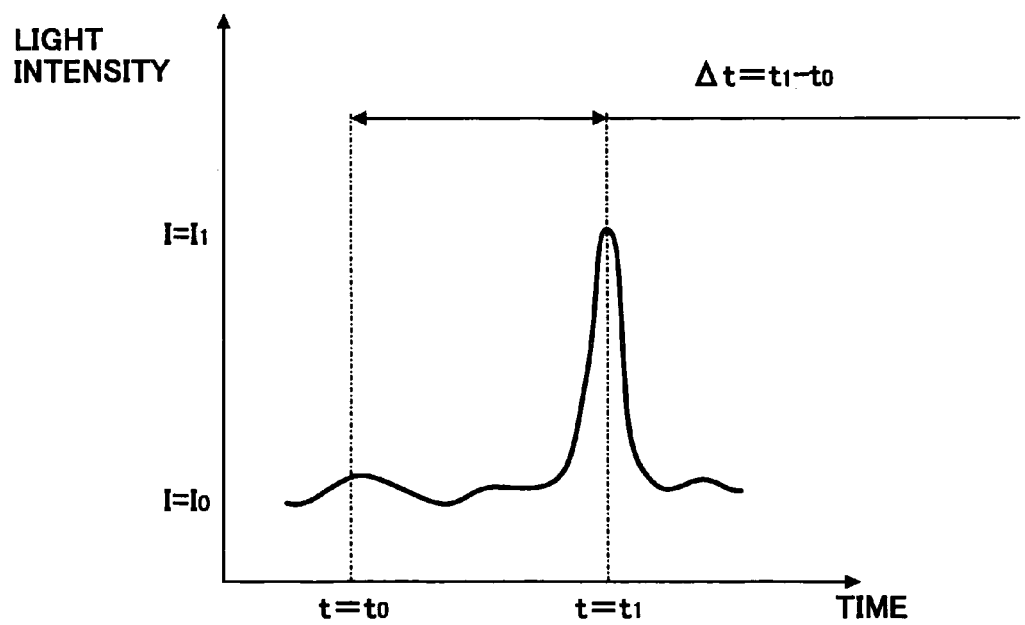
FIG. 16 is a graph showing the relationship between light intensity and time.

A fourth coordinate input device 3D is next explained based on FIGS. 15 and 16.

Regarding the same sections as those of the second and third coordinate input devices 3B and 3C, the same reference marks as those of the second and third coordinate input devices 3B and 3C are added to the corresponding sections thereof, and the specific explanation is omitted.

The fourth coordinate input device 3D is a modification of the optical units used in the second coordinate input device 3B. In the optical units 27 used in the second coordinate input device 3B, the fan-shape beam film is projected to form the information input area. In contrast to this, the fourth coordinate input device 3D uses an optical unit 70. The optical unit 70 has a rotational scanning system such as a polygon mirror, etc. The rotational scanning system radically projects an optical beam emitted from the light source to form an information input area. In addition, since the explanation of optical unit 70 has been made in the third coordinate input device 3C, the explanation is omitted.

An explanation is next given of the coordinate input device 3D to which the aforementioned optical units 70 are applied in place of the optical units 27 used in the second coordinate input device 3B. As shown in FIG. 15, in the case where the pointer member 61 is inserted at a certain position of the information input area 3a, a given beam light is retroreflected by the retroreflecting member 62 of the pointer member 61, so that the beam light reaches the light receiving element 75. In this way, when the pointer member 61 is inserted at the certain position of the information input area 3a and the given beam light is retroreflected, a peak appears on the intensity distribution waveform of light from the light receiving element 75.

The electrical connections of the respective components are technically well-known, and the specific example is omitted. However, as shown in FIG. 16, in the case where the pointer member 61 is not inserted onto the information input area 3a, the light intensity shows "I=$I_0$." In the case where in the case where the pointer member 61 is inserted onto the information input area 3a and the retroreflected light reaches the light receiving element 75, the light intensity shows "I=$I_1$." A portion where the light intensity shows "I=$I_1$" is a peak. Additionally, in FIG. 16, time t=$t_0$ is a reference position of the rotation of polygon mirror 73 and shows a point when the beam light with which rotational scanning is performed reaches a predetermined angle.

Accordingly, if time t at which the light intensity is "I=$I_1$" is $t_1$, an outgoing angle of the beam light èshielded by the pointer member 61 inserted onto the information input area 3a is calculated by the following equation:

$$è=\dot{u}(t_1-t_0)=\dot{u}t$$

Namely, in the optical units 70 provided right and left (70L, 70R), the outgoing angles (è$n_L$, è$n_R$) of the beam light retroreflected by the pointer member 61 inserted onto the information input area 3a are calculated. Then, the coordinates of position (x, y) at which the pointer member 61 is inserted can be calculated using the triangulation techniques based on these outgoing anglesè (è$n_L$, è$n_R$).

The coordinates of position (x, y) of pointer member 61 thus calculated are input to the computer 5 through the controller 10 and the input data is used for predetermined processing.

Then, such coordinate input device 3D makes it possible to achieve non-parallax, complete transparency and high sense of drawing in the information input area 3a.

E. Fifth Coordinate Input Device

Figure 17:
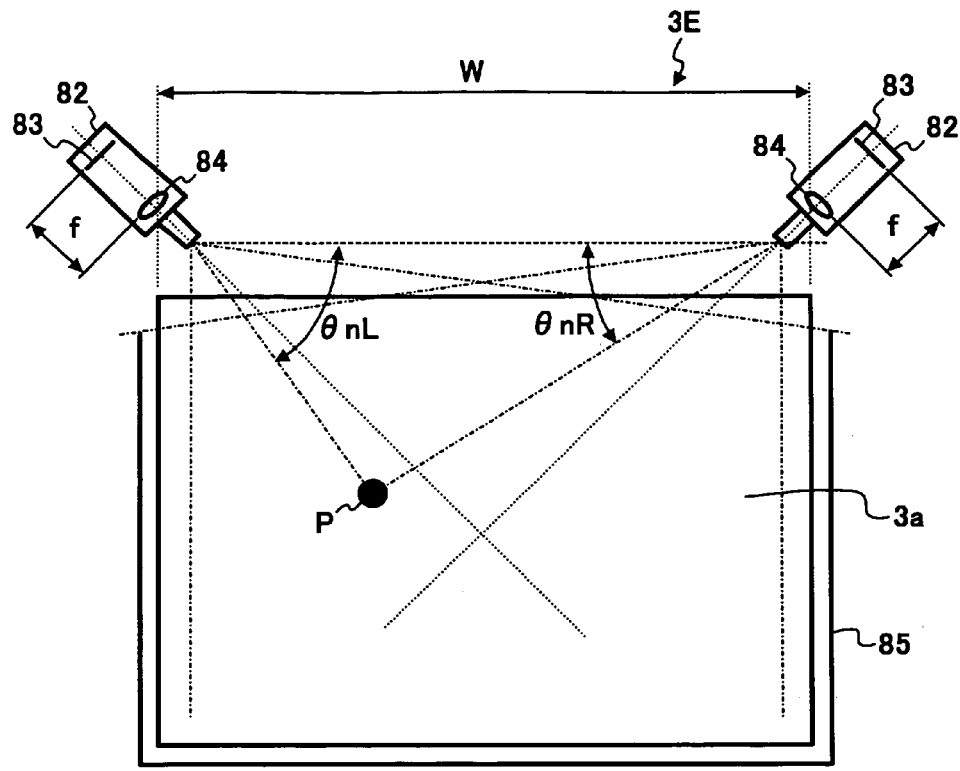
FIG. 17 a view schematically showing the configuration of a fifth coordinate input device.
Figure 18:
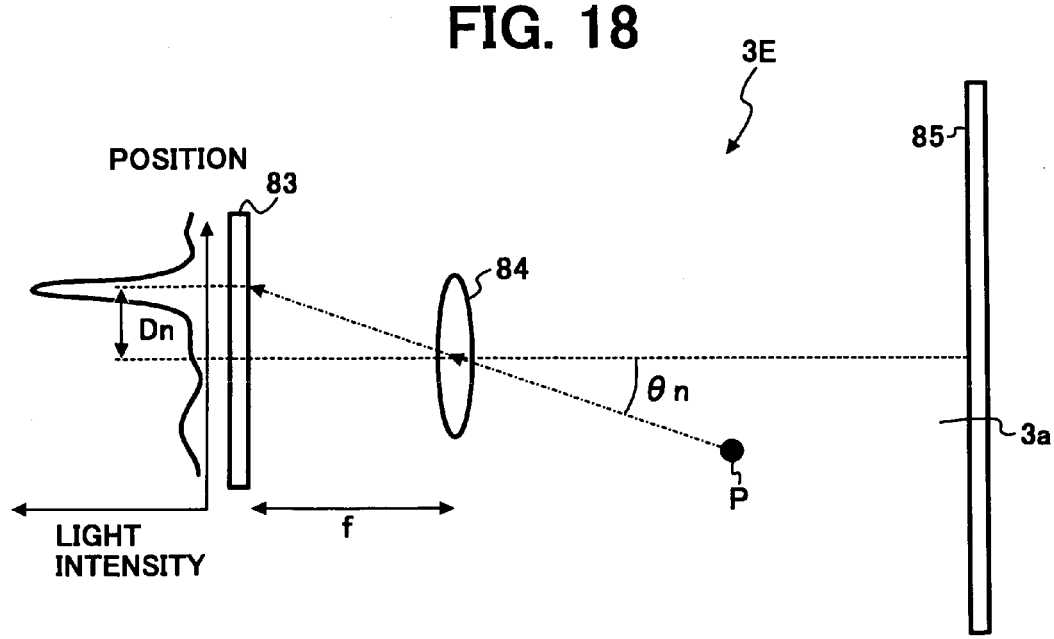
FIG. 18 is a view explaining a detecting operation of coordinates.

A fifth coordinate input device 3E is next explained based on FIGS. 17 and 18.

The coordinate input device 3E is the so-called coordinate input device using a camera image-pickup system, which captures image information of an information input area by an image-pickup camera to detect position information based on a part of the image information.

FIG. 17 is a front view showing the configuration of the fifth coordinate input device 3E schematically. At the upper both end portions of the information input area 3a of the fifth coordinate input device 3E, an image pickup camera 82, serving as image pickup means, is provided with a distance w. The image pickup camera 82 has a light receiving element 83, which is a CCD (Charge Coupled Device), and an imaging optical lens 84 with a distance f. An angle of view for the image pickup camera 82 is about 90 degrees such that the information input area 3a is set as an imaging range. The image pickup camera 82 is placed with a predetermined distance from the screen 2a of PDP 2 that forms a coordinate input surface, and its optical axis is parallel with the screen 2a of PDP 2.

Further, a back plate 85 is provided at the position, which is a peripheral edge except the upper portion of information input area 3a, and which covers the entire field of view without preventing the angle of view for the image pickup camera 82. The face of back plate 85 is directed to the center of the information input area 3a to be perpendicular to the screen 2a of PDP 2. The back plate 85 is uniformly, for example, black.

The relationship between a signal from the image pickup camera 82 and the pointer member P is shown by FIG. 18. As shown in FIG. 18, in the case where the pointer member P is inserted onto the information input area 3a, the pointer member P is photographed by the image pickup camera 82 and an image of the pointer member P is formed on the light receiving element 83 of image pickup camera 82. In the case where the back plate 85 is black and fingers are used as pointer member P as in the fifth coordinate input device 3E, the pointer member P has a high reflectance as compared with the back plate 85. Accordingly, a portion corresponding to the pointer member P of light receiving member 83 becomes an area where light intensity is high (light point).

The electrical connections of the respective components are technically well-known, and the specific example is omitted. However, as shown in FIG. 18, in the case where the pointer member P is inserted onto the information input area 3a, a peak appears on the density distribution waveform of light from the light receiving element 83. The position Dn where the peak appears corresponds to an apparent angle è$_n$ of pointer member P from a main point of the imaging optical lens 84. The angle è$_n$ can be expressed as a function of Dn by the following equation:

$$è n = \arc \tan(Dn/f)$$

Namely, in the case of the fifth coordinate input device 3E, the coordinates of position (x, y) of the pointer member P can be calculated using the triangulation techniques based on the peak appearing on the light intensity waveform, similar to the aforementioned coordinate input device 3A.

The coordinates of position (x, y) of pointer member P thus calculated are input to the computer 5 through the controller 10 and the input data is used for predetermined processing.

In addition, a dedicated pen with a light emitting element that emits by itself can be used as pointer member P.

Then, such coordinate input device 3E makes it possible to achieve non-parallax, complete transparency and high sense of drawing in the information input area 3a.

An operation is next given of the processing relating to the characteristic function, which the information input and output system 1 has, among processing of the drawing software, which is one of various kinds of application programs 24 executed by the information input and output system 1 of this embodiment. Additionally, regarding the same processing as the processing carried out by the conventional information input and output system, the explanation is omitted.

Figure 19:
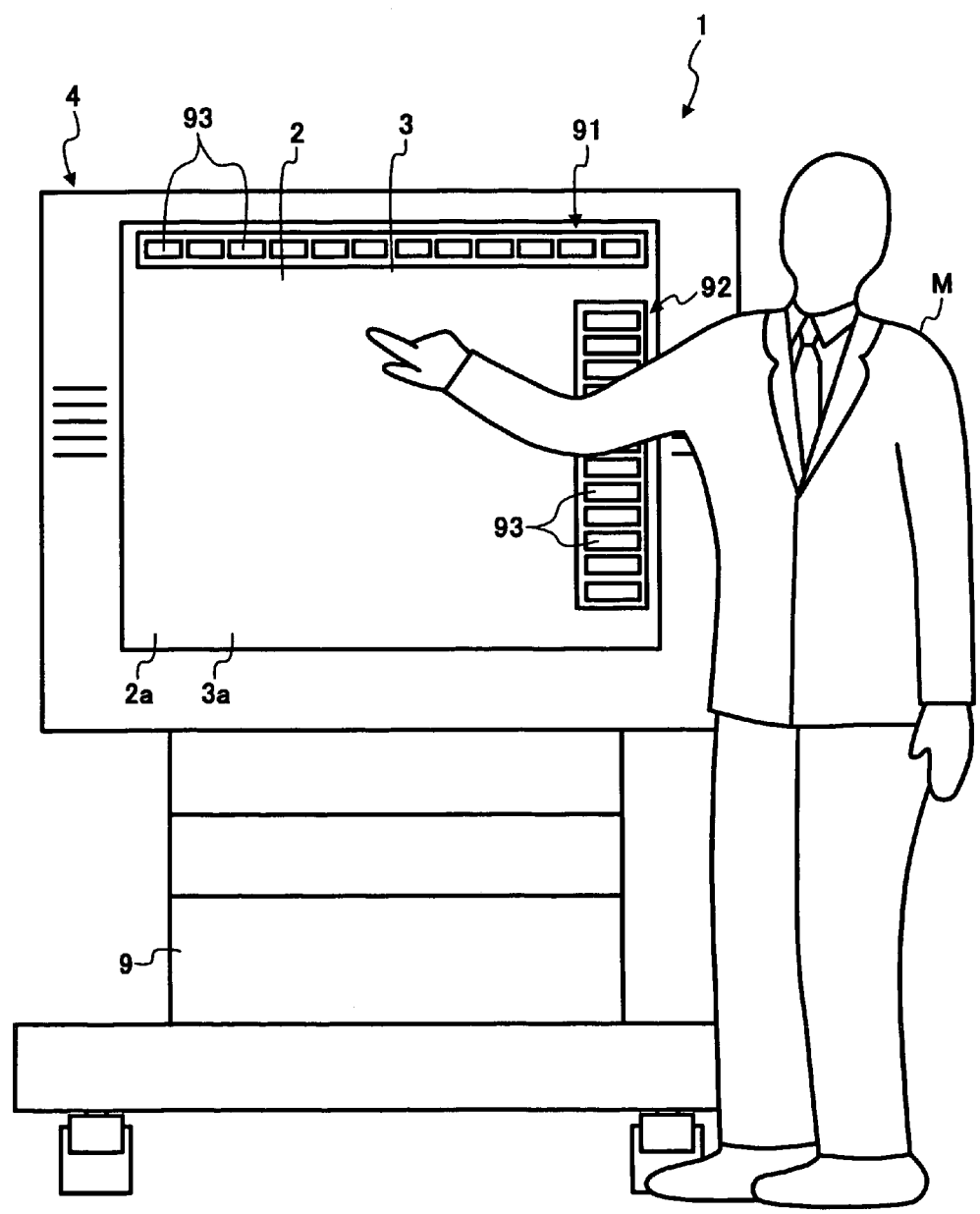
FIG. 19 is a view explaining an icon operation.

As shown in FIG. 19, in the drawing software, tool bars 91 and 92, which are capable of operating various kinds of functions, are displayed. When the position where the respective icon 93 included in the tool bars 91 and 92 is displayed is indicated by the user's fingers, the coordinate input device 3 detects the position coordinate so that the icon 93 is clicked.

However, the screen 2a is a large size of such as 40 inches or 50 inches, and the tool bars 91 and 92 are generally displayed at upper and lower or right and left ends of the screen 2a. For this reason, a user M must stretch his/her limbs largely, or walk to the display position where a desired icon 93 is displayed every time when clicking the icon 93. Or, in the case where the user performs operations while sitting on the chair, the user must specially stand up from his/her chair, causing problems that the operations are extremely complicated.

Accordingly, the drawing software performs the various kinds of processing explained below to improve operationality. In other words, the drawing software displays various operation images on the screen 2a in response to various operations on the screen 2a that the user performs with his/her fingers.

Here, the operation images refer to graphics displayed on the screen and the user performs a predetermined operation to the graphics with his/her fingers. The information input and output system 1 receives the performance of various operations by the user.

Figure 20:
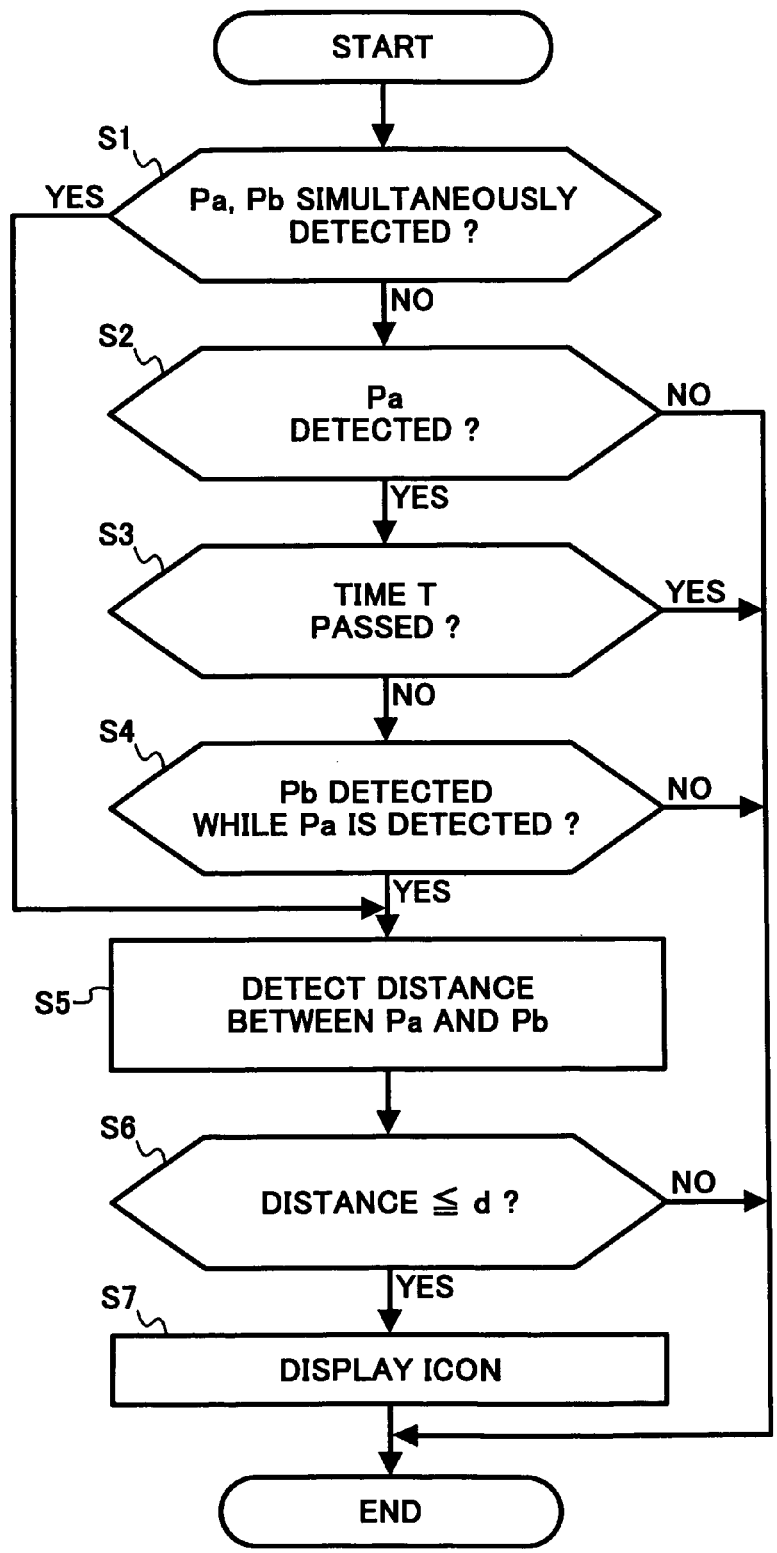
FIG. 20 is a flowchart explaining processing for displaying an icon in accordance with the detection of a plurality of coordinates.
Figure 21:
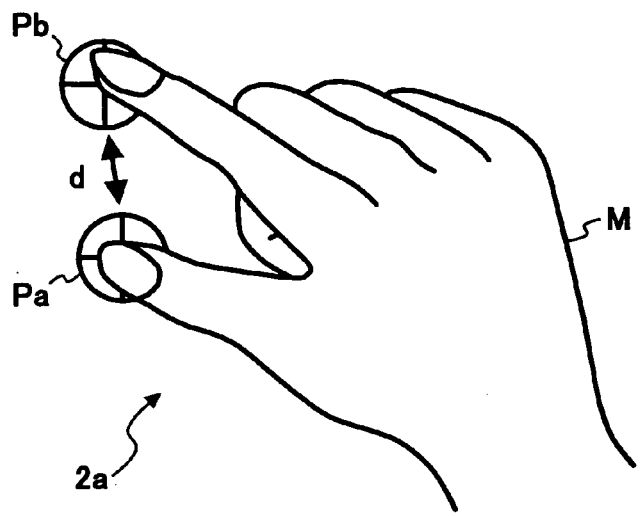
FIG. 21 is a view explaining an image operation.

FIG. 20 is a flowchart explaining an example of such processing. As shown in FIG. 20, the coordinate input device 3 detects that the user concurrently indicates two points Pa and Pb (FIG. 21) on the screen 2a with his/her fingers (Yes in step S1). Or, the coordinate input device 3 detects that the user indicates one point Pa on the screen 2a with his/her fingers (Yes in step S2) and thereafter detects that other point Pb (FIG. 21) is indicated with point Pa (FIG. 21) indicated (Yes in step S4) within a predetermined constant time T (No in step S3). In these cases, a distance between the coordinates of positions of detected points Pa and Pb is calculated (step S5). If the distance is a preset distance d or less (Yes in step S6), icon 94 (FIG. 22), which is one example of operation images contained in the drawing software pre-stored in the hard disc 1 among various kinds of icons used in this drawing software, is displayed on a predetermined area close to point Pb (Yes in step S7). Step S7 achieves operation image displaying means and operation image display processing. Step S3 achieves timing means, timing processing, first comparing means, and first comparison processing. Step S5 achieves distance measuring means and distance measurement processing. Step S6 achieves second comparing means, and second comparison processing.

Figure 22:
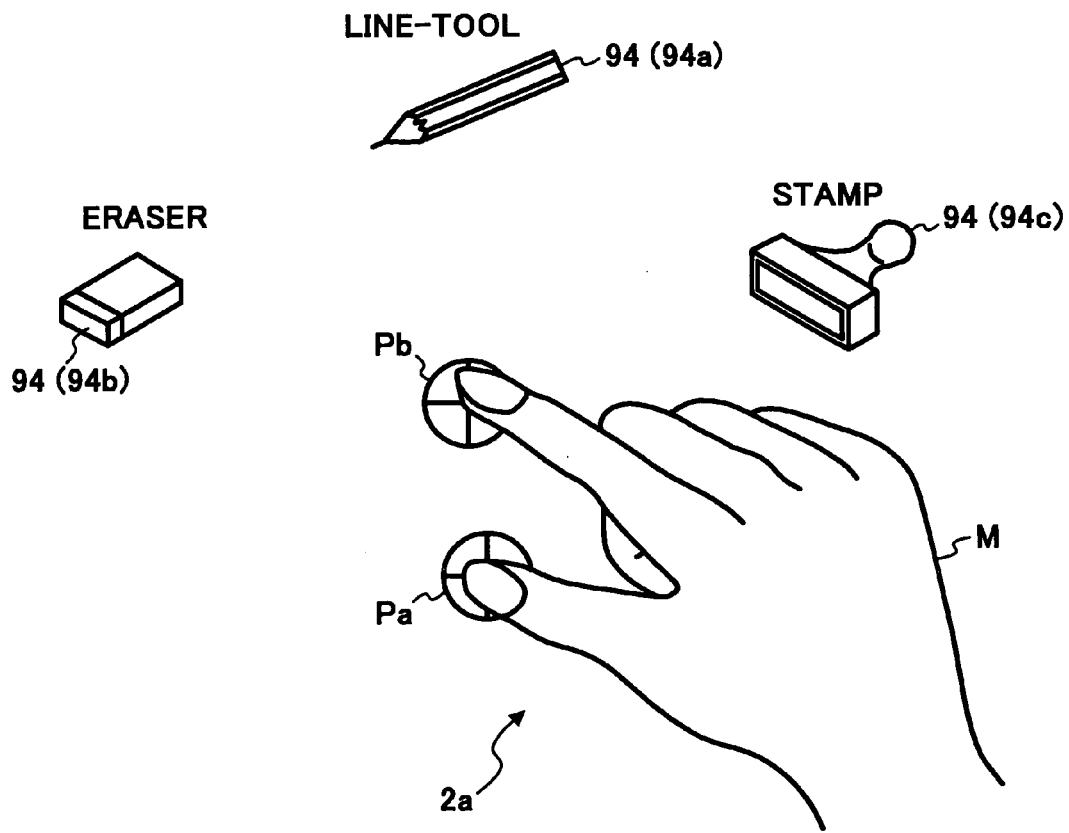
FIG. 22 is a view showing one example of the image operation.

FIG. 22 shows a case that three icons including a line tool icon 94a, eraser icon 94b and stamp icon 94c are simultaneously displayed on the screen as one example of icons 94. If the position where the icon 94 is displayed is indicated by fingers, the coordinate input device 3 detects the coordinates of the position, and recognizes that the icon 94 has been clicked to allow various kinds of operations.

For example, the line tool icon 94a shown in FIG. 22 is icon 94 that draws a line on the screen 2a. The eraser icon 94b is icon 94 that erases an image on the screen 2a. The stamp icon 94 is icon 94 that displays characters such as "secrecy", "secret", or mark on the screen 2a. More specifically, when the line tool icon 94b is clicked, the coordinate input device 3 detects a locus obtained by tracing the screen 2a with user's fingers and displays a line to the locus. Further, when the eraser icon 94b is clicked, the coordinate input device 3 detects the locus obtained by tracing the screen 2a with user's fingers and erases an image on the locus. Furthermore, when the stamp icon 94c is clicked, the coordinate input device 3 detects a position on the screen 2a indicated with the user's fingers and displays a character such as "secrecy", "secret", or mark at the position.

Two points, Pa and Pb, are thus indicated with the user's fingers simultaneously, thereby allowing a given icon 94 to be displayed at a predetermined position close to the point Pb. This eliminates the complicated operations that the user must stretch his/her limbs largely, or walk to the position where a desired icon 94 is displayed every time when clicking the icon 94, or the user must specially stand up from his/her chair to click the icon 94 in the case of performing the operations while sitting on the chair. Then, the user can display the icon 94 at hand to perform the operations. It is thereby possible to improve operationality.

According to this system, only when two points are indicated with the user's fingers simultaneously (Yes in step S1, Yes in step S2, Yes in step S4), the icon 94 is displayed (step S7). For this reason, as shown in the case in which the locus obtained by tracing the screen with user's fingers is line-displayed by use of the function corresponding to the line tool icon 94a and the case in which the image on the locus obtained by tracing the screen with user's fingers is erased by use of the function corresponding to the eraser icon 94b, the display operation for icon 94 is easily distinguishable from the operation as in the case that only one point on the screen 2a is indicated.

Further, in order to display the icon 94, two points, Pa and Pb, must be simultaneously indicated within a fixed period time (No in step S3). For this reason, in the case of indicating two points with the purpose other than the display of icon 94, time may be set to be longer than the fixed time T to indicate two points on the screen 2a. This makes it possible to easily distinguish the above cases from each other.

Moreover, in order to display the icon 94, a distance between points Pa and Pb must be d or less (Yes in step S6). For this reason, in the case of indicating two points with the purpose other than the display of icon 94, the distance d is set to a distance that can be normally considered to be indicatable by two fingers and the distance is set to be longer than the distance d to indicate two points. This makes it possible to easily distinguish the above cases from each other.

Additionally, regarding the kinds of icons to be displayed as icon 94, the number of icons and the display position (either point Pa or Pb is set as a criterion, or/and distance, direction, range from point Pa or Pb are set as a criterion), they can be preset on an operation screen page displayed on the screen 2a. This achieves setting receiving means and setting receiving processing. Then, when this setting is made, the content of a predetermined table is updated, and thereafter the icon 94 is displayed according to the content. This achieves setting means and setting processing.

In this case, it is also possible to register an item relating to the icon 94 to the table for each user. Then, identification among users can be performed using various kinds of authentication techniques. For example, the user's name and ID may be input (or selected) on the screen 2a. Or, user's fingerprint is read and the read fingerprint may be checked with the fingerprint preregistered (more specifically, see, for example, Unexamined Japanese Patent Application KOKAI Publication Nos. 2000-187419, 2000-187420, etc).

When the points Pa and Pb are placed at the upper end portion on the screen 2a, the icon 94 may be displayed at the lower portion. When the points Pa and Pb are placed at the lower end portion, the icon 94 may be displayed at the upper portion. When the points Pa and Pb are placed at the right end portion, the icon 94 may be displayed at the left portion. When the points Pa and Pb are placed at the left end portion, the icon 94 may be displayed at the right portion.

Though the aforementioned example shows the case that icon 94 is displayed when two points Pa and Pb are indicated on the screen 2a, the icon 94 may be displayed when three or more points are indicated on the screen 2a. In this case, the kind of icon 94 to be displayed may be changed depending on how many points are displayed on the screen 2a. Accordingly, for example, in the case where two points are indicated on the screen 2a, the icon 94, which is the highest frequency of usage to the user, is displayed. Then, the icons 94 can be sequentially displayed in descending order of the frequency as the number of points is increased to three points, four points. This makes it possible to increase the kinds of icons, which can be displayed by the indication, and to improve operationality since the switch in the display of icon can be easily carried out.

By the way, in order to perform processing on such icons 94, it is required that the coordinates of two points (Pa, Pb) indicated on the screen 2a can be simultaneously detected. Accordingly, an explanation is given of the technique for detecting the coordinates of points Pa and Pb simultaneously using the aforementioned coordinate input device 3.

Figure 23:
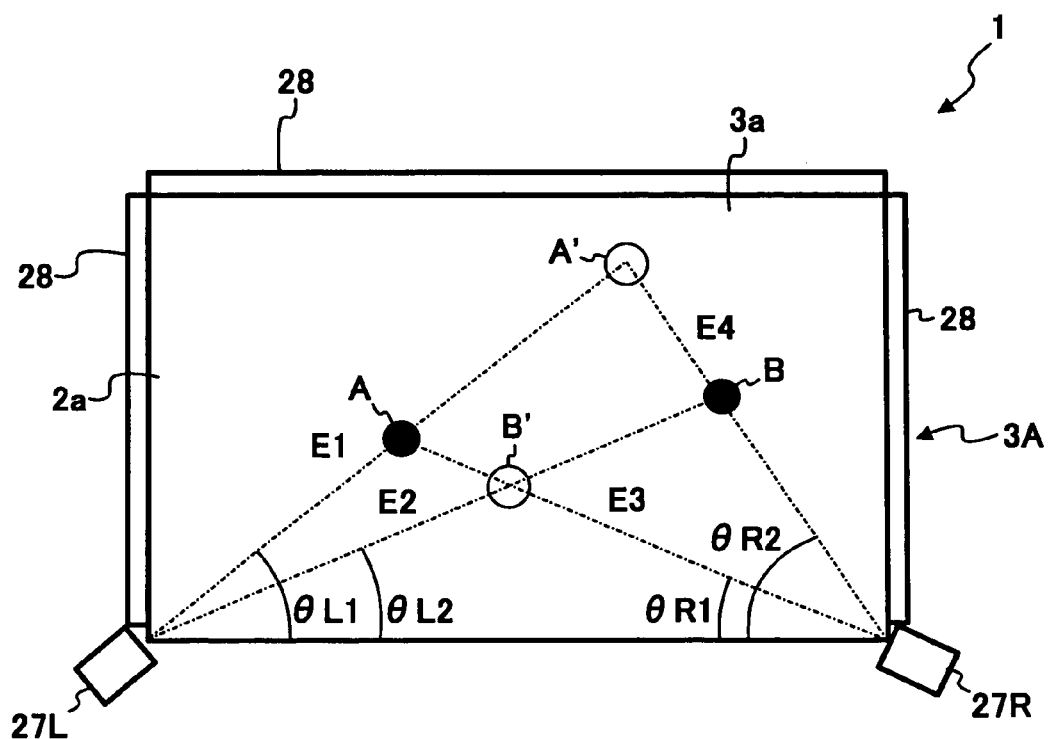
FIG. 23 is a view explaining calculation of a plurality of position coordinates.

The following explanation is given taking the coordinate input device 3A of retroreflected light shielding type as an example. As shown in FIG. 23, when pointer members A and B are simultaneously inserted onto the coordinate input device 3a, two areas (dark points) where light intensity is low occur on the CCD 39 of optical units 27 (left optical unit 27L and right optical unit 27R). The coordinates of position are calculated as functions of XnL and XnR as mentioned above. Namely, when two pointer members A and B are simultaneously inserted onto the information input areas 3a, total four coordinates of positions, which include an angle èR1 formed by the pointer member A and right optical unit 27R, an angle èR2 formed by the pointer member B and right optical unit 27R, an angle èL1 formed by the pointer member A and right optical unit 27L, and an angle èL2 formed by the pointer member B and right optical unit 27L, are calculated.

In this way, even if the total four coordinates of positions are calculated as result of the fact that the information input areas 3a are simultaneously indicated by two pointer members, it is possible to detect two indicated coordinates. The following explains real image determination processing that determines coordinates of positions of actual shield points (reflection points) due to a plurality of pointer members from a plurality of coordinates of positions calculated.

Figure 24A:
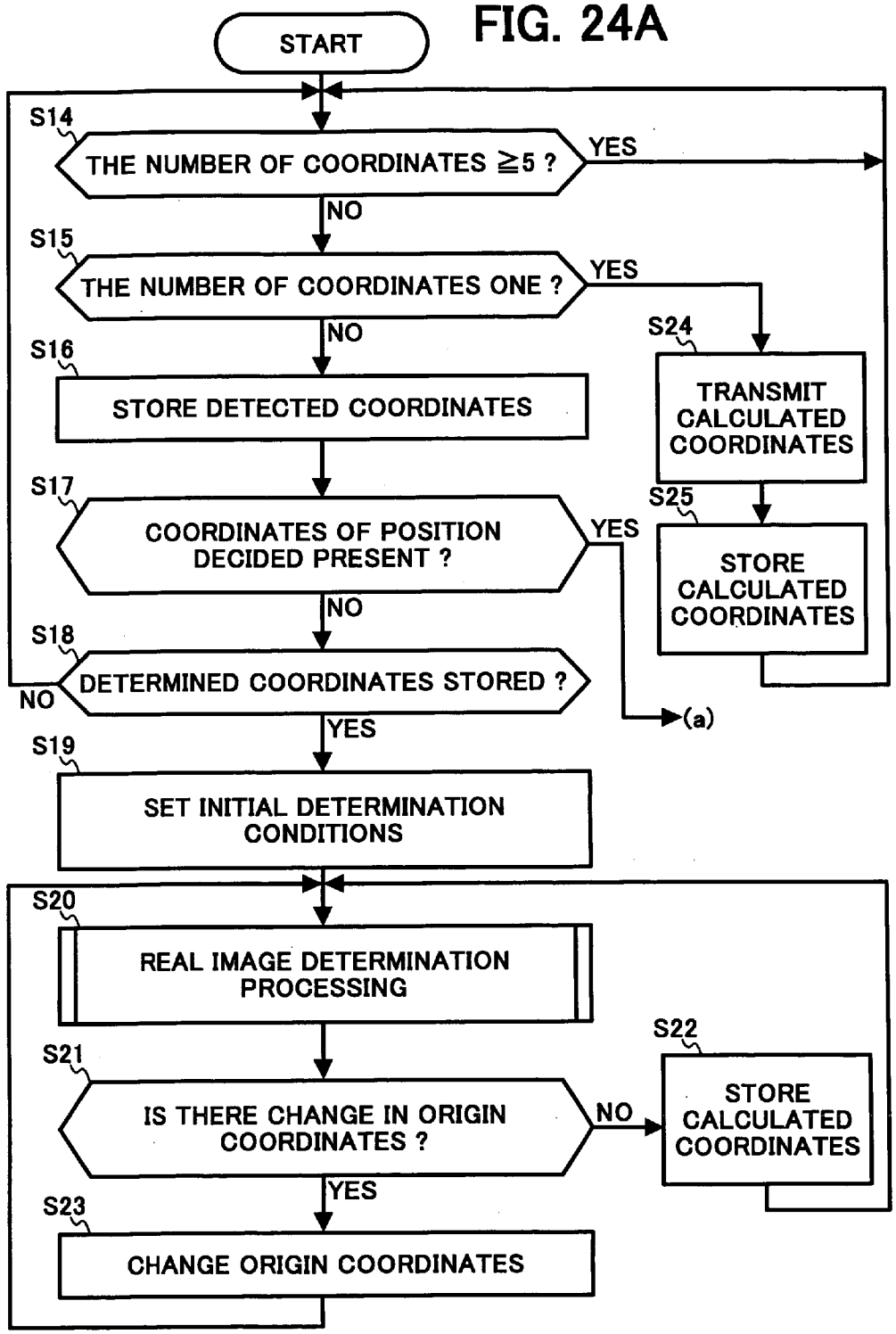
FIGS. 24A and 24B is a flowchart explaining the flow of processing including real image determination processing.
Figure 24B:
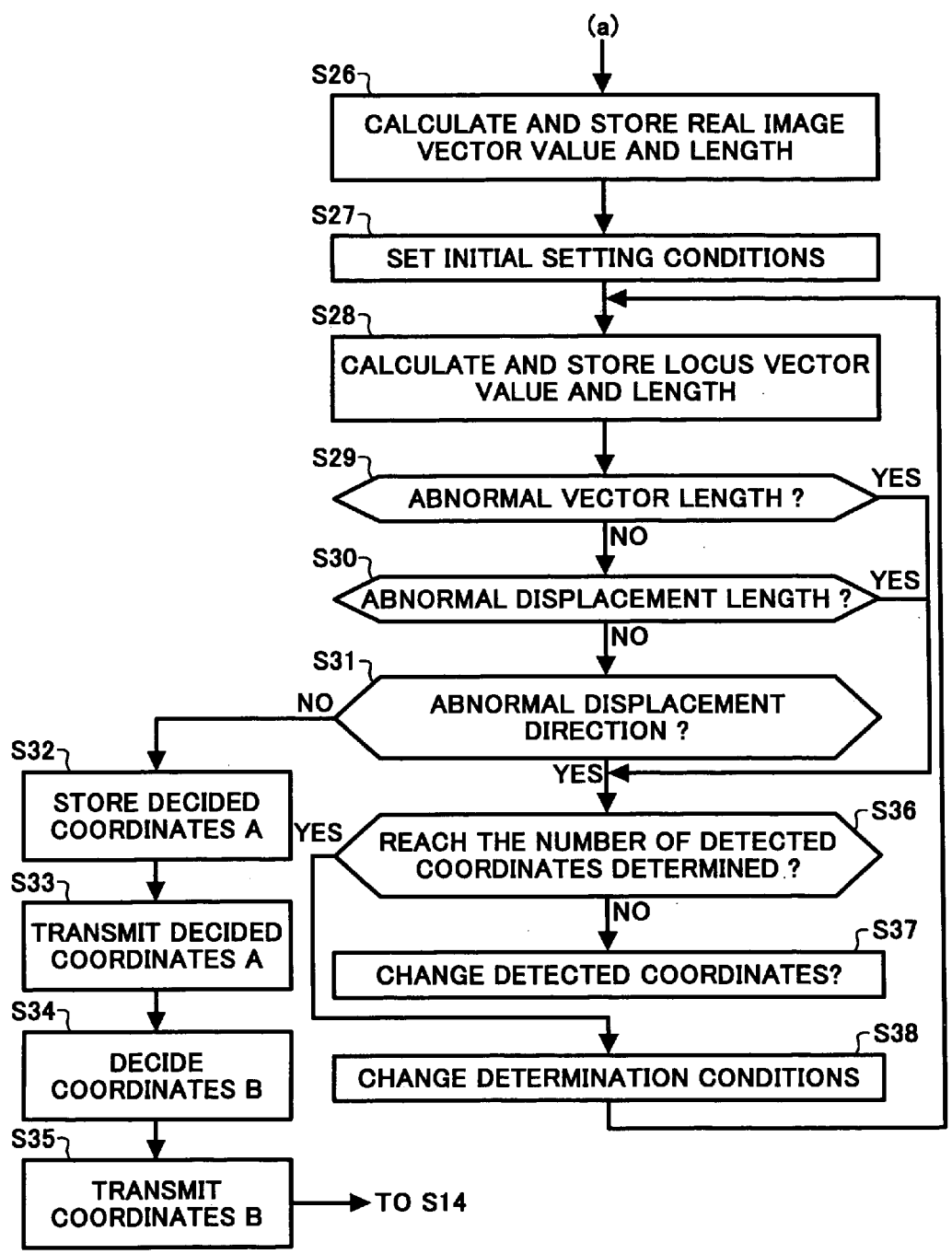
Figure 25:
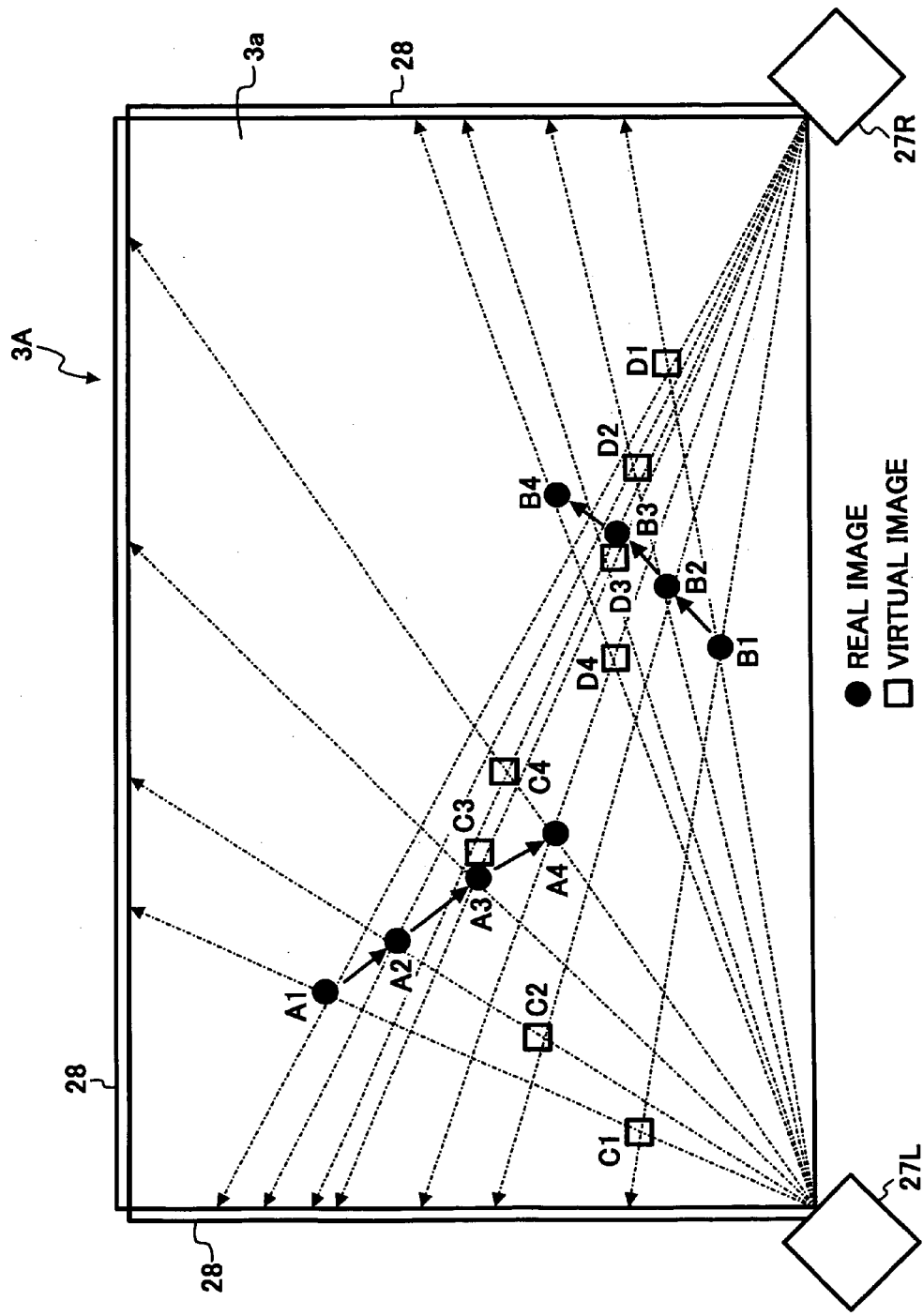
FIG. 25 is a view explaining calculation of a plurality of position coordinates.

FIGS. 24A and 24B are a flowchart schematically showing the flow of processing including real image determination processing. FIG. 25 is a view to explain processing that calculates a plurality of coordinates of positions using the coordinate input device 3A. Additionally, in FIG. 25, points "A1, A2, A3, A4" denote a coordinate locus of a real image indicated by one pointer member and points "B1, B2, B3, B4" denote a coordinate locus of a real image indicated by the other pointer member. Further, points "C1, C2, C3, C4" and points "D1, D2, D3, D4" denote virtual images.

In the flowchart shown in FIGS. 24A and 24B, when the coordinates are first calculated, it is determined whether or not the number of calculated coordinates of positions is five or more (step S14). When the number of calculated coordinates of positions is five or more (Yes in step S14), no further determination is carried out since this indicates that three or more pointer members such as fingers, pen, etc., are inserted onto the information input area 3a.

While, when the number of calculated coordinates of positions is not five or more (No in step S14), it is determined whether or not the number of calculated coordinates of positions is one (step S15) since the number of pointer members inserted onto the information input area 3a is one or two.

For example, in the case where two pointer member are simultaneously inserted onto the information input area 3a and four coordinates of positions (A1, B1, C1, D1 of FIG. 25) are calculated, coordinate extraction processing for extracting coordinates of position of an actual shield point from the plurality of coordinates of positions is performed since the number of coordinates calculated is not one (No in step S15). Additionally, in the case where two pointer members are simultaneously inserted onto the information input area 3a and the inserting positions of the pointer members are arranged on a straight line with respect to one optical unit 27 (not shown), the number of coordinates of positions to be calculated is two.

In connection with coordinate extraction processing, the plurality of coordinates of positions calculated (A1, B1, C1, D1) is stored in a memory such as RAM 14 (step S16).

In sequential step S17, it is determined whether or not coordinates of position decided as a real image are present in the plurality of coordinates of positions (A1, B1, C1, D1) stored in the memory.

In the case where coordinates of position decided as a real image are absent therein (No in step S17), the flow proceeds to step S18 to determined whether or not the calculated coordinates for a plurality of times sequentially obtained in a time series are stored in the memory.

If the calculated coordinates for a plurality of times are stored in the memory (Yes in step S18), initial determining conditions (experimental values) including a vector length, a displacement length, a displacement direction are set (step S19), and the flow proceeds to step S20 to execute real image determination processing.

Figure 26A:
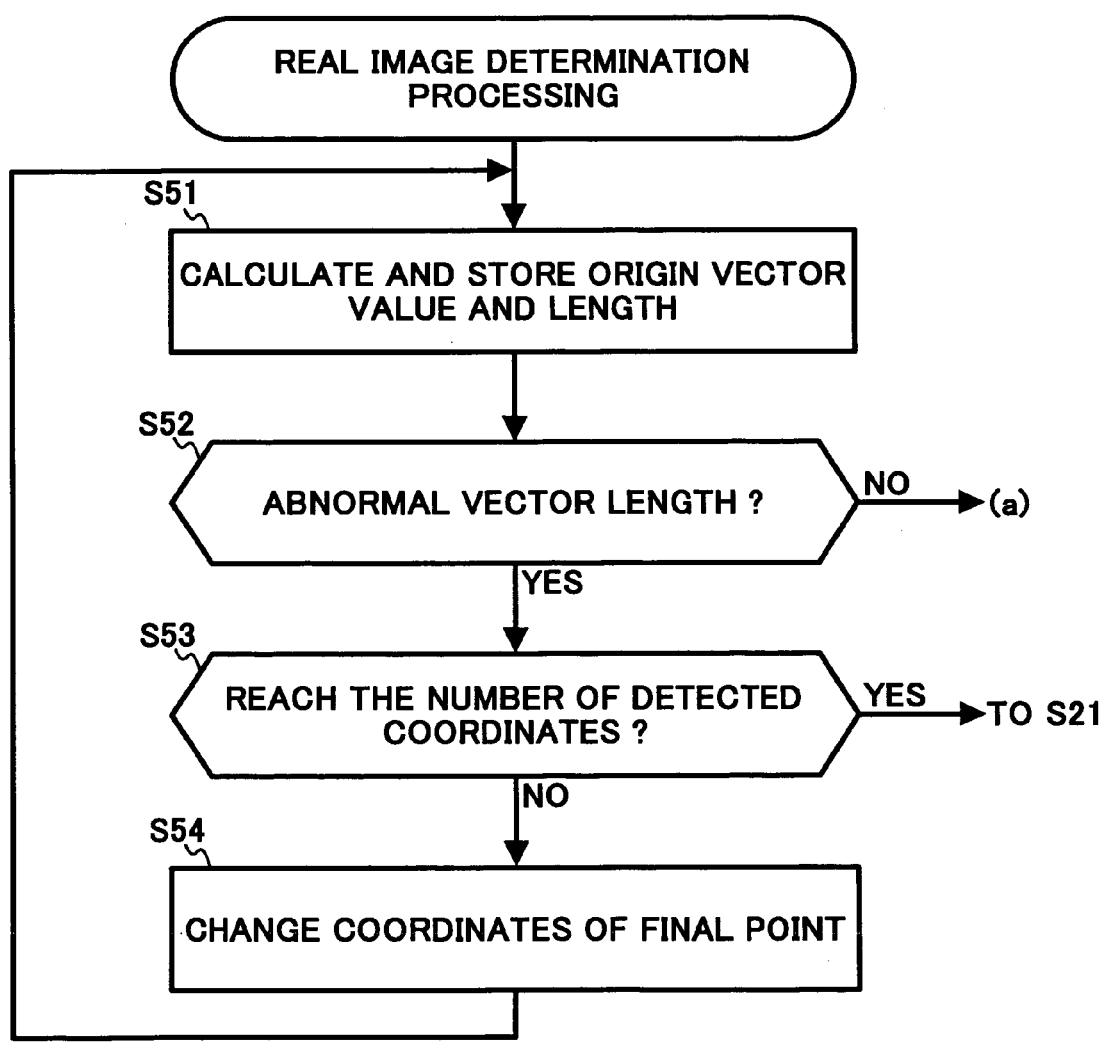
FIGS. 26A and 26B and 26C is a flowchart explaining the flow of real image determination processing.
Figure 26B:
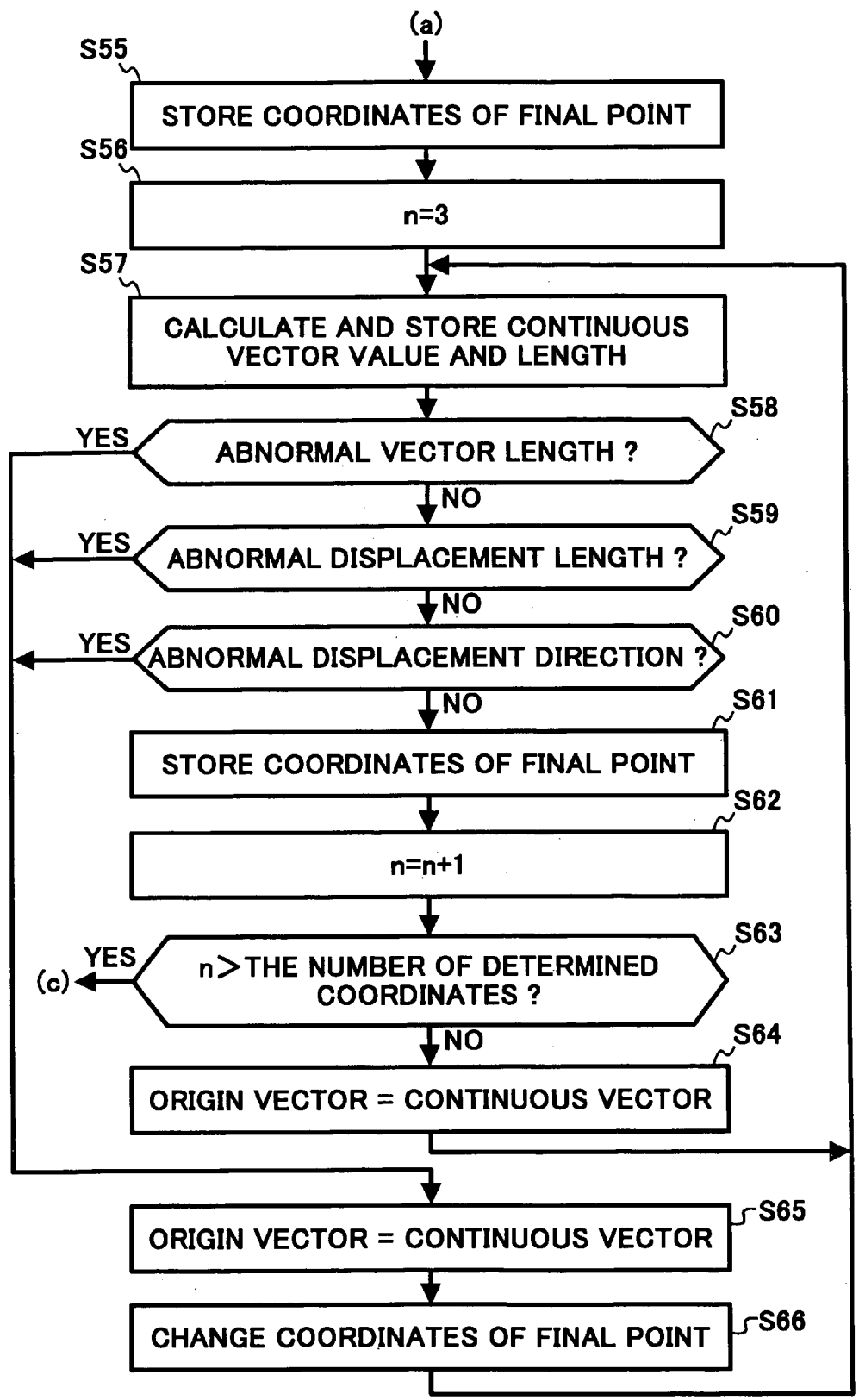
Figure 26C:
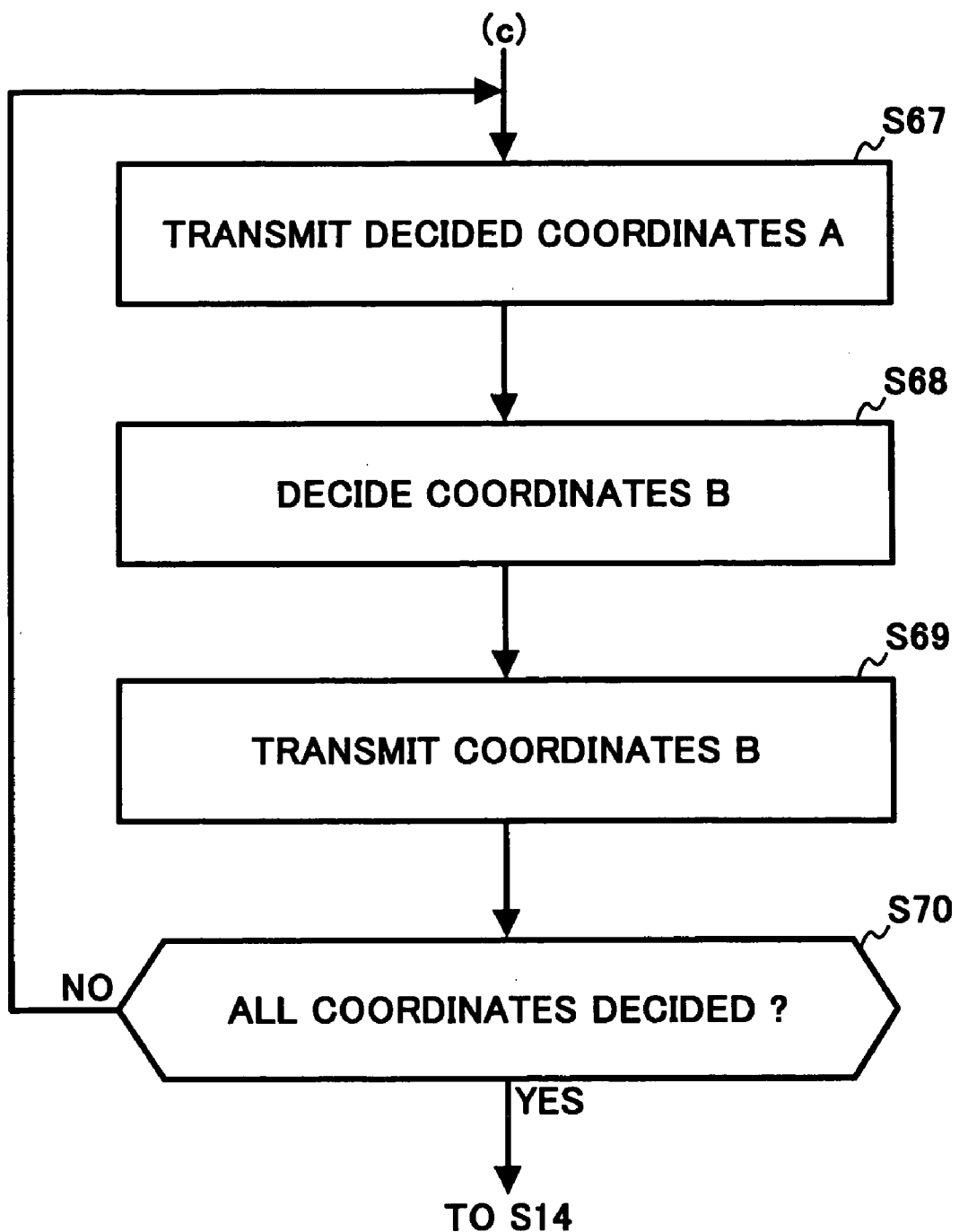

FIGS. 26A, 26B and 26C are a flowchart schematically showing the flow of real determination processing. According to the real determination processing, in step S51, predetermined calculated coordinates are set as origin coordinates, a coordinate vector value and a coordinate vector length between the coordinates are calculated, and the calculated results are stored in the memory such as RAM 14, etc. for each sampled position coordinate.

Figure 27:
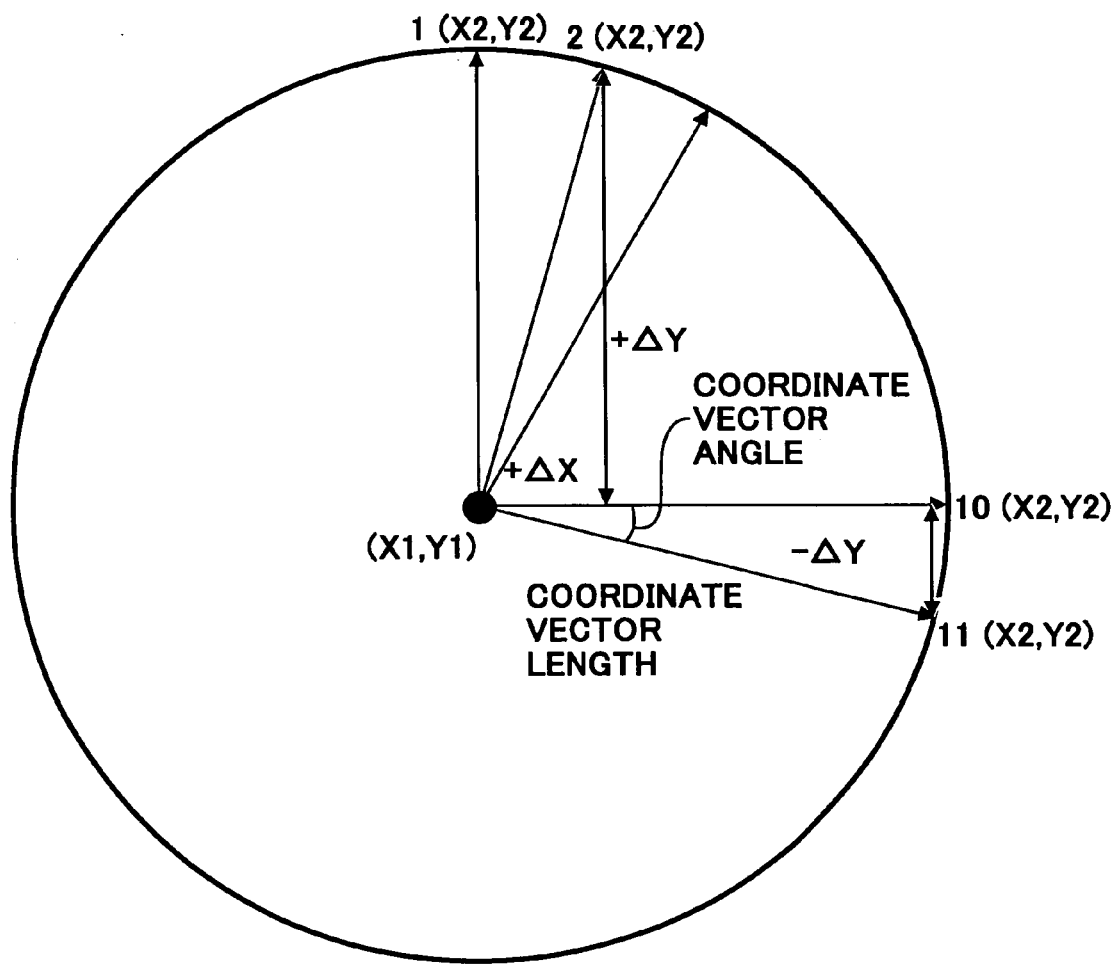
FIG. 27 is a view explaining a method for calculating a coordinate vector value.

The following explains a method for calculating the coordinate vector value with reference to FIG. 27. In FIG. 27, it is assumed that coordinates of position detected previous time are (X1, Y1) and the coordinates of position detected this time are (X2, Y2). A coordinate vector value is obtained based on $\Delta Y/\Delta X$ calculated using a variation in an X-coordinate direction $\Delta X = X2-X1$ and a variation in a Y-coordinate direction $\Delta Y = Y2-Y1$. This coordinate vector value is converted into numbers to correspond to a coordinate vector angle, which is set at 10-degree intervals from an X-axis, and prestored in a vector table TB as shown in FIG. 28. The vector table is stored in RAM 42. In addition, the vector angle interval (10 degrees in FIG. 28) in the vector table TB may be arbitrarily set. Moreover, the coordinate vector value uses an approximate value of the calculation result of $\Delta Y/\Delta X$. For example, in the case of $-Y$, $-X$ and $\Delta Y/\Delta X=0.900$, the coordinate vector value is 24.

Furthermore, for example, the coordinate vector length L1 between coordinates (X1, Y1) and (X2, Y2) can be calculated by the following equation:

$$L1 = \sqrt{\{(Y2-Y1)^2 + (X2-X1)^2\}}$$

The coordinate vector value and vector length are thus calculated for the respective sampled position coordinates.

Namely, in step S51 of FIG. 26A, processing that converts vector into coordinates using vector data preset in the vector table TB is executed based on the changing direction and the length showing a variation between the coordinates of position sequentially obtained in a time series.

Sequentially, the flow proceeds to step S52 to determine whether or not the coordinate vector length calculated in step S51 is an abnormal coordinate vector length (abnormal vector length) that is not movable during the coordinate detecting period (a predetermined time interval with a sampling signal). Additionally, in this embodiment, it is assumed that the coordinate detecting period is 20 ms. Namely, in step S52, it is determined whether or not the coordinate vector length calculated in step S51 is longer than the length that is detectable during the coordinate detecting period. Then, in the case where the coordinate vector length is longer, the calculated coordinate vector length value is a length that is not movable in actual. For this reason, the calculated coordinate vector length is determined as an abnormal vector length and is not determined as a real image locus.

In the case where the obtained coordinate vector length is the abnormal vector length (Yes in step S52), it is determined whether or not the number of coordinate vector lengths determined as abnormal vector lengths reaches the number of coordinates of positions detected previously (step S53). Then, if the number of coordinate vector lengths does not reach the above number (No in step S53), the position coordinates of final point are changed (step S54) and a coordinate vector value and coordinate vector length are calculated based on the changed final point in step S51 again.

In other words, processing in steps S51 and S52 is repeated until the coordinate vector length is not determined as an abnormal vector length (No in step S52) or the coordinate vector lengths of the position coordinates of all final points are determined as abnormal vector lengths (Yes in step S53).

Accordingly, for example, in FIG. 25, in the case where the coordinates of position A1 are set as origin coordinates, the coordinates of position calculated immediately thereafter are A2, B2, C2, and D2. For this reason, the coordinates of position are selected as a final point one by one from these coordinates of positions (A2, B2, C2, and D2). Then, a coordinate vector value (origin vector value), which relates to any one of A1→A2, A1→B2, A1→C2, A1→D2, and the coordinate vector length (origin vector length) are sequentially calculated. After that, it is determined whether or not the coordinate vector is a real image locus, sequentially.

Additionally, regarding the position coordinates of all final points, if the coordinate vector lengths are determined as abnormal vector lengths (Yes in step S53), the determination of real image cannot be made and the flow goes to step S21 to be described later.

While, in the case where any one of coordinate vector lengths is not determined as an abnormal vector length (No in step S52), the position coordinates of the final point are stored in the memory such as RAM 14 (step S55), and a predetermined initial setting (n=3, (n: the number of times of coordinate detecting periods)) is executed (step S56).

Sequentially, in step S57, the position coordinates of the final point stored in the memory in step S55 is set as origin coordinates. Then, a coordinate vector value and a coordinate vector length in the vector (continuous vector) between the origin coordinates and the coordinates of position detected during the nth coordinate detecting period are calculated, and the resultant is stored in the memory such as RAM 14.

Sequentially, the flow proceeds to step S58 to determine whether or not the coordinate vector length calculated in step S57 is an abnormal coordinate vector length (abnormal vector length) that is not movable during the coordinate detecting period.

In the case where the coordinate vector length is not determined as an abnormal vector length (No in step S58), the flow proceeds to step S59 to compare the coordinate locus of A1 A2 determined as a real image locus with that of A2 A3 and determine whether or not the corresponding coordinate locus is a locus (locus of abnormal displacement length) in which the coordinate vector value is in a specific displacement (V) and the coordinate vector length is out of a specific displacement (L).

Figure 29:
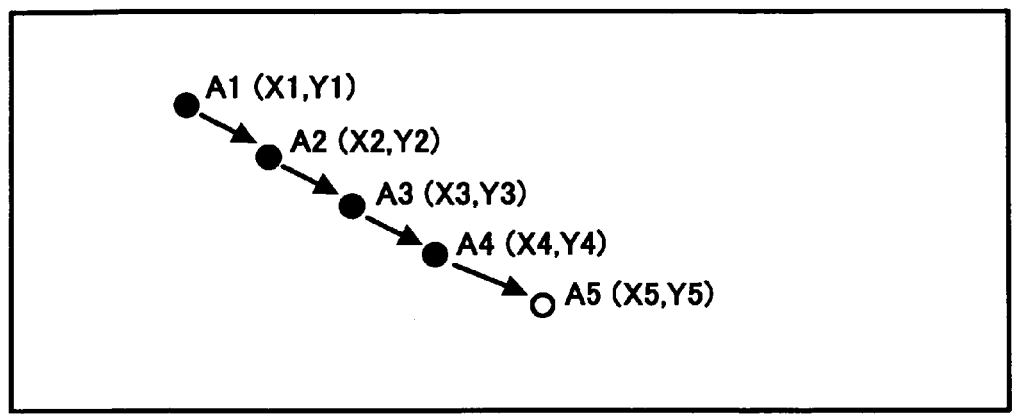
FIG. 29 is a view showing movement when a straight line is drawn on a screen.
Figure 30:
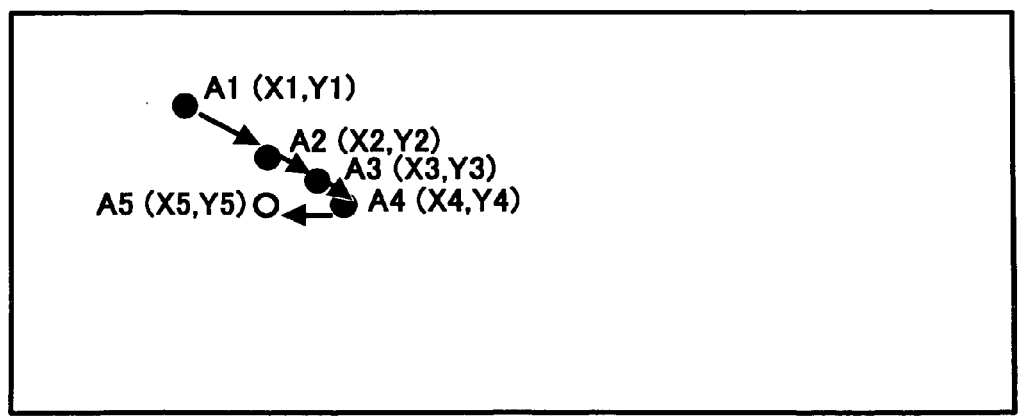
FIG. 30 is a view showing movement when a linear direction is largely changed on the screen to perform drawing.

The reason why such a determination is performed can be explained as follows: Namely, in the case of drawing the straight line, the coordinate vector value and the coordinate vector length during the same period of time are substantially unchanged as shown in FIG. 29. In the case of drawing a curve (not shown), the coordinate vector value varies but the variation is substantially the same and the coordinate vector length becomes substantially the same. Namely, in the case where a detecting object moves on the straight line or curve, processing that eliminates the locus (locus of abnormal displacement length) whose coordinate vector length is out of the specific displacement (L) even if the coordinate vector value is in the specific displacement (V).

In the case where the coordinate locus is not determined as an abnormal displacement length (No in step S59), the flow proceeds to step S60 to compare the coordinate locus of A1→A2 determined as a real image locus with that of A2→A3 and determine whether or not the corresponding coordinate locus is a locus (locus of abnormal displacement direction) in which the coordinate vector value is in a specific displacement (V) and the coordinate vector length decreases.

The reason why such a determination is performed can be explained as follows: Namely, in the case of changing the linear direction greatly to perform drawing in general, drawing velocity at which a change of direction occurs decreases sequentially and drawing stops at a direction changing point and starts again in the changed direction at a normal velocity. For this reason, in the case where the coordinate vector value largely changes, the coordinate vector length decreases sequentially and thereafter increases to the changed direction. Namely, in the case where the direction of the detecting object changes largely, a stop of operation occurs immediate before the change. Accordingly, even if the coordinate vector length decreases, processing that eliminates the locus (locus of abnormal displacement direction) whose coordinate vector value is out of the specific displacement (V).

In the case where the coordinate locus is not determined as an abnormal displacement direction (No in step S60), namely, the coordinate locus is neither abnormal vector length, abnormal displacement length, nor abnormal displacement direction, the position coordinates of the final point are stored in the memory such as RAM 14 (step S61), and the number of times n of the coordinate detecting periods is incremented by "1" (step S62).

Thereafter, in step S63, it is determined whether the number of times n of the coordinate detecting periods is stored in the memory and exceeds the number of calculated coordinates of positions (the number of determined coordinates) sequentially obtained in a time series. In the case where the number of times n of the coordinate detecting periods does not exceed the number of determined coordinates (Yes in step S63), the continuous vector is replaced by the origin vector (step S64) and the coordinate vector value and coordinate vector length, which are based on the final point, are calculated again in step S57.

In other words, regarding the position coordinates of all final points, until the coordinate loci are determined as abnormal vector lengths, abnormal displacement lengths, or abnormal displacement directions (Yes in step S65) and the position coordinates of the final points are changed (step S66), processing in steps S57 to 64 is repeated.

Then, regarding the position coordinates of all final points, when the coordinate loci are determined as abnormal vector lengths, abnormal displacement lengths, or abnormal displacement directions (Yes in step S65), the coordinates of position of each final point are changed (step S54) and the coordinate vector value and coordinate vector length, which are based on the final point, are calculated (step S51).

For example, in the case where the position coordinates of the final point of the origin vector stored in the memory in step S55 is A2 and A1→A2 is determined as a real image locus, the coordinates of positions calculated immediately thereafter are A3, B3, C3, and D3 (FIG. 25). For this reason, the coordinates of positions are selected as final points one by one from these coordinates of positions. Then, a coordinate vector value (continuous vector value), which relates to any one of A2→A3, A2→B3, A2→C3, A2→D3, and the coordinate vector length (continuous vector length) are sequentially calculated. After that, it is determined whether or not the coordinate vector is a real image locus, sequentially.

While, in the case where the number of times n of the coordinate detecting periods exceeds the number of determined coordinates (Yes in step S63), the real image is decided. Then, the determined coordinates of position are transferred to the computer 5 through the interface 43 (step S67). The transferred data is used in processing for displaying the position indicated by the pointer member and inputting a command corresponding to the indicated position.

The following explains processing that determines whether or not coordinates of other position are a real image based on coordinates of one position. For example, in FIG. 23, if both A and A' on line E1 are real image points, the coordinates in the direction of line E2 cannot be detected. This shows that only one of A and A' is a real image. Similarly, regarding B and B', it is found that only one of them is a real image. Namely, in the coordinates of position existing in the same direction, only one of them is a real image and the other is a virtual image. Further, if it is found that one A on line E1 is a real image, the other A' is recognized as a virtual image and B' in the direction of line E3 is recognized as a virtual image, and this shows that B is a real image. In other words, among coordinates of all positions stored in the memory, if coordinates of one position are recognized as a real image or virtual image, it is possible to determine whether coordinates of all positions are real images or not. Accordingly, since it is unnecessary to perform real image determination in connection with coordinates of all positions calculated, the coordinates of position can be detected at low cost.

Figure 31:
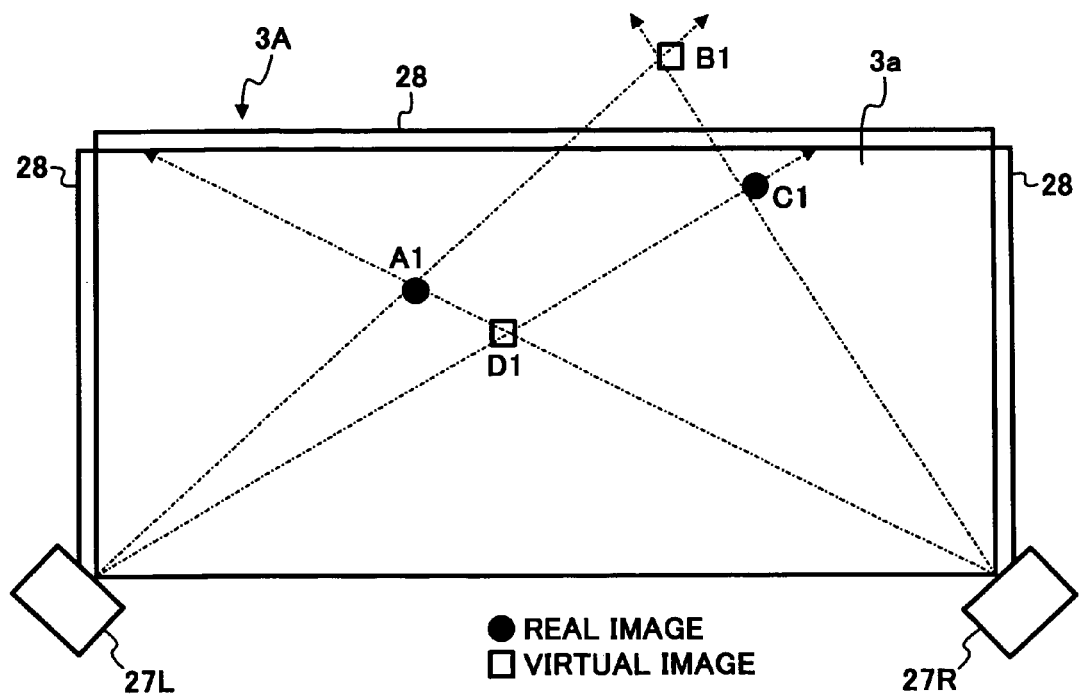
FIG. 31 is a view showing a state that a real image is automatically decided.

Additionally, as shown in FIG. 31, among the plurality of coordinates of positions (A1, B1, C1, D1) stored in the memory, in the case where one position coordinates (B1 in FIG. 31) are present out of the information input area 3a, A1 and C1 can be determined as real images.

In this way, among coordinates of four positions stored in the memory, when coordinates of one position are determined as a real image or virtual image, coordinates of other positions are determined as real images (step S68), and the resultant is transferred to the computer 5 through the interface 43 (step S69).

Processing in steps S67 to 69 is repeated until the coordinates of position of real image is decided in connected with the number of coordinates of the object to be determined (Yes in step S0). Then, in the case where transmission of coordinates of all positions is finished (Yes step S70), real image determination processing is finished and the flow goes back to step S14.

An explanation is next given of processing when all coordinate vector lengths are determined as abnormal vector lengths (step S53). In this case, first of all, the flow proceeds to step S21. In step S21, it is determined whether or not real image determination processing has been performed on the coordinates of other position in the same direction as the coordinates of position as an origin point in the previous real image determination processing. In the case where real image determination processing has not been performed on the coordinates of other position in the same direction (No in step S21), the coordinates of origin are changed to perform real image determination processing again (step S20). While, in the case where real image determination processing has been performed on the coordinates of other position in the same direction (Yes in step S21), the determination conditions relating to the vector length, displacement length, displacement direction set in step S19 are changed (step S23). Then, the flow proceeds to step S20 again to execute real image determination processing. Namely, the real image determination is performed on the coordinates of position of two points in the same direction under the same conditions alternately.

Further, when it is determined that the number of coordinates of positions calculated is one in step S15, the calculated coordinates of position is transferred to the computer 5 through the interface 43 (step S24) and stored in the memory such as RAM 14 (step S25), and the flow goes back to step S14.

Figure 32:
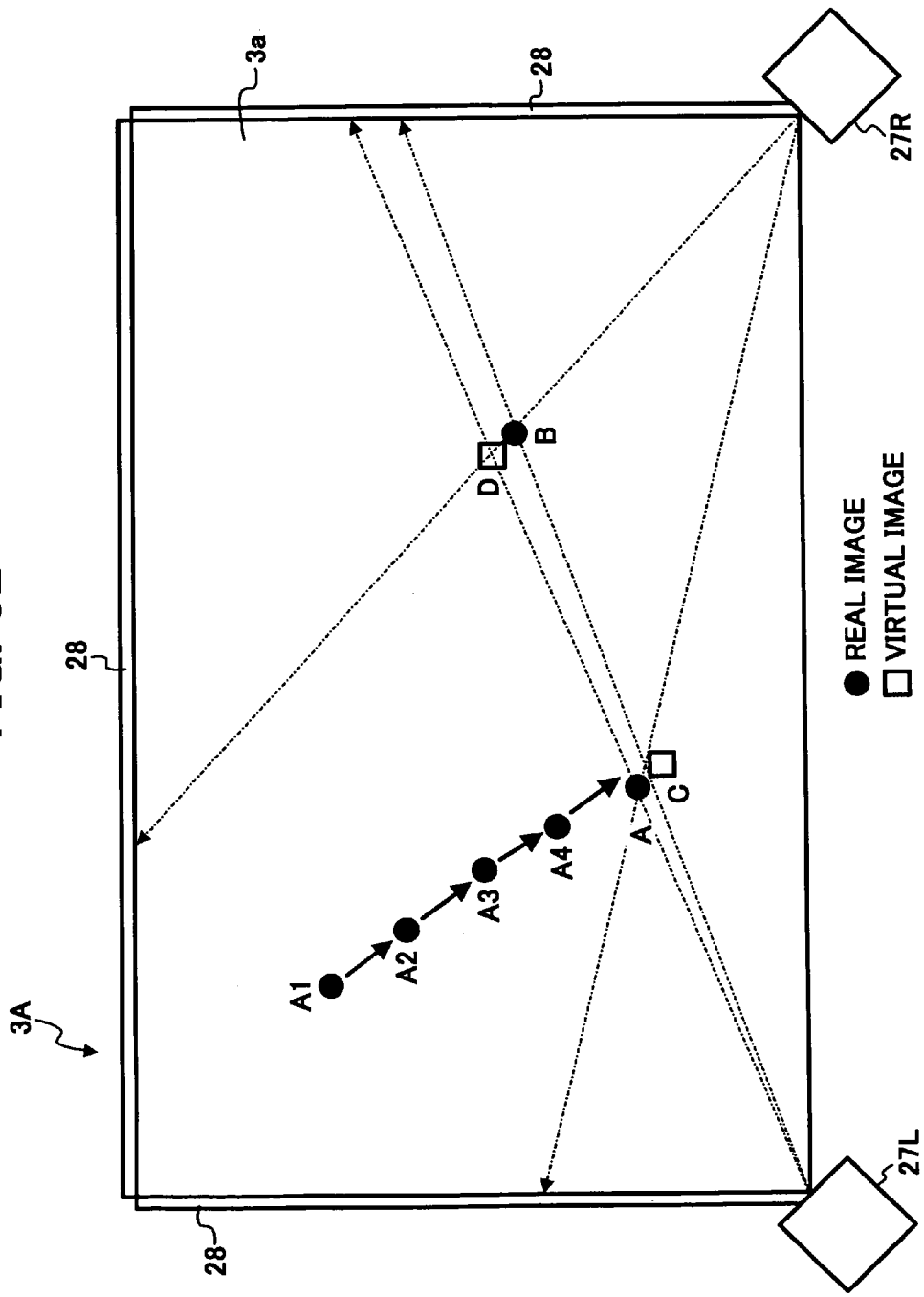
FIG. 32 is a view showing a state that the other pointer member is inserted onto an information input area while description is being made by one pointer member.

An explanation is next given of a case in which the coordinates of position decided as a real image is present (Yes in step S17). In this case, first of all, the flow proceeds to step S26. Additionally, the case in which the coordinates of decided position is present includes a case in which one or a plurality of the coordinates of positions is stored in the memory such as RAM 14. An example of such a case is shown by FIG. 32. FIG. 32 illustrates a state that the other pointer member is inserted onto the information input area 3a while description is being made by one pointer member. Additionally, in the case where the coordinates of position decided as a real image is present, there is, of course, included a case in which the aforementioned coordinates of two points are decided.

In step S26, the coordinate vector value (real image vector value) and coordinate vector length (real image vector length) between the coordinates are calculated based on the value of coordinates of position decided as a real image that are obtained last time and the value obtained the time before last, and the calculated result is stored in the memory such as RAM 14. Next, initial determination conditions (experimental values) including vector length, displacement length, displacement direction are set (step S27). After that, the coordinates of position of the final point of the real image vector stored in the memory in step S26 is replaced by the coordinates of origin. Then, the coordinate vector value and coordinate vector length between a plurality of the coordinates of positions detected simultaneously are calculated and the calculated results are stored in the memory such as RAM 14.

Sequentially, the flow proceeds to step S29, and it is determined whether or not the coordinate vector length calculated in step S28 is a coordinate vector length (abnormal vector length) that is not movable during the coordinate detecting period.

In the case where the coordinate vector length is not determined as an abnormal vector length (No in step S29), the flow proceeds to step S30 to compare a locus determined as a real image locus (for example, A3→A4 in FIG. 32) with the locus of determining object (A4→A in FIG. 32) and determine whether or not the corresponding coordinate locus is a locus (abnormal displacement length) in which the coordinate vector value is in a specific displacement (V) and the coordinate vector length is out of a specific displacement (L).

In the case where the coordinate locus is not determined as an abnormal displacement length (No in step S30), the flow proceeds to step S31 to compare a locus determined as a real image locus (for example, A3→A4 in FIG. 32) with the locus of determining object (A4→A in FIG. 32) and determine whether or not the corresponding coordinate locus is a locus (abnormal displacement direction) in which the coordinate vector value is in a specific displacement (V) and the coordinate vector length decreases.

In the case where the coordinate locus is not determined as an abnormal displacement direction (No in step S31), namely, the coordinates of position are neither abnormal vector length, abnormal displacement length, nor abnormal displacement direction, the position coordinates of the final point are stored in the memory such as RAM 14 (step S32) and the coordinates of position are transferred to the computer 5 through the interface 43 (step S33). Then, the other coordinates of position is determined as a real image (step S34) and the coordinates of position are transferred to the computer 5 through the interface 43 (step S35).

Further, in the cases in which the coordinate vector length is determined as an abnormal vector length (Yes in step S29), the coordinate locus is determined as an abnormal displacement length (Yes in step S30), the coordinate locus is determined as an abnormal displacement direction (Yes in step S31), the detecting coordinates of processing object are changed (step S37) and steps S28 to S31 are repeated until the number of coordinates of positions processed reaches the number of coordinates to be detected (Yes in step S36).

Accordingly, in step S26, in the case where the coordinates of position of final point of the real image vector stored in the memory is A4 of FIG. 32, the coordinates of position calculated immediately thereafter are A, B, C, and D. For this reason, the coordinates of positions are selected as final points one by one from these coordinates of positions. Then, a coordinate vector value (locus vector value), which relates to any one of A4→A, A4→B, A4→C, A4→D, and the coordinate vector length (locus vector length) are sequentially calculated. After that, it is determined whether or not the coordinate vector is a real image locus, sequentially. In other words, by tracing the locus of coordinates of one position determined as a real image, it is possible to discriminate between the coordinates of position determined as the real image and those determined as the virtual image that are placed in the same direction as the light receiving element.

Furthermore, in the case where the number of coordinates of positions processed reaches the number of detecting coordinates (Yes in step S36), determination conditions including the vector length, displacement length, displacement direction are changed (step S38). Then, the flow goes to step S28 again to calculate a coordinate vector value (locus vector value) and its coordinate vector length (locus vector length).

Even if the information input area 3a is simultaneously indicated by two pointer members with result that the total four coordinates of positions are detected, it is possible to detect coordinates of two positions actually indicated to make them effective.

An explanation is next given of another example of an operation image displayed on the screen 2a.

Figure 33A:
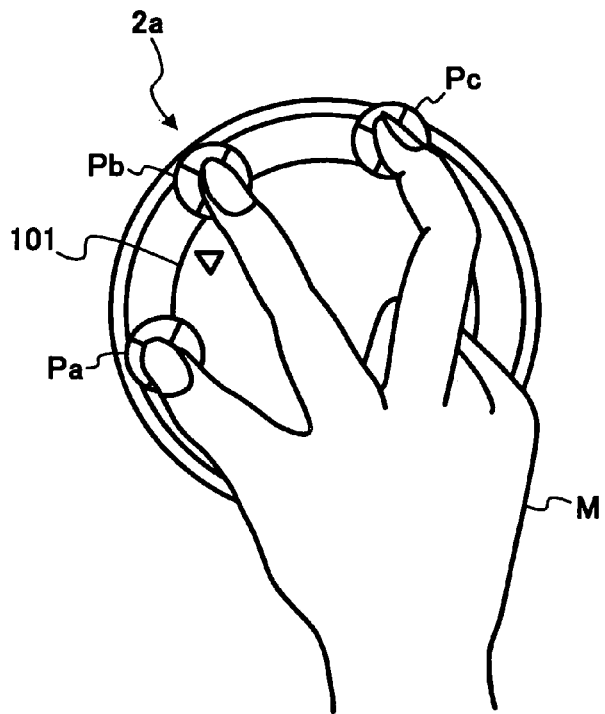
FIGS. 33A and 33B are views explaining a dial operation.
Figure 33B:
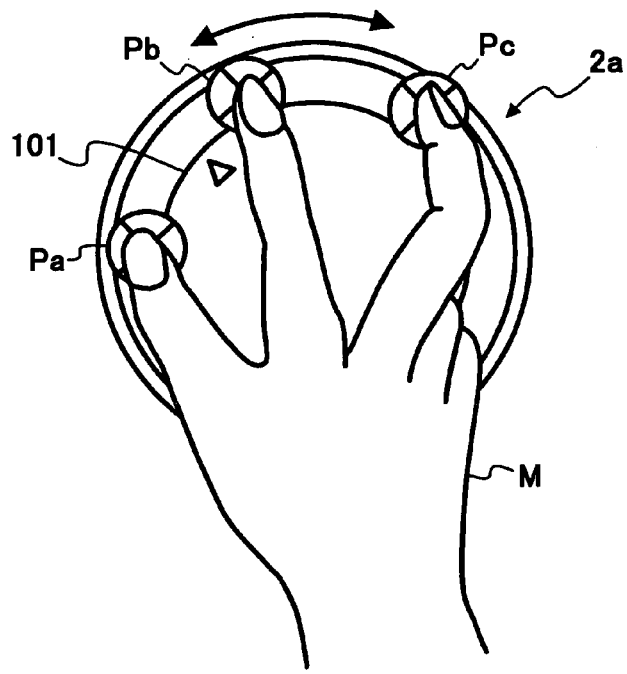

In the case where three points on the screen 2a are simultaneously indicated as shown in FIGS. 33A and 33B, a dial 101, which is an operation image, is displayed at a position preset close to three points (FIG. 33A). The image of dial 101 is drawn by the drawing software prestored in the hard disc 17. Then, when the user moves positions of three points indicated on the screen 2a and such an operation that rotates the dial 101 is carried out, the image of dial 101 is accordingly displayed to be rotatably moved to achieve the operation that rotates the dial 101 (FIG. 33B). The rotatable operation of dial 101 makes it possible to perform a predetermined operation on the information input and output system 1. In this example, since an image for operation is a dial, this is suitable for stepwise or non-stepwise adjustment of a fixed physical quantity such as adjustment of speech volume to output speech at the information input and output system 1.

Figure 34:
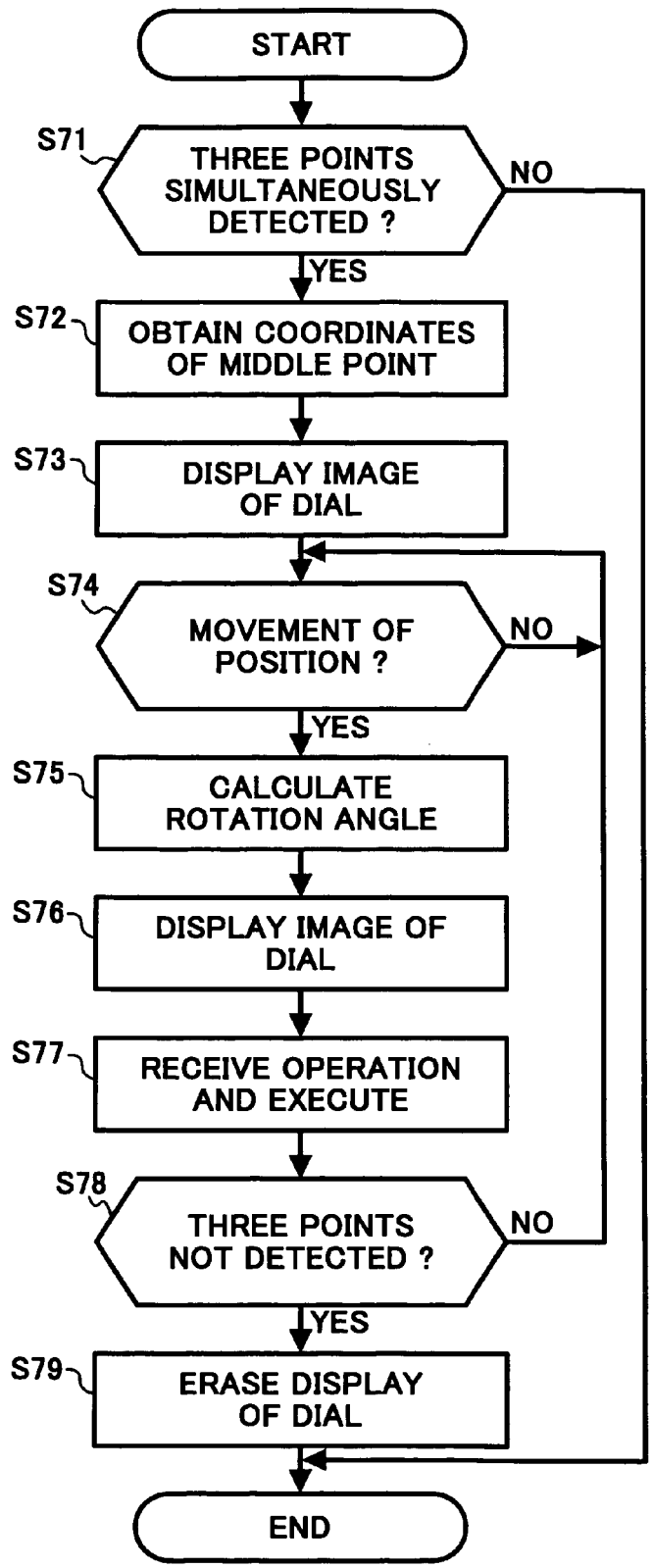
FIG. 34 is a flowchart of processing for the dial operation.

A specific explanation is given of processing relating to the dial 101 with reference to the flowchart of FIG. 34. This processing is executed in cooperation with mainly the coordinate input device 3, controller 10, computer 5, etc. in the computer 5.

First of all, the information input and output system 1 detects that three points on the screen 2a are simultaneously indicated (Yes in step S71). In this example, it is enough that three points on the screen 2a are indicated, and it is unnecessary to specify accurate coordinates of three points. When three points on the screen 2a are indicated, the coordinates of the total nine points including three points for a real image and six points for a virtual image are detected. For this reason, it is shown that three points are actually indicated at this time.

Figure 35:
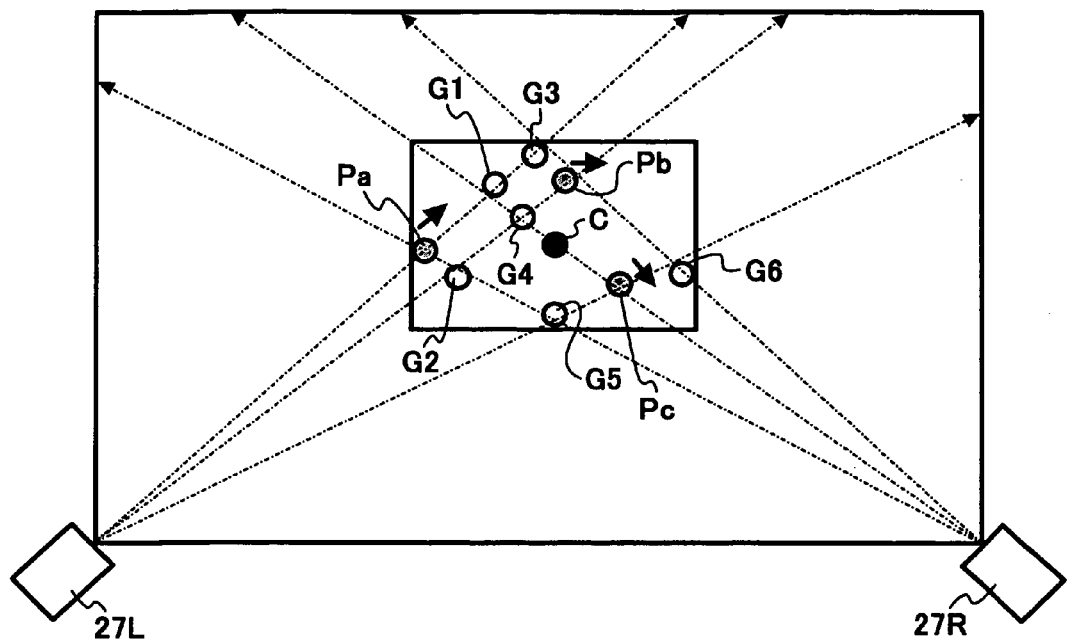
FIG. 35 is a view explaining detection of coordinates at the time of dial operation.
Figure 36:
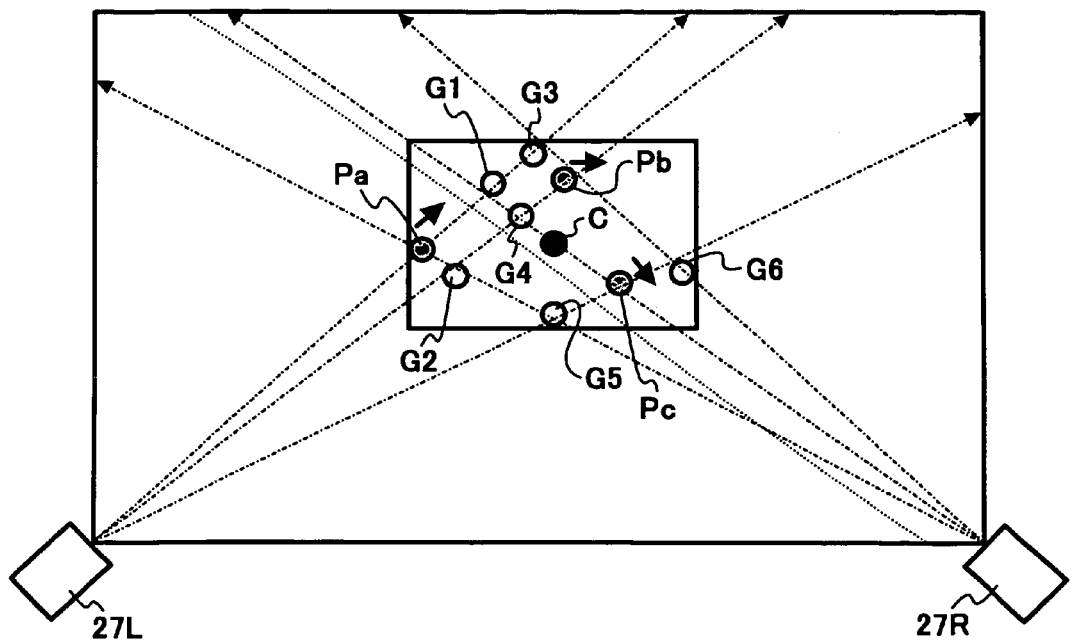
FIG. 36 is a view explaining detection of coordinates at the time of dial operation.

In the example of FIG. 35, three points Pa, Pb, Pc for a real image and six points G1 to G6 for a virtual image are detected.

Then, the information input and output system 1 obtains coordinates C of a middle point of the respective coordinates Pa (xa, ya), Pb (xb, yb), Pc (xc, yc), G1 (x1, y1) to G6 (x6, y6) of these nine points (step S72).

Namely, the following calculations are performed to obtain the coordinates (x0, y0) of middle point C.

$$x0=(xa+xb+xc+x1+x2+x3+x4+x5+x6)/9 \quad (6A)$$

$$y0=(ya+yb+yc+y1+y2+y3+y4+y5+y6)/9 \quad (6B)$$

Then, the image of dial 101 is displayed with center at the position of middle point C (x0, y0) (step S73).

After that, in connection with nine points 9a to PC and G1 to G6, it is determined whether or not there is movement of position. This achieves movement detecting means and movement detection processing. Then, when there is movement of position (Yes in step S74), one point (Pa in this example) is specified as a notice point from among nine points 9a to PC and G1 to G6 and a detected point, which is closest to the notice point, is set as a moved point (Pa' in this example) of notice point in movement of position. Then, a rotation angle èm of the corresponding circle is calculated from two points of notice points Pa (xa, xb) and moved point Pa' (xa', xb') with the middle point C as a center of circle (step S75).

Figure 37:
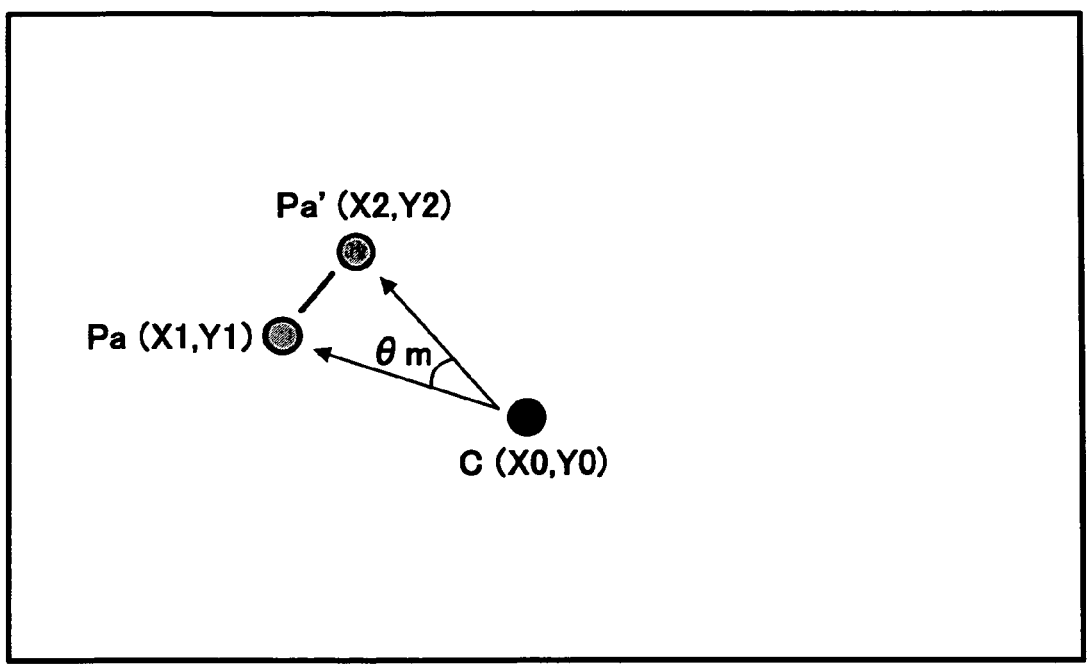
FIG. 37 is a view explaining calculation at the time of dial operation.

Namely, the equations are obtained as follows (FIG. 37):

$$\text{Moved Length } L=\sqrt{(xa'-xa)^2+(ya'-ya)^2}$$

$$\text{Radius}=\sqrt{(xa'-x0)^2+(ya'-y0)^2}$$

From the calculation result, rotation angle èm=(360×L)/(2× ŏ×r) is obtained (where ŏ is the ratio of the circumference of a circle to its diameter).

Then, the information input and output system 1 rotates the image of dial 101 with center at the position of central point C according to the rotation angle è m to display (step S76). Steps S73, S75, S76 achieve operation image display-ing means and operation image display processing. The information input and output system 1 receives a request for operation according to the rotation angle è and executes processing that complies with the request (step S77). The step S77 achieves operating means and operation processing. As mentioned above, in the case where the dial 101 is one that operates the speech volume, it is recognized that the speech volume has been operated according to the size of rotation angle è. When three points on the screen 2a are not indicated (Yes in step S78), the display of dial 101 is erased (step S79).

An explanation is next given of another example of an operation image displayed on the screen 2a.

Figure 38A:
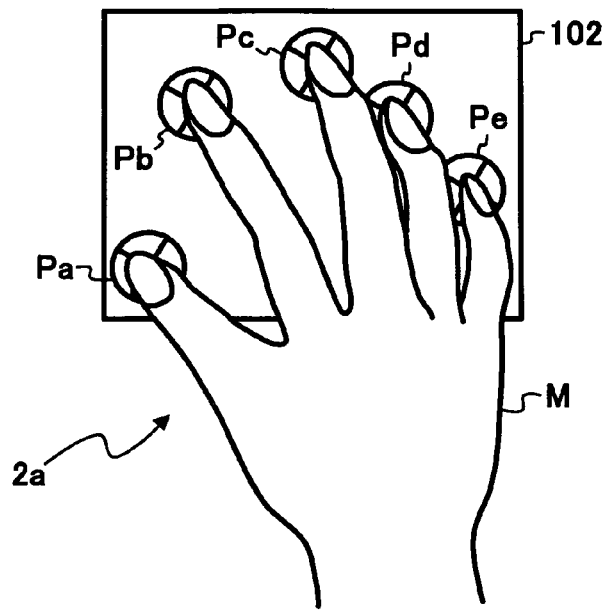
FIGS. 38A and 38B are views explaining door and pallet operations.
Figure 38B:
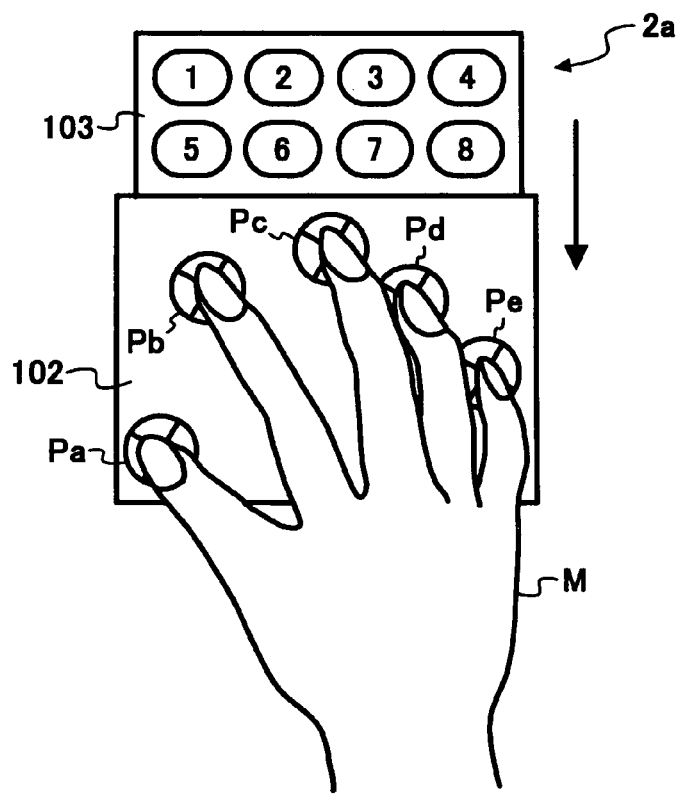

In the case where five points on the screen 2a are simultaneously indicated with five fingers as shown in FIGS. 38A and 38B, a door 102, which is an operation image, is displayed at a position preset close to five points (FIG. 38A). If the positions of five points indicated are moved downwardly (or upwardly) as they are, the door 102 is opened gradually with movement of the indicated positions of five points and a pallet 103, which is an operation image, appears under the door 102 (FIG. 38B). The images of door 102 and pallet 103 are drawn by the drawing software prestored in the hard disk 17. Then, the user indicates different points on the pallet 103, respectively, making it possible to execute various operations on the pallet 103. In this example, first, the door 102 is displayed and the pallet 103, which is the image for operation, is displayed under the door 102. For this reason, this is suitable for a case in which an image, which is undesirably displayed, for example, an image for operation to change the initial setting value is displayed immediately when the screen page 2a is only indicated.

Figure 39:
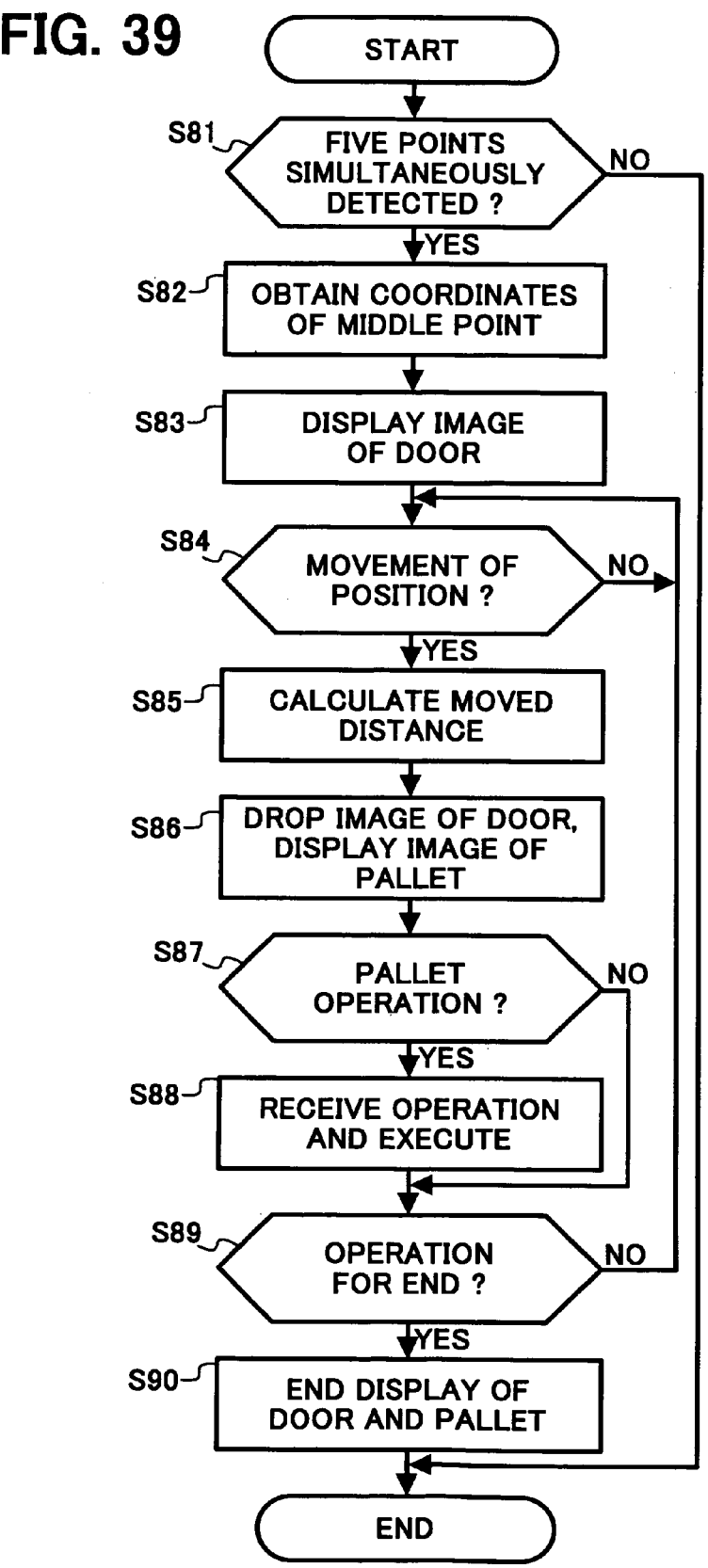
FIG. 39 is a flowchart explaining processing for the door and pallet operations.

A specific explanation is next given of processing relating to the pallet 103 with reference to the flowchart of FIG. 39. In addition, for example, this processing is executed in cooperation with mainly the coordinate input device 3, controller 10, computer 5, etc. in the computer 5.

First of all, the information input and output system 1 detects that five points on the screen 2a are simultaneously indicated (Yes in step S81). In this example, it is enough that five points on the screen 2a are indicated, and it is unnecessary to specify accurate coordinates of five points. When five points on the screen 2a are indicated, the coordinates of the total twenty-five points including five points for a real image and twenty points for a virtual image are detected. For this reason, it is shown that five points are actually indicated at this time.

Figure 40:
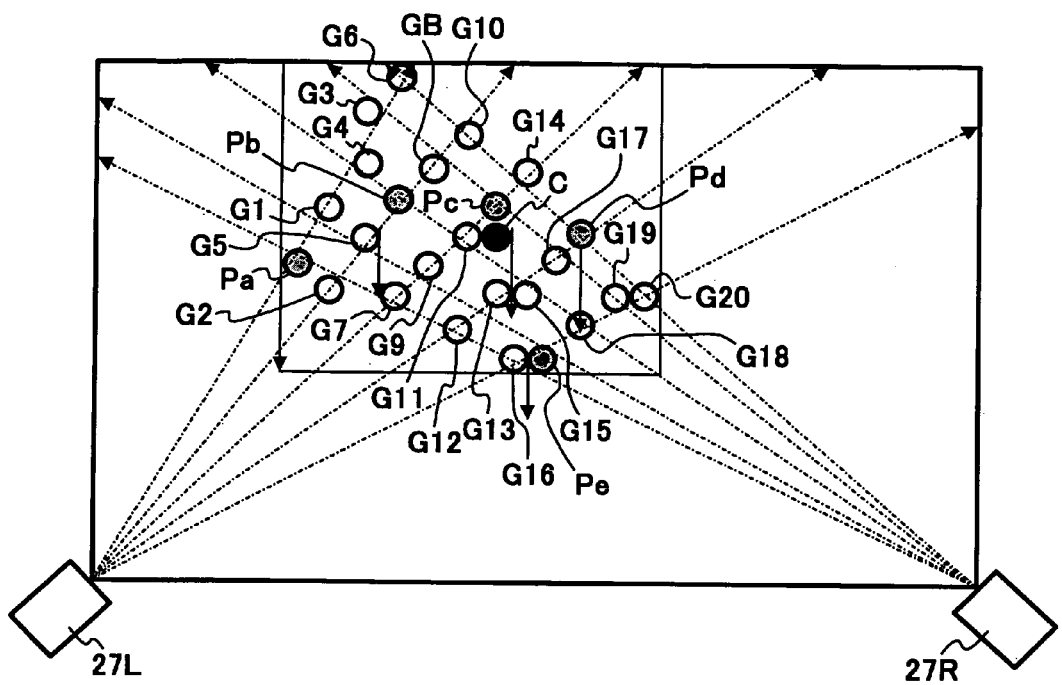
FIG. 40 is a view explaining detection of coordinates at the time of door and pallet operations.

Then, the same calculations as (6A) and (6B) mentioned above are performed to obtain coordinates (x0, y0) of a middle point C of the total twenty-five points (FIG. 40) (step S82). After that, the image of door 102 is displayed with center at the position of middle point C (x0, y0) (step S83). The step S83 achieves door displaying means and door display processing.

Figure 41:
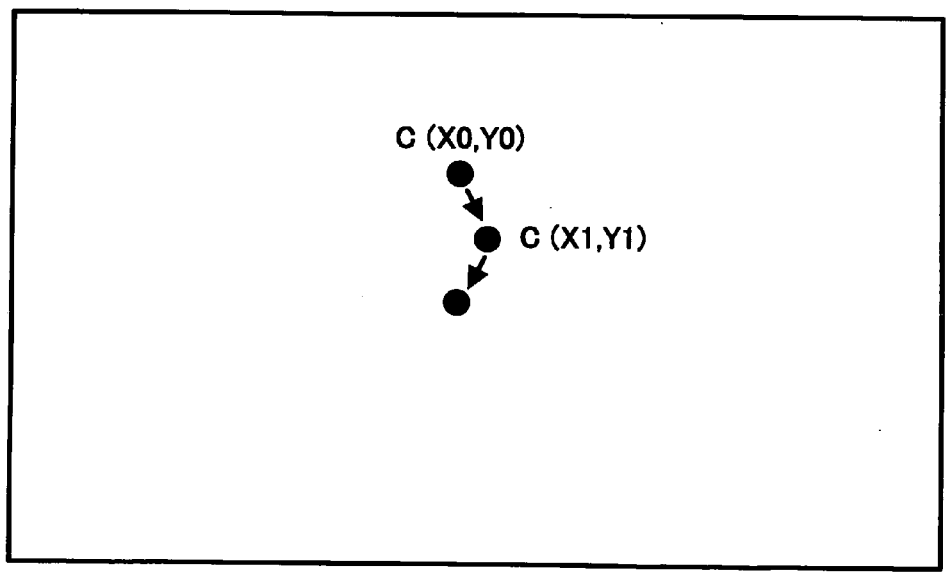
FIG. 41 is a view explaining calculations at the time of door and pallet operations.

Thereafter, it is determined whether or not there is movement of five points indicated by the user. This achieves movement detecting means and movement detection processing. Then, in the case where the positions of five points indicated are dragged downwardly as they are to move the positions of five points (Yes in step S84), length l of the position of middle point C moved downwardly is obtained (step S85). In addition, though the direction of movement does not match the drag direction, this has no problem since what is necessary for this processing is length moved downwardly. More specifically, if coordinates of unmoved point C and coordinates of moved point C are set to (x0, y0) and (x1, y1) respectively, length l of downward movement can be obtained by "l=y1−y0" (FIG. 41). After that, the image of door 102 is dropped by the moved length l to display and the pallet 103 is displayed at the position of unmoved door 102 to display (step S86). The step S86 achieves door changing means, door change processing, operation image displaying means and operation image display processing. At the time of displaying the pallet 103, only the image, which is not overlapped with the display of door 102, is displayed such that the pallet 103 appears gradually from the lower portion of door 102.

Then, when there is an operation for the pallet 103 (Yes in step S87), the information input and output system 1 receives the operation (for example, a change in initial setting value) to execute the operation (step S88). When the end of display of pallet 103 is indicated on the pallet 103 (Yes in step S89), the information input and output system 1 ends the display of door 102 and pallet 103 (step S90). The step S88 achieves operating means and operation processing.

An explanation is next given of another example of an operation image displayed on the screen 2a.

Figure 43:
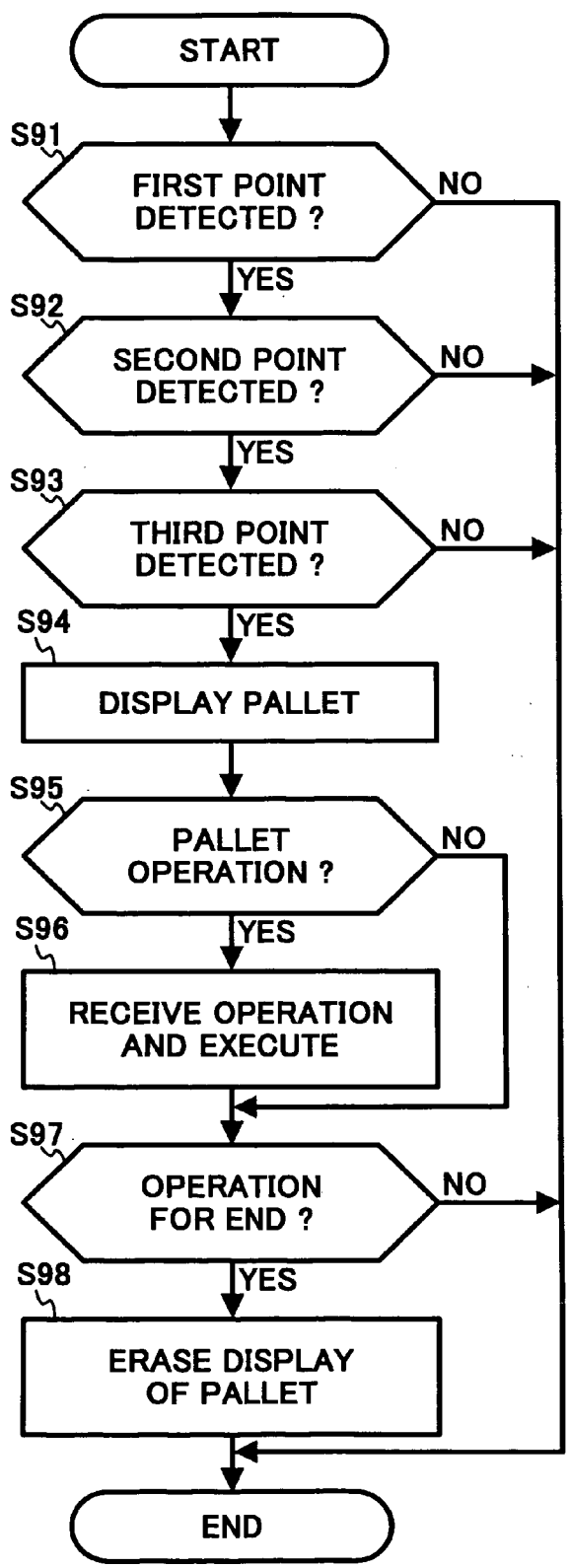
FIG. 43 is a flowchart explaining processing for the pallet operation.

When the number of points is sequentially added one by one on the screen 2a and three points are simultaneously indicated in the end as shown in FIG. 43, a pallet 104 for an operation image is displayed at a position preset close to these three points. The image of pallet 104 is drawn by the drawing software prestored in the hard disc 17. In this case, the pallet 104 is immediately displayed unlike the previous example in which the pallet 103 appears gradually by dragging the door 102. For this reason, this is suitable for the display of operation image displayed immediately only when the user indicates the image screen 2a.

In connection with processing in this case, as shown in FIG. 43, the information input and output system 1 detects one point (point A) (FIG. 44) (Yes in step S91). Thereafter, the information input and output system 1 detects another one point (point B) during a predetermined time while maintaining one point (point A) (FIG. 45) (Yes in step S92). Moreover, the information input and output system 1 detects another one point (point C) while maintaining these two points (points B and C) (FIG. 46), and displays the pallet 104 at a position preset close to these three points (step S94). The step S94 achieves operation image displaying means and operation image display processing means.

In this case, similar to the aforementioned case, a middle point including three points for a real image and six points for a virtual image is obtained to display the pallet 104 in a given direction of the middle point at a position of a given length. Further, since detection of three points (points A, B, C) can be easily performed, it is possible to decide the display position of pallet 104 from the accurate coordinates of these three points.

Figure 44:
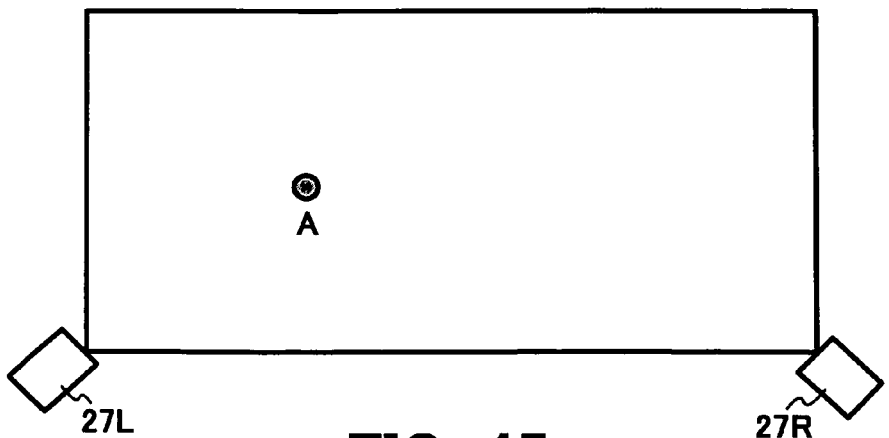
FIG. 44 is a view explaining detection of coordinates at the time of pallet operation.
Figure 45:
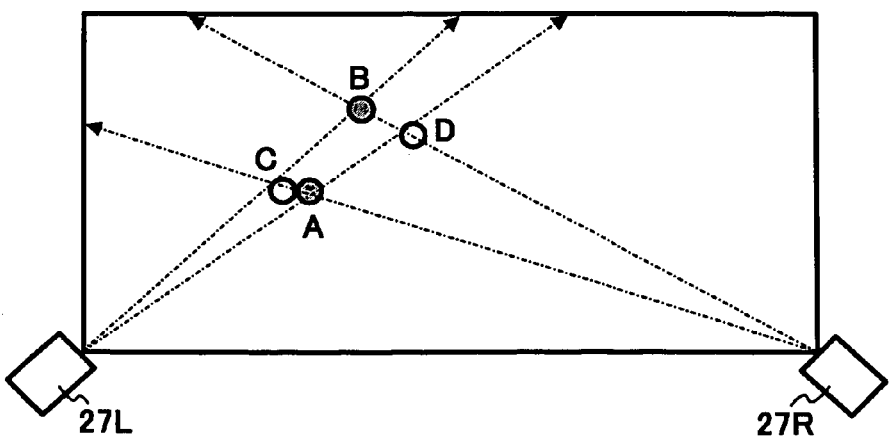
FIG. 45 is a view explaining detection of coordinates at the time of pallet operation.
Figure 46:
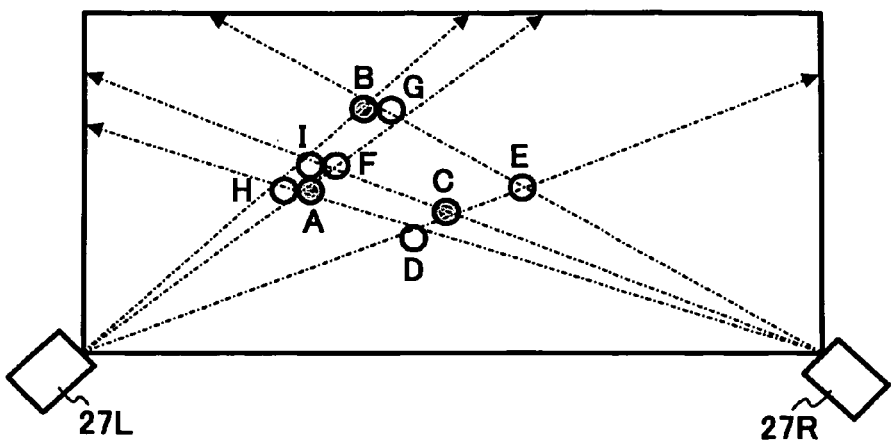
FIG. 46 is a view explaining detection of coordinates at the time of pallet operation.

When point B is indicated while point A is maintained as shown in FIG. 45, the information input and output system 1 detects points A, B, C, D but recognizes that A is a real image from the beginning (FIG. 44). If point C is a second real image, points B and D on the same direction can not be detected. If point D is a second real image, points B and C on the same direction can not be detected. The point B is thereby determined as a second real image. Next, when points A and B are decided as shown in FIG. 46, point H is determined as a virtual image since points I, F, D, C, F are not detected if point H is a third image. The similar determination is repeated, so that points A, B, C are determined as real images.

Then, when there is an operation for the pallet 104 (Yes in step S95) after displaying the pallet 104, the information input and output system 1 receives the operation (for example, a change in initial setting value) to execute the operation (step S96). When the end of display of pallet 104 is indicated on the pallet 104 (Yes in step S97), the information input and output system 1 ends the display of pallet 104 (step S98).

An explanation is next given of another example of an operation image displayed on the screen 2a.

Figure 47A:
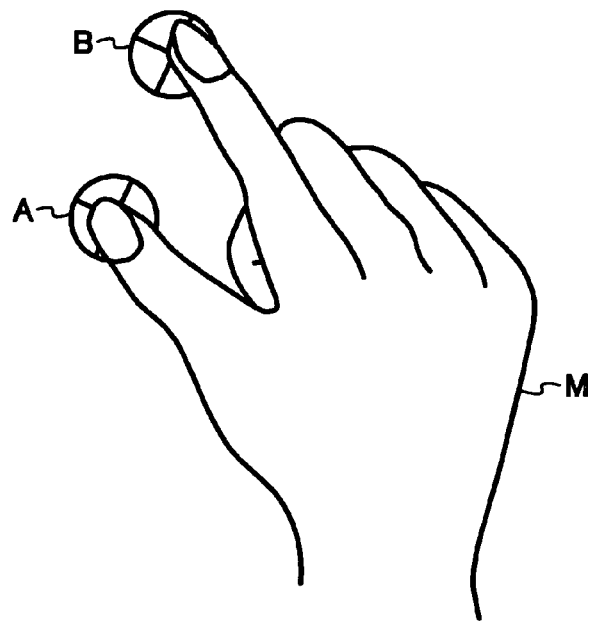
FIGS. 47A and 47B are views explaining a slider bar operation.
Figure 47B:
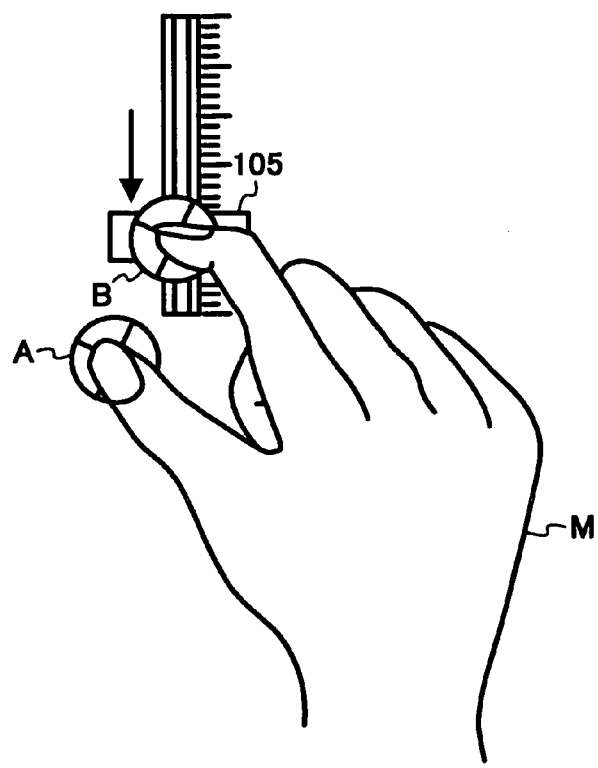

When one point (point Pa) is indicated on the screen 2a and a second point (point b) is indicated in this state and the position of second point is moved up and down as shown in FIG. 47B, a slider bar 105, which is an operation image, is displayed at the indicated position of second point. The image of slider bar 105 is drawn by the drawing software prestored in the hard disc 17. Similar to the dial 105, the slider bar 105 is suitable for stepwise or non-stepwise adjustment of a fixed physical quantity such as adjustment of speech volume to output speech at the information input and output system 1.

Figure 48:
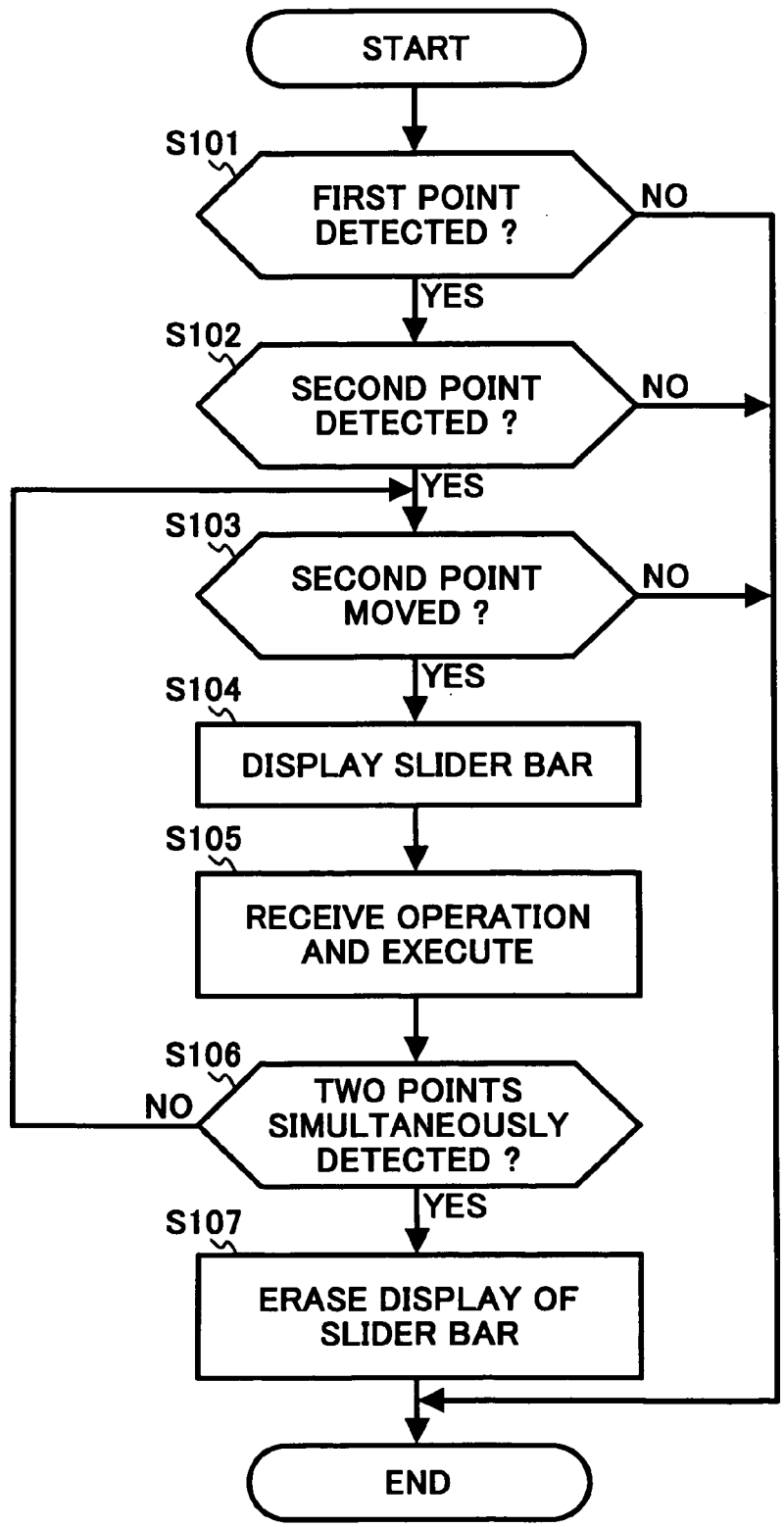
FIG. 48 is a flowchart explaining processing for the slider bar operation.
Figure 49:
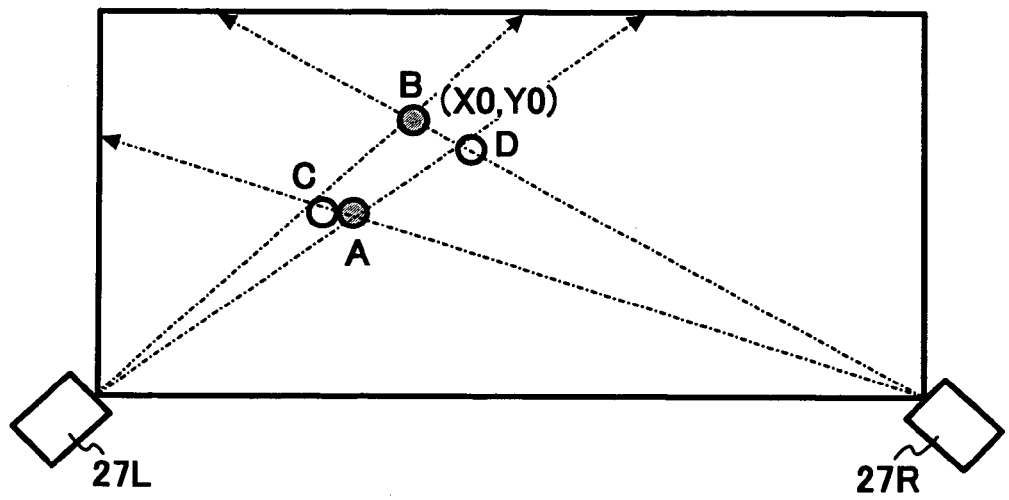
FIG. 49 is a view explaining detection of coordinates at the time of the slider bar operation.

In connection with processing in this case, as shown in FIG. 48, the information input and output system 1 detects one point (point A) (FIG. 49) (Yes in step S101). Thereafter, the information input and output system 1 detects another one point (point B) during a predetermined time while maintaining one point (point A) (Yes in step S102). After that, the information input and output system 1 displays the image of slider bar 105 at the position of second point (point B) (step S104) when detecting movement of the second point (point B) while maintaining the indication of the first point (point A). The step S103 achieves movement detecting means and movement detection processing. Further, step S104 achieves operation image displaying means and operation image display processing.

Figure 50:
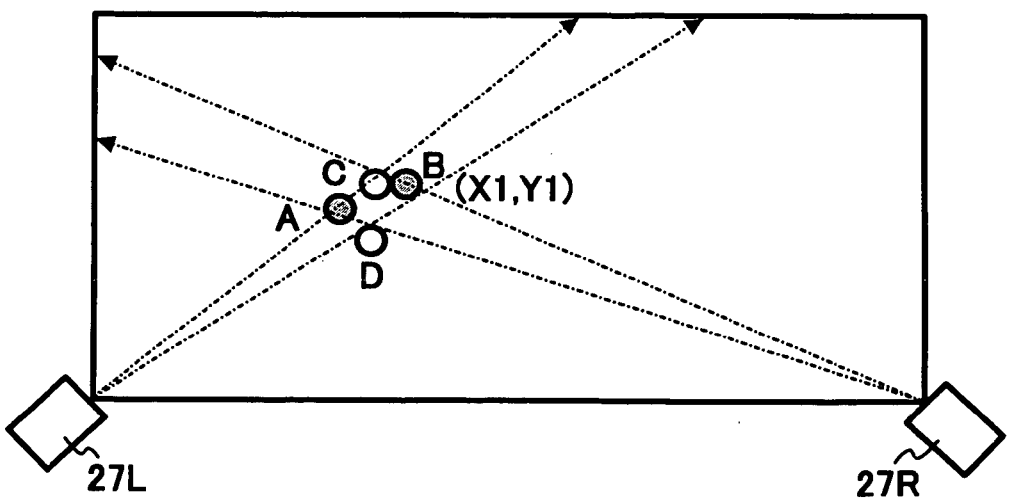
FIG. 50 is view explaining detection of coordinates at the time of the slider bar operation.

The detection of accurate coordinate positions of points A and B can be performed using the technique explained with reference the drawings including FIG. 23 and the afterward. Among points A to D, points A and B can be thereby determined as real images. Then, if the coordinates of the original point B is set to (x0, y0) (FIG. 49) and (x1, y1) (FIG. 50) respectively when the position of point B is moved, length l moved in a vertical direction can be obtained by "l=y1−y0." Then, the image of slider bar 105 is displayed at the position moved in the vertical direction by length l from the original position.

After that, the information input and output system 1 receives the operation (adjustment of speech volume) that complies with moved length l and executes the operation (step S105). The step S105 achieves operating means and operation processing. Thereafter, when simultaneous indication of two points, point A and point B, is not detected, the information input and output system 1 erases the display of slider bar 105 (step S107).

The above explained the examples of various kinds of operation images. An explanation is next given of processing for determining the kind of operation image that complies with the instruction on the screen 2a to display an appropriate operation image.

Figure 51:
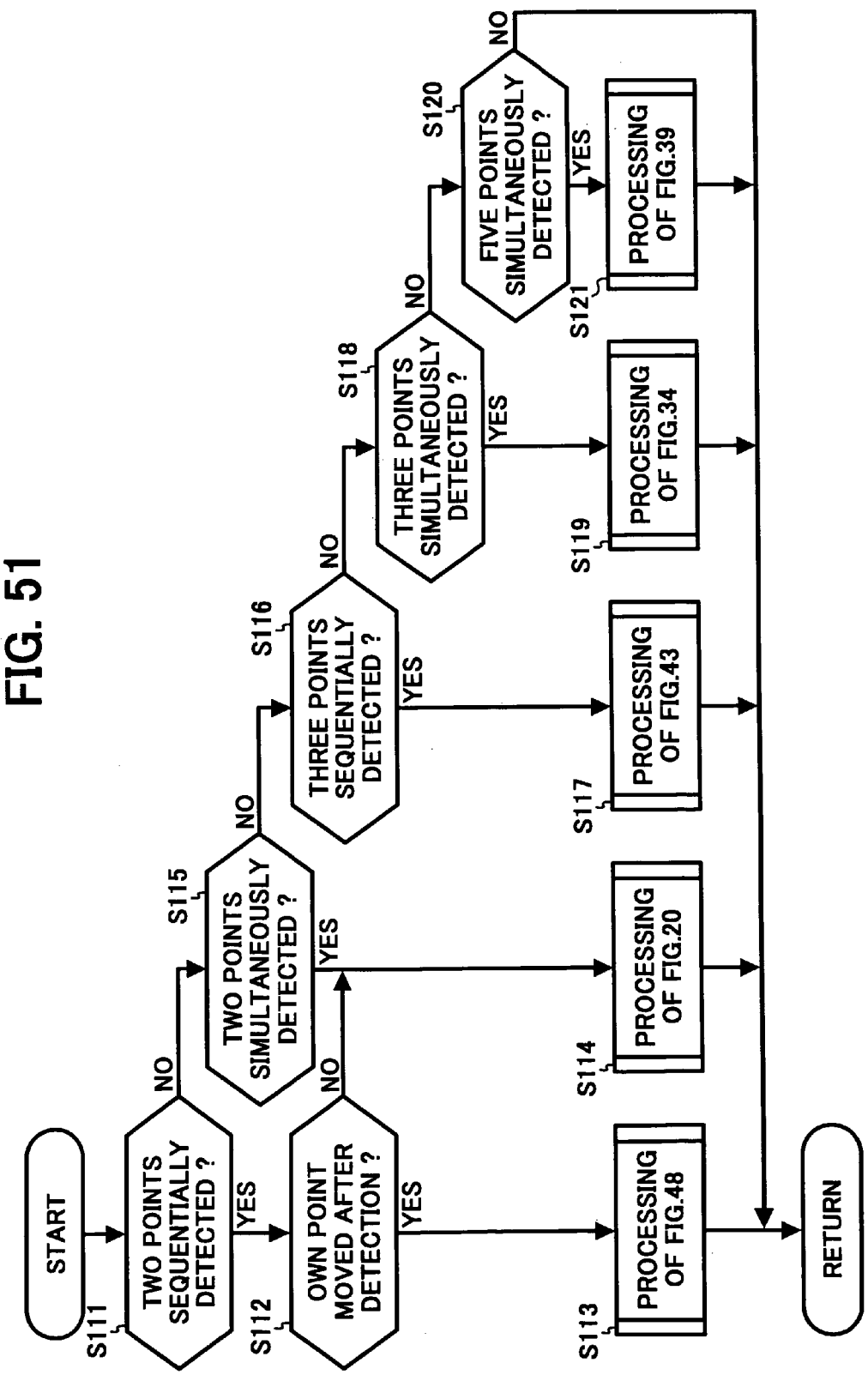
FIG. 51 is a flowchart explaining selection of an operation image.
Figure 52:
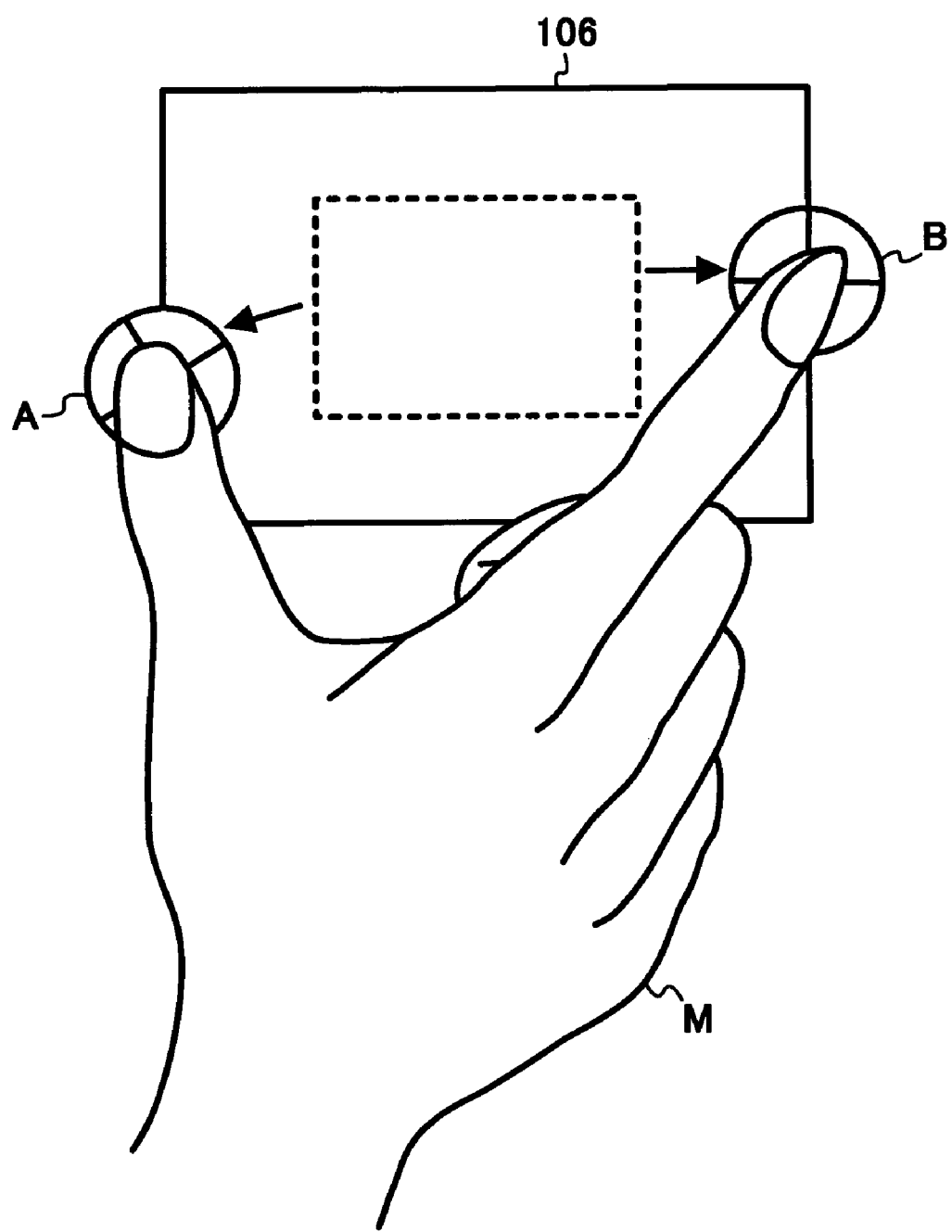
FIG. 52 is a view explaining an object enlarging and reducing operation.

As shown in FIG. 51, two points are sequentially detected on the screen 2a (Yes in step S111). Then, when one point detected later is moved (Yes in step S112), the flow proceeds to processing (slide bar display processing) explained with reference to FIG. 48 (step S113) so as to display the slider bar 105.

Further, when one point detected later is not moved (No in step S112), the flow proceeds to processing (icon display processing) explained with reference to FIG. 20 (step S114) so as to display the icon 94. Moreover, even if two points are simultaneously detected on the screen 2a (Yes in step S115), the flow proceeds to processing (icon display processing) explained with reference to FIG. 20 (step S114) in the same way.

When three points are sequentially detected on the screen 2a (Yes in step S116), the flow proceeds to processing (pallet display processing) explained with reference to FIG. 43 (step S117) so as to display the pallet 104.

When three points are simultaneously detected on the screen 2a (Yes in step S118), the flow proceeds to processing (dial display processing) explained with reference to FIG. 34 (step S119) so as to display the dial 101.

When five points are simultaneously detected on the screen 2a (Yes in step S120), the flow proceeds to processing (door and pallet display processing) explained with reference to FIG. 39 (step S121) so as to display the door 102 and pallet 103.

The processing in steps S111 to S121 achieves the operation image displaying means and operation image display processing.

Next, examples of other operation images are briefly explained.

Figure 42:
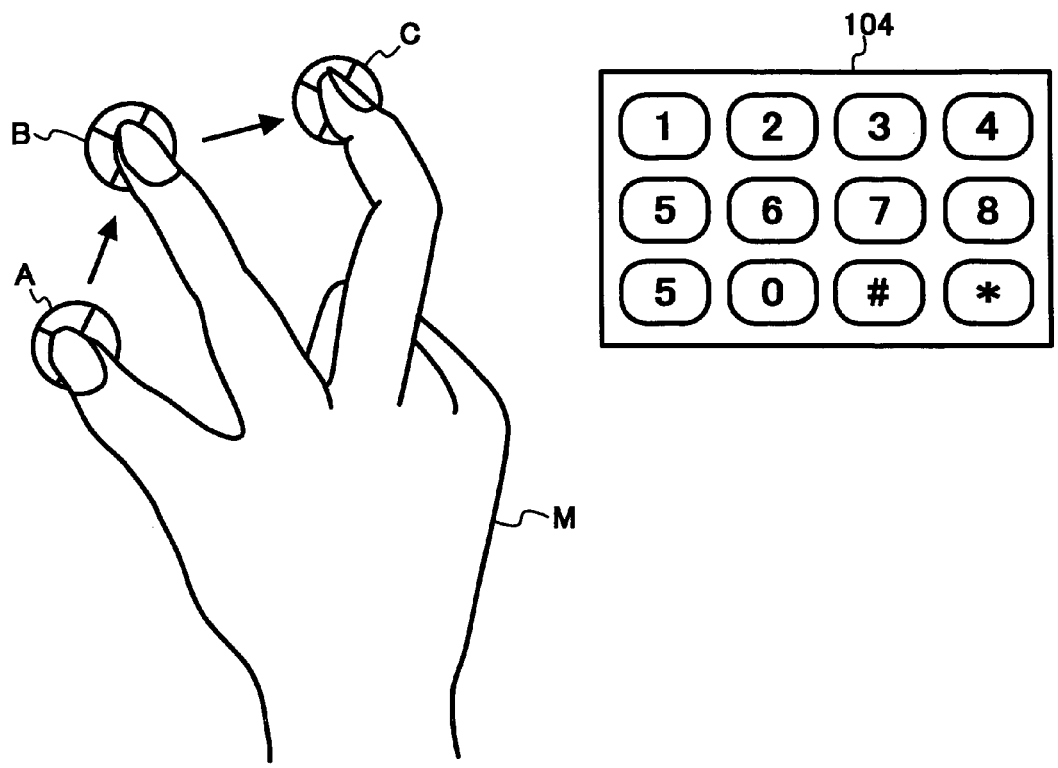
FIG. 42 is a view explaining the pallet operation.

As shown in FIG. 42, when two points (points A, B) are sequentially displayed on the screen 2a, a predetermined object 106, which is an operation image, is displayed between two points. When the user moves the positions of points A and B to increase or decrease the distance between points A and B, the size of object 106 may be enlarged or reduced in accordance with the size of distance to display. The object 106 is, for example, the icon 94 as mentioned above.

Figure 53:
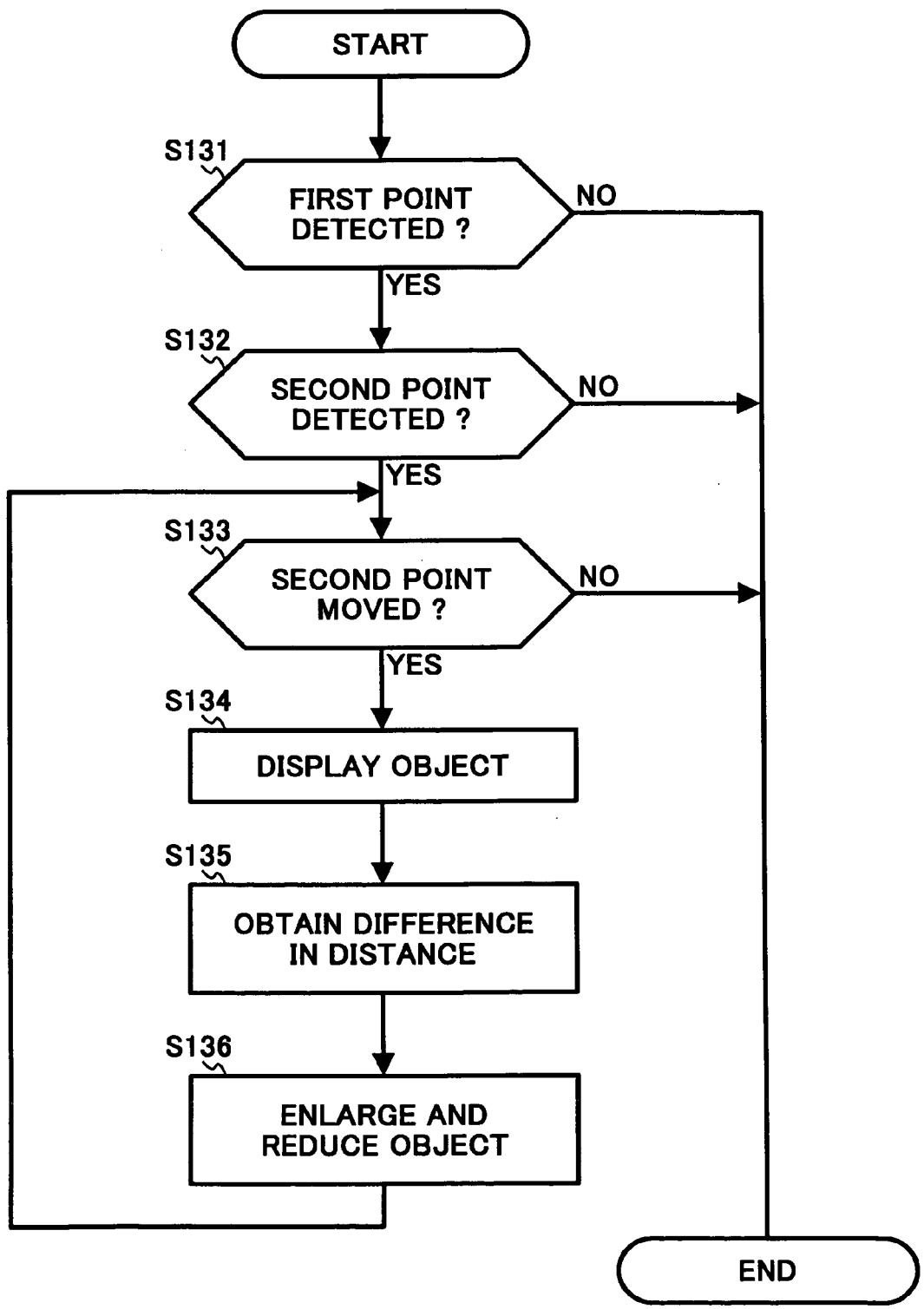
FIG. 53 is a flowchart explaining an object enlarging and reducing operation.

The flowchart of such processing is shown by FIG. 53. The information input and output system 1 first detects one point (point A) (Yes in step S131). Thereafter, the information input and output system 1 detects another point (point B) while maintaining (indicating) the point A during a predetermined time (Yes in step S132). After that, when points A and B are moved, the information input and output system 1 displays the object 106 (step S134). Then, regarding the length between points A and B, the information input and output system 1 obtains length difference 1c between first length 1a before movement and length 1b after movement (step S135). The information input and output system 1 enlarges or reduces the object 106 in accordance with the size of the length difference 1c (step S136). The step S133 achieves movement detecting means and movement detection processing. Further, the step S134 achieves operation image displaying means and operation image display processing. Furthermore, step S136 achieves size changing means and size change processing.

Figure 54:
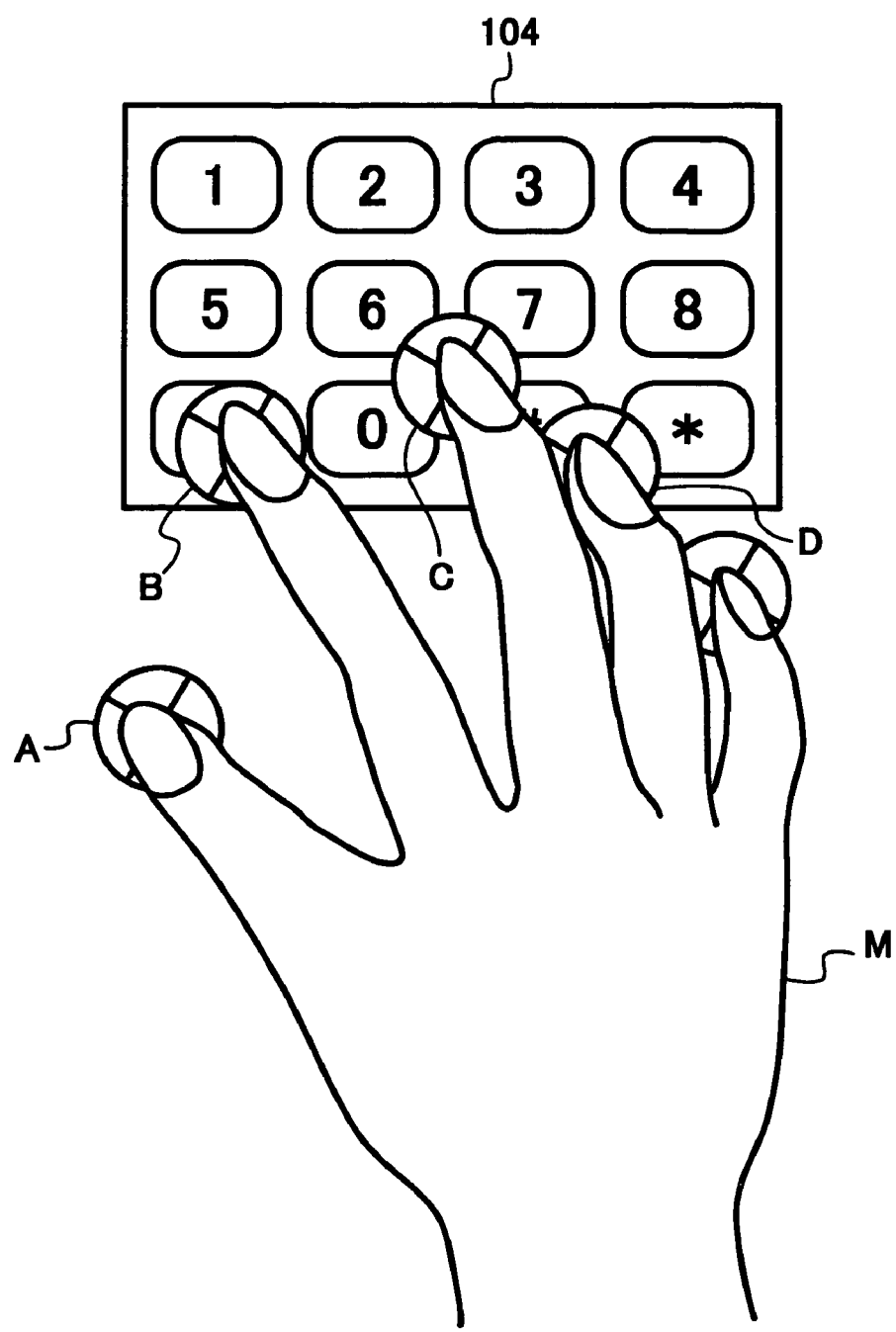
FIG. 54 is a view explaining the display of pallet.

In the example explained with reference to FIGS. 42 to 46, when points A, B, C are sequentially detected, the pallet 104 is displayed. However, as shown in FIG. 54, after detecting one point (point A), the information input and output system 1 may detect the pallet 104 when detecting other three points (points B, C, D) simultaneously while maintaining (indicating) the detection of point A.

Figure 55A:
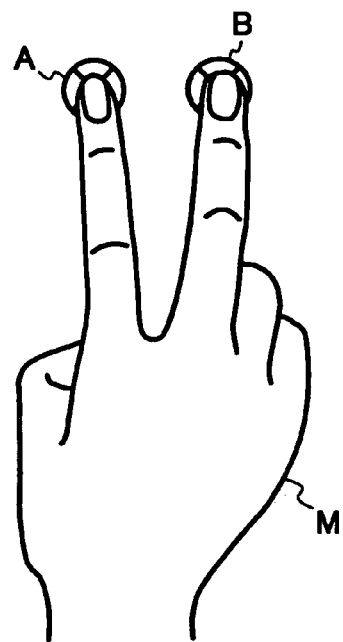
FIGS. 55A and 55B are views explaining the display of slider bar.
Figure 55B:
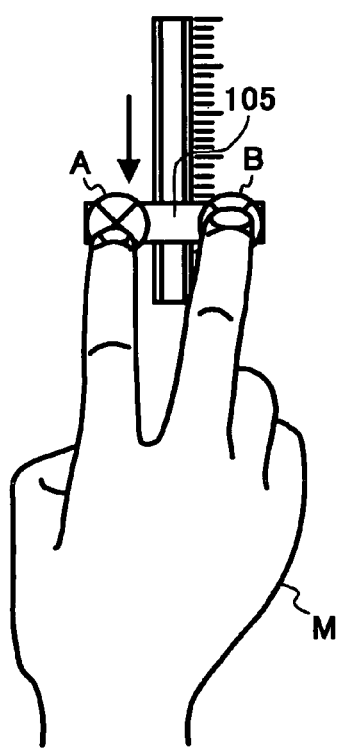

Further, in the example explained with reference to FIGS. 47A and 47B to 50, the slider bar 105 is displayed at point B and the slider bar 105 is moved to display with movement of point B. However, as shown in FIGS. 55A and 55B, the slider bar 105 is displayed to stride across points A and B so that the slider bar 105 may be moved with upper and lower movement of points A and B.

The above explained the embodiment of the present. However, the information input and output system 1 of this invention can be realized using the general computer system instead of the dedicated system. Specifically, the corresponding program is installed from a medium (flexible disc, CD-ROM, etc.) that stores programs causing the computer to execute the aforementioned operation, making it possible to configure a computer, which controls the information input and output system 1 that executes the aforementioned processing.

Further, for example, the corresponding program is posted on a bulletin board system (BBS) of communication network so that the program may be delivered via a communication line. Further, a carrier wave is modulated by a signal representing the corresponding program and an obtained modulated wave is transmitted, so that an apparatus that receives the modulated wave may demodulate the modulated wave to restore the corresponding program.

Then, the corresponding program is started up and executed under control of OS similar to the other application programs, making it possible to execute the aforementioned processing.

Additionally, in the case where OS shares a part of processing or OS constitutes a part of one of structural components of the present invention, a program excluding that part may be stored in the recording medium. In this case, it is assumed that a program for executing the respective functions or steps that the computer executes is stored to the recording medium.

As is obvious from the above explanation, according to the present invention, by a simple operation that indicates a plurality of locations on the screen with fingers, a necessary operation image can be displayed close to the indicated position. This allows the operation image to be operated on the screen at hand and operationality to be improved. Further, in the case where one location on the screen is indicated, the operation image is not displayed, making it possible to easily distinguish between the operation that indicates one location and the operation that displays the operation image.

Further, in the case where time interval is set to some extent to indicate a plurality of locations on the screen sequentially, the operation image is not displayed, making it possible to easily distinguish between the operation that indicates a plurality of locations on the screen with no object of displaying the operation image and the operation that displays the operation image.

Furthermore, the kinds of operation images, the number thereof, and the display positions thereof are registered in advance, and an appropriate operation image can be displayed in accordance with the contents of registration.

Moreover, since the details on the display image can be registered according to the user's desire, operationality can be improved.

Still moreover, the indicated position on the screen is moved, allowing a predetermined operation to be realized.

Further, in accordance with movement of the indicated position on the screen, it is possible to display an object that is indicated by the operation image as operated.

Furthermore, the operation image is easily enlarged or reduced to a desired size, making the operation easy.

Moreover, instead of displaying the operation immediately when the plurality of positions on the screen is indicated, the door image is moved gradually according to movement of the indicated position and the operation image can be displayed from the lower portion. This is suitable for a case in which an operation image that is undesirably shown directly.

Still moreover, various kinds of object images such as icon, dial, slide bar, pallet, etc., can be used as operation images.

Still moreover, it is possible to selectively display various kinds of operation images by the difference in the way of indication on the screen.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-300559 filed on Sep. 28, 2001, No. 2002-059431 filed on Mar. 5, 2002 and including specification, claims, drawings and summary. The disclosure of the above Japanese Patent Application is incorporated herein by reference in its entirety.

What is claimed is:

1. An information input and output system comprising:
   a display device that displays an image,
   a coordinate input device that detects coordinates of a plurality of positions indicated on a screen of the display device,
   a storage unit that prestores one or a plurality of operation images useful as images for an operation,
   an operation image control unit that displays, when the coordinate input device detects the coordinates of the plurality of positions indicated on the screen, an operation image stored in the storage unit at a predetermined position on the screen of the display device based on the coordinates, and
   a detecting unit that detects moved distance and moving direction of the position indicated on the screen,
   wherein the operation image control unit displays a door image at a predetermined position on the screen when a plurality of positions are detected on the screen, and
   the operation image control unit moves the display position of the door image on the screen and displays the operation image to appear gradually from the lower portion of door in accordance with at least one of the detected moved distance and moving direction when the movement of the indicated positions is detected in a state that the door image is displayed.

2. The system of claim 1, wherein the operation image includes at least one of an icon, a dial, a slider bar, and a pallet, and the operation image control unit displays an eraser icon for erasing the image on the screen when it is detected that two points on the screen are touched.

3. The system of claim 2, wherein the storage unit registers a plurality of operation images and the operation image control unit selects an image to be displayed from the plurality of operation images to display the selected image based on a number of the indicated positions and whether the positions are simultaneously indicated or the positions are sequentially indicated.

4. The system of claim 1, wherein the operation image includes at least one of an icon, a dial, a slider bar, and a pallet, and the operation image control unit displays an image of the pallet when it is detected that three points on the screen are touched.

5. The system of claim 4, wherein the storage unit registers a plurality of operation images, and the operation image control unit selects an image to be displayed from the plurality of operation images to display the selected image based on a number of the indicated positions and whether the positions are simultaneously indicated or the positions are sequentially indicated.

6. The system of claim 1, wherein the storage unit registers a plurality of operation images and the operation image control unit selects an image to be displayed from the plurality of operation images to display the selected image based on a number of the indicated positions and whether the positions are simultaneously indicated or the positions are sequentially indicated.

7. A computer-readable storage medium having a computer-program recorded thereon, the computer-program causing a computer, which is connected to a display device and a coordinate input device that detects coordinates of a plurality of positions indicated on a screen of the display device, to execute steps of:
   obtaining coordinates detected by the coordinate input device and
   displaying an operation image, useful as an image for an operation, at a predetermined position on the screen of the display device based on the obtained coordinates,
   wherein the displaying step includes:
   a step of displaying a door image at a predetermined position on the screen when a plurality of positions are detected on the screen, and
   a step of moving, when movement of the indicated positions is detected in a state that the door image is displayed, the display position of the door image on the screen to display the operation image to appear gradually from the lower portion of door in accordance with at least one of detected moved distance and detected moving direction of the position indicated on the screen.

8. The medium of claim 7, wherein the operation image includes at least one of an icon, a dial, a slider bar, and a pallet.

9. The medium of claim 7, wherein:
   a plurality of operation images are registered in a storage unit of the computer, and
   the displaying step includes a step of selecting an image to be displayed from the plurality of operation images to display the selected image based on a number of the indicated positions and whether the positions are simultaneously indicated or positions are sequentially indicated.

10. A computer readable storage medium having a computer program recorded thereon, the computer program causing a computer which registers one or a plurality of operation images useful as images for an operation and display condition information relating to display conditions in connection with the one or plurality of operation images, and which is connected to a display device and a coordinate input device that detects coordinates of a plurality of positions indicated on a screen of the display device to execute step of:
   obtaining coordinates of positions indicated on the screen from the coordinate input device and displaying the one or plurality of operation images using as images for an operation at a predetermined position on the screen of the display device in accordance with the display condition information when the coordinates of the plurality of positions indicated on the screen are obtained, wherein the displaying step includes a step of receiving a predetermined operation in accordance with at least one of the detected moved distance and moving direction when movement of the indicated positions is detected in a state in which the operation image is displayed and executing a processing corresponding to the predetermined operation.

11. The medium of claim 10, wherein the displaying step includes a step of changing the display position of the operation image in accordance with at least one of the detected moved distance and moving direction when the movement of the indicated positions is detected in a state that the operation image is displayed.

12. The medium having a computer-program recorded thereon of claim 11, wherein the displaying step includes a step of enlarging or reducing the size of the operation image on the screen in accordance with at least one of the detected moved distance and moving direction when the movement of the indicated positions is detected.

13. A computer data signal embedded in a carrier wave indicating a program causing a computer, which is connected to a display device and a coordinate input device that detects coordinates of a plurality of positions indicated on a screen of the display device, to execute the steps of: obtaining coordinates detected by the coordinate input device, displaying an operation image, useful as an image for an operation, at a predetermined position on the screen of the display device based on the obtained coordinates: and detecting moved distance and moving direction of the positions indicated on the screen, wherein the displaying step includes:

a step of enlarging or reducing the size of the operation image on the screen in accordance with at least one of the detected moved distance and moving direction when the movement of the indicated positions is detected, a step of displaying a door image at a predetermined position on the screen when a plurality of positions are detected on the screen, and moving the display position of the door image on the screen to display the control image to appear gradually from the lower portion of door in accordance with at least one of the detected moved distance and moving direction when the movement of the indicated positions is detected in a state that the door image is displayed.

* * * * *